United States Patent
Takayama

(10) Patent No.: US 7,360,691 B2
(45) Date of Patent: Apr. 22, 2008

(54) SECURE DEVICE AND MOBILE TERMINAL WHICH CARRY OUT DATA EXCHANGE BETWEEN CARD APPLICATIONS

(75) Inventor: Hisashi Takayama, Setagaya-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 356 days.

(21) Appl. No.: 11/049,482

(22) Filed: Feb. 2, 2005

(65) Prior Publication Data

US 2005/0173518 A1    Aug. 11, 2005

(30) Foreign Application Priority Data

Feb. 2, 2004  (JP) ............................. 2004-025513
Apr. 2, 2004  (JP) ............................. 2004-109942

(51) Int. Cl.
*G06K 5/00*    (2006.01)

(52) U.S. Cl. ...................................... 235/380; 235/492
(58) Field of Classification Search ................ 235/380, 235/383, 375, 492; 711/100, 154
See application file for complete search history.

(56) References Cited

U.S. PATENT DOCUMENTS

| | | | |
|---|---|---|---|
| 5,578,808 A * | 11/1996 | Taylor | 235/380 |
| 6,256,690 B1 | 7/2001 | Carper | |
| 6,834,799 B2 * | 12/2004 | Tanabiki et al. | 235/382 |
| 6,859,650 B1 * | 2/2005 | Ritter | 455/406 |
| 7,127,605 B1 * | 10/2006 | Montgomery et al. | 713/150 |
| 2002/0070270 A1 * | 6/2002 | Narita et al. | 235/375 |
| 2004/0132437 A1 * | 7/2004 | Ohmori et al. | 455/414.1 |

FOREIGN PATENT DOCUMENTS

| | | |
|---|---|---|
| EP | 0 933 717 | 8/1999 |
| EP | 0 949 595 | 10/1999 |
| JP | 2002-324256 | 11/2002 |
| JP | 2002-334285 | 11/2002 |
| WO | WO 98/43212 | 10/1998 |

* cited by examiner

*Primary Examiner*—Ahshik Kim
(74) *Attorney, Agent, or Firm*—Pearne & Gordon LLP

(57) ABSTRACT

A secure device comprises a data exchange card application carrying out data exchange between card applications isolated by a fire wall, card application plug-in data defining authentication processing of the data exchange card application, in such a manner that authentication processing between the card application and the data exchange card application is carried out in the same manner as authentication processing between the card application and a dedicated host terminal, and authentication key data used for this authentication processing. Data exchange and tie-up processing between card applications are possible in a secure device, or under the mediation of a mobile terminal, and rapid processing can be done. The card application has only to carry out the same operation as data exchange with a related dedicated host terminal. Also, tie-up processing between card applications can be carried out by only a mobile terminal side in which a secure device is loaded.

53 Claims, 31 Drawing Sheets

SECURE DEVICE AND MOBILE TERMINAL WHICH CARRY OUT DATA EXCHANGE BETWEEN CARD APPLICATIONS

This application is based on Japanese Patent Applications No. 2004-025513 and 2004-109942, which are incorporated herein by reference.

BACKGROUND OF THE INVENTION

1. Field of the Invention

This invention relates to a secure device such as an IC card and a mobile terminal loading the same, for enabling data exchange and collaborative processing between card applications stored in a secure device.

2. Description of the Related Art

In recent years, IC cards are widely used as electronic payment cards and commuter passes, event tickets, point service cards and so on. In recent days, in cooperation with improvement of miniaturization technologies, IC cards having relatively high-capacity memory spaces are manufactured, and the suchlike IC card can be used as a multiple application card which corresponds to a plurality of use applications with one card, by storing a plurality of card applications which execute card services. Such an era that a mobile phone, in which this IC card is loaded, is possessed in lieu of a purse, and electronic payment and ticket reservation etc. are carried out with this one card, and in addition, also used as a commuter pass, an event entrance ticket and so on, is about to turn to reality.

In addition, there is also such a movement that convenience of a user and differentiation of a service are realized by incorporating services which use IC cards. For example, JP-A-2002-334285 describes such a service that a server system named as plural electronic money payment representative system converts a certain kind of electronic money which is stored in an IC card through a network, into electronic money which can be used in available shops, and transmits it to an IC card once again, and such a service that when payment of a commercial good is paid by electronic money which is stored in an IC card, point which correspond to an amount paid are added to points which are stored in the IC card.

In addition, also in a real world, such a service system that points, which are issued from an airline company in accordance with an itinerary (mileage) using an airplane, are converted into electronic money, and utilized for commercial good purchase at convenience stores.

However, even in case that card applications, which execute collaborative services, are stored in one IC card, respective card applications are isolated from other card applications by a fire wall, on an IC card, from the view point of security keeping, and it is normally configured that handing-over of data between card applications can not be realized. On that account, as shown in FIG. 19, card applications (electronic money application 71 and mileage card application 72) on an IC card 70, which are isolated by a fire wall 14, are connected by online to management servers 77, 75 of respective service providers (electronic money service provider 76 and mileage service provider 74), through a user terminal 73 and a dedicated host terminal 73, respectively, and exchange and conversion of data are carried out through this server 77, 75.

However, in case of exchanging information between card applications through servers of different service providers, there is such a case that it takes extremely so much time for its execution, and there is such a case example that it takes time of weeks, in an actual system. This may leads to a result of extinguishing a motivation of a user who is tried to utilize a service. In addition, there is such a necessity to connect to a server every time data exchange is carried out between card applications, and in particular, in case of being at such a place that it is impossible to carry out online connection to a server in a mobile environment etc., there is such a problem that it is impossible to carry out data exchange.

Having said so, to remove a fire wall function of an IC card has a security problem, and in addition, there is also such a method that a sharable interface is incorporated in a code of a card application to enable direct communication between card applications. But in this case, there is a necessity to re-design API (Application Programming Interface) which is laid open to other card applications, authentication processing which is carried out in it, etc., in consideration of security, and there is such a problem that big changes of related IC cards and existing card applications are forced to be carried out.

In addition, for example, JP-A-2002-324256 describes such a system that, on the occasion of doing some shopping at a certain shop, a traveling expense at the time of coming to the shop is calculated from a utilization history of a mobile terminal which is used as a boarding ticket, and the shop side bears this traveling expense. In this system, an electronic ticket in traffic means such as a railway is stored in a data carrier (IC card) which is held in a mobile terminal, and when someone goes through a ticket gate of a station with holding up this mobile terminal on an automatic ticket checking machine, a ticket check history such as a boarding station and a getting-off station, an amount paid is recorded in an IC card. When a user, who purchased a commercial good at a shop, holds up a mobile terminal on a POS terminal at the time of payment, the POS terminal reads out ticket check history information from the IC card, and confirms a traveling expense which is spent at the time of coming to the shop, and makes settlement by such an amount that the traveling expense is subtracted from a commercial good purchase amount of a user.

In addition, in another form of this system, ticket gate passing information at the time that someone goes through an automatic ticket checking machine with holding up a mobile terminal thereon is stored/managed in a revenue management server of a railway company side. On one hand, a POS terminal, which is installed at a shop, has Internet access means, and accesses to the revenue management server through Internet, when it obtains a mobile terminal ID from the mobile terminal which a user held up at the time of payment, and confirms a traveling expense which is spent at the time of coming to the shop, with reference to ticket check history information of a relevant mobile terminal ID, and makes settlement by such an amount that the traveling expense is subtracted from a commercial good purchase amount of a user.

In this way, by realizing a tie-up of plural services, it is possible to provide unique services which attract users.

SUMMARY OF THE INVENTION

A first viewpoint of the invention aims to provide a secure device such as an IC card, which can rapidly carry out data exchange between card applications which are protected by a fire wall, and a mobile terminal to which it is loaded.

A secure device of the invention comprises a card application which is isolated by a fire wall, a data exchange card application which carries out data exchange with the card applications, card application plug-in data which defines authentication processing and data communication processing which the data exchange card application carries out, so as to be able to carry out authentication processing and data communication processing between the card application and the data exchange card application in the same manner as authentication processing and data communication processing between the card application and a dedicated host terminal, and authentication key data which is used for this authentication processing.

On that account, data exchange is possible in a secure device, or through a terminal to which the secure device is loaded, and rapid processing can be done. In addition, as for a card application, it is sufficient only to carry out the same operation as data exchange with a related dedicated host terminal.

In addition, in a secure device of the invention, the secure device further comprises plug-in data for realizing such a matter that external mediation means mediates the data exchange and the mediation means can access to the card application.

In this secure device, an application of a terminal to which the secure device is loaded operates as the mediation means.

In addition, in a secure device of the invention, a card application has a sharable interface, and the sharable interface provides a similar function to that of a command which is inputted to the card application through a host interface of the secure device, and has such a function that the data exchange card application carries out data exchange with the card application through the sharable interface.

In this secure device, data exchange between card applications in its inside is possible.

In addition, a secure device of the invention comprises a plurality of card applications, and card application plug-in data and authentication key data which correspond to respective card applications.

On that account, various data exchanges between card applications are possible.

In addition, a secure device of the invention comprises a first card application, a second card application and a data exchange card application, and card application plug-in data and authentication key data which correspond to respective card applications of the first card application and the second card application, and has a function for carrying out data exchange between the first card application and the second card application by realizing such a matter that the data exchange card application carries out data exchange with the second card application, in the aftermath of data exchange with the first card application.

In this secured service, data exchange between card applications which do not have a function of data exchange with another card application for its own sake is possible.

In addition, a secure device of the invention comprises a data exchange card application which carries out data exchange between a card application and another card application, which are isolated by a fire wall, and has such a function that the data exchange card application carries out processing which is similar to authentication processing and data communication processing which a card application and a dedicated host terminal carry out, with the card application, to carry out data exchange with the card application, when card application plug-in data which defines authentication processing and data communication processing between the card application and the data exchange card application and authentication key data which is used for the authentication processing are downloaded in the data exchange card application.

In this secure device, it is possible to carry out such an operation that only the card application plug-in data and the authentication key data are downloaded to the card application which has been already utilized, on the basis of a new contract, to enable data exchange.

In addition, a secure device of the invention comprises a data exchange card application which carries out data exchange with a card application of another secure device, card application plug-in data which defines authentication processing and data communication processing which the data exchange card application carries out, in such a manner that authentication processing and data communication processing between the card application of another secure device and the data exchange card application are carried out in the same manner as authentication processing and data communication processing between the card application of another secure device and a dedicated host terminal, and authentication key data which is used for that authentication processing.

In this secure device, data exchange between card applications of different secure devices is possible under the mediation of a terminal to which the secure device is loaded, and rapid processing can be done. In addition, as for a card application, it is sufficient only to carry out the same operation as data exchange with a related dedicated host terminal.

In addition, in a secure device of the invention, the secure device further comprises plug-in data for realizing such a matter that external mediation means mediates the data exchange and the mediation means can access to the card application.

In this secure device, an application of a terminal to which the secure device is loaded operates as the mediation means.

In addition, a secure device of the invention comprises card application plug-in data and authentication key data which correspond to a card application of a first other secure device, and card application plug-in data and authentication key data which correspond to a card application of a second other secure device, and has a function for carrying out data exchange between the card application of the first other secure device and the card application of the second other secure device by realizing such a matter that the data exchange card application carries out data exchange with the card application of the second other secure device, in the aftermath of data exchange with the card application of the first other secure device.

In this secured service, data exchange between card applications which do not have a function of data exchange with another card application for its own sake, on another secure device, is possible.

In addition, a secure device of the invention comprises a data exchange card application which carries out data exchange with a card application of another secure device, has such a function that the data exchange card application carries out processing which is similar to authentication processing and data communication processing which a card application and a dedicated host terminal carry out, with the card application of another secure device, to carry out data exchange with the card application of another secure device, when card application plug-in data which defines authentication processing and data communication processing between the card application of another secure device and the data exchange card application, and authentication key data which is used for the authentication processing are downloaded in the data exchange card application.

In this secure device, it is possible to carry out such an operation that only the card application plug-in data and the authentication key data are downloaded to the card application which has been already utilized on another secure device, on the basis of a new contract, to enable data exchange.

In addition, a secure device of the invention comprises such a mileage point function that a data exchange card application records points and an exchange processing history of the points, and an electronic boarding ticket card application for recording electronic boarding ticket information and a ticket check history, as a card application, and has such a function that the data exchange application communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance.

In this secure device, calculation of points from the ticket check history is possible by off-line processing.

In addition, a secure device of the invention comprises such a mileage point function that a data exchange card application records points and an exchange processing history of the points, and an electronic money card application for recording electronic money balance, as a card application, and has such a function that the data exchange application communicates with the electronic money card application by use of authentication key data correspond to the electronic money card application, on the basis of card application plug-in data correspond to the electronic money card application, and converts points into electronic money, and adds it to the electronic money balance of the electronic money card application.

In this secure device, conversion of points into the electronic money is possible by off-line processing.

In addition, a secure device of the invention comprises such a mileage point function that a data exchange card application records points and an exchange processing history of the points, and an electronic boarding ticket card application for recording electronic boarding ticket information and a ticket check history, and an electronic money card application for recording electronic money balance, as card applications, and has such a function that the data exchange application communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance, and furthermore, communicates with the electronic money card application by use of authentication key data correspond to the electronic money card application, on the basis of card application plug-in data correspond to the electronic money card application, and converts points into electronic money, and adds it to the electronic money balance of the electronic money card application.

In this secure device, calculation of points from the ticket check history, and furthermore, calculation of points from the ticket check history, are possible by off-line processing, and in addition, a tie-up of plural services is possible.

In addition, a secure device of the invention comprises such an exchange function that a data exchange card application carries out exchange processing of currency and records an exchange processing history, and a multi-electronic money card application for managing electronic money of plural kinds of currencies, as a card application, and has such a function that the data exchange card application communicates with the multi-electronic money card application by use of authentication key data correspond to the multi-electronic money card application, on the basis of card application plug-in data correspond to the multi-electronic money card application, and carries out exchange processing between a plurality of currencies, on the basis of currency exchange rates and commission charges which the data exchange card application manages.

In this secure device, exchange of electronic money to electronic money of another currency is possible by off-line processing.

In addition, a secure device of the invention comprises such an exchange function that a data exchange card application carries out exchange processing of currency and records an exchange processing history, and a multi-electronic money card application for managing electronic money of plural kinds of currencies, and a multi-electronic traveler's check for managing electronic traveler's checks of plural kinds of currencies, as a card application, and has such a function that the data exchange card application communicates with the multi-electronic money card application by use of authentication key data correspond to the multi-electronic money card application, on the basis of card application plug-in data correspond to the multi-electronic money card application, and furthermore, communicate with the multi-electronic traveler's check card application, by use of authentication key data correspond to the multi-electronic traveler's check card application, on the basis of card application plug-in data correspond to the multi-electronic traveler's check card application, and carries out data exchange with the multi-electronic money card application and the multi-electronic traveler's check card application, to carry out exchange of a plurality of currencies and exchange of electronic money and an electronic traveler's check, on the basis of currency exchange rates and commission charges which the data exchange card application manages.

In this secure device, exchange of electronic money to electronic money of another currency, and exchange processing of electronic money and a traveler's check are possible by off-line processing, and in addition, a tie-up of a plurality of services is possible, through data exchange between card applications for carrying out different services.

In addition, a secure device of the invention comprises a secure flash memory area which a data exchange card application manages, and card application plug-in data and authentication key data are stored in the secure flash memory area, and the data exchange card application manages with respect to each corresponding card application.

In this secure device, it is possible to store card application plug-in data and authentication key data which correspond to large numbers of card applications, in a secure flash memory area with large recording capacity, and a tie-up of large numbers of services is possible.

A mobile terminal of the invention comprises a card application which is isolated by a fire wall, and a data exchange card application which carries out data exchange with the card application, and card application plug-in data which defines authentication processing and data communication processing which the data exchange card application carries out, in such a manner that authentication processing and data communication processing between the card application and the data exchange card application are carried out in the same manner as authentication processing and data communication processing between the card application and a dedicated host terminal, and such a function that the data exchange card application carries out data exchange with the card application.

On that account, data exchange between card applications is possible in a secure device, or under the mediation of a mobile terminal, and rapid processing can be done.

In addition, in a mobile terminal of the invention, the mobile terminal comprises a mediation terminal application, and a secure device further comprises plug-in data in order to realized such a matter that the mediation terminal application mediates data exchange, and the mediation terminal application enables this mediation terminal application to access to a card application.

In this mobile terminal, there is no such necessity that a mobile terminal holds plug-in data which is different depending on a king of a card application.

In addition, in a mobile terminal of the invention, a card application of a secure device comprises a sharable interface, and the sharable interface provides a similar function to that of a command which is inputted through a host interface of a security device to a card application, and has such a function that a data exchange application carries out data exchange with a card application through the sharable interface.

In this mobile terminal, data exchange between card applications in an inside of a secure device is possible.

In addition, a mobile terminal of the invention comprises a plurality of card applications, and a secure device comprises card application plug-in data and authentication key data which correspond to respective card applications.

On that account, various data exchange between card applications is possible.

In addition, in a mobile terminal of the invention, a secure device comprises a first card application, a second card application and a data exchange card application, and card application plug-in data and authentication key data which correspond to respective card applications of the first card application and the second card application, and has a function for carrying out data exchange between the first card application and the second card application by realizing such a matter that the data exchange card application carries out data exchange with the second card application, in the aftermath of data exchange with the first card application.

In this secured service, data exchange between card applications which do not have a function of data exchange with another card application for its own sake is possible.

In addition, a mobile terminal of the invention comprises a card application isolated by a fire wall, and a secure device having a data exchange card application carrying out data exchange with another card application, and has such a function that the data exchange card application carries out processing which is similar to authentication processing and data communication processing which the card application and a dedicated host terminal carry out, with the card application, to carry out data exchange with the card application, when the mobile terminal downloads card application plug-in data which defines authentication processing and data communication processing between the card application and the data exchange card application, and authentication key data which is used for that authentication processing in the data exchange card application.

In this mobile terminal, it is possible to carry out such an operation that only the card application plug-in data and the authentication key data are downloaded to the card application which has been already utilized, on the basis of a new contract, to enable data exchange.

In addition, a mobile terminal of the invention comprises a first secure device having a data exchange card application which carries out data exchange with a card application of another secure device, and a second secure device having one or more card applications, the first secure device comprises card application plug-in data which defines authentication processing and data communication processing which the data exchange card application carries out, and authentication key data which is used for authentication processing, in such a manner that authentication processing and data communication processing between the card application of the second secure device and the data exchange card application of the first secure device are carried out in the same manner as authentication processing and data communication processing between the card application of the second secure device and a dedicated host terminal, and having such a function that the data exchange card application carries out data exchange with the first card application.

In this mobile terminal, under the mediation of the mobile terminal, data exchange between card applications of different secure devices is possible, and rapid processing can be done. In addition, as for a card application, it is sufficient only to carry out the same operation as data exchange with a related dedicated host terminal.

In addition, in a mobile terminal of the invention, the mobile terminal has a mediation terminal application, and the secure device further having plug-in data to the mediation terminal application in order to realize such a matter that the mediation terminal application mediates data exchange, and the mediation terminal application can be accessed to the card application.

In this mobile terminal, under the mediation of the mobile terminal, data exchange between card applications of different secure devices is possible.

In addition, a mobile terminal of the invention comprises a third secure device having one or more card applications, and a first secure device comprises card application plug-in data and authentication key data which correspond to a card application of the second secure device, and card application plug-in data and authentication key data which correspond to a card application of the third secure device, and has a function for carrying out data exchange between the card application of the second secure device and the card application of the third secure device, by realizing such a matter that the data exchange card application carries out data exchange with the card application of the third secure device, in the aftermath of data exchange with the card application of the second secure device.

In this mobile terminal, data exchange between card applications which do not have a function of data exchange with another card application for its own sake is possible.

In addition, a mobile terminal of the invention comprises a first secure device having a data exchange card application which carries out data exchange with a card application of another secure device, and a second secure device having one or more card applications, has such a function that the data exchange card application carries out processing which is similar to authentication processing and data communication processing which the card application of the second secure device and a dedicated host terminal carry out, with the card application of the second secure device, to carry out data exchange with the card application of the second secure device, when card application plug-in data which defines authentication processing and data communication processing between the card application and the data exchange card application of the second secure device, and authentication key data which is used for the authentication processing are downloaded in the data exchange card application.

In this mobile terminal, it is possible to carry out such an operation that only the card application plug-in data and authentication key data are downloaded to the card application on the second secure device, which has been already utilized, on the basis of a new contract, to enable data exchange.

In addition, a mobile terminal of the invention has such a mileage point function that a data exchange card application of a secure device records points and an exchange processing history of the points, and has an electronic boarding ticket card application for recording electronic boarding ticket information and a ticket check history, as a card application of the secure device, and has such a function that the data exchange application of the secure device communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance.

In this mobile terminal, calculation of points from the ticket check history is possible by off-line processing.

In addition, a mobile terminal of the invention has such a mileage point function that a data exchange card application of a secure device records points and an exchange processing history of the points, and has an electronic money card application for recording electronic money balance, as a card application of the secure device, and has such a function that the data exchange application of the secure device communicates with the electronic money card application by use of authentication key data correspond to the electronic money card application, on the basis of card application plug-in data correspond to the electronic money card application, and converts points into electronic money, and adds it to the electronic money balance of the electronic money card application.

In this mobile terminal, conversion of points into the electronic money is possible by off-line processing.

In addition, a mobile terminal of the invention has such a mileage point function that a data exchange card application of a secure device records points and an exchange processing history of the points, and has an electronic boarding ticket card application for recording electronic boarding ticket information and a ticket check history, and an electronic money card application for recording electronic money balance, as card applications of the secure device, and has such a function that the data exchange application of the secure device communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance, and furthermore, communicates with the electronic money card application by use of authentication key data correspond to the electronic money card application, on the basis of card application plug-in data correspond to the electronic money card application, and converts points into electronic money, and adds it to the electronic money balance of the electronic money card application.

In this mobile terminal, calculation of points from the ticket check history, and furthermore, calculation of points from the ticket check history, are possible by off-line processing, and in addition, a tie-up of plural services is possible.

In addition, a mobile terminal of the invention is has such an exchange function that a data exchange card application of a secure device carries out exchange processing of currency and records an exchange processing history, and has a multi-electronic money card application for managing electronic money of plural kinds of currencies, as a card application of the secure device, and has such a function that the data exchange card application of the secure device communicates with the multi-electronic money card application by use of authentication key data correspond to the multi-electronic money card application, on the basis of card application plug-in data correspond to the multi-electronic money card application, and carries out exchange processing between a plurality of currencies, on the basis of currency exchange rates and commission charges which the data exchange card application manages.

In this mobile terminal, exchange of electronic money to electronic money of another currency is possible by off-line processing.

In addition, a mobile terminal of the invention has such an exchange function that a data exchange card application of a secure device carries out exchange processing of currency and records an exchange processing history, and has a multi-electronic money card application for managing electronic money of plural kinds of currencies, and a multi-electronic traveler's check for managing electronic traveler's checks of plural kinds of currencies, as card applications of the secure device, and has such a function that the data exchange card application of the secure device communicates with the multi-electronic money card application by use of authentication key data correspond to the multi-electronic money card application, on the basis of card application plug-in data correspond to the multi-electronic money card application, and furthermore, communicate with the multi-electronic traveler's check card application, by use of authentication key data correspond to the multi-electronic traveler's check card application, on the basis of card application plug-in data correspond to the multi-electronic traveler's check card application, and carries out data exchange with the multi-electronic money card application and the multi-electronic traveler's check card application, to carry out exchange of a plurality of currencies and exchange of electronic money and an electronic traveler's check, on the basis of currency exchange rates and commission charges which the data exchange card application manages.

In this mobile terminal, exchange of electronic money to electronic money of another currency, and exchange processing of electronic money and a traveler's check are possible by off-line processing, and in addition, a tie-up of a plurality of services is possible, through data exchange between card applications for carrying out different services.

In addition, a mobile terminal of the invention comprises a secure flash memory area which a data exchange card application manages, in a secure device, and card application plug-in data and authentication key data are stored in the secure flash memory area, and the data exchange card application manages with respect to each corresponding card application.

In this mobile terminal, it is possible to store card application plug-in data and authentication key data which correspond to large numbers of card applications, in a secure flash memory area with large recording capacity, and a tie-up of large numbers of services is possible.

In a data exchange system between card applications of the invention, a mobile terminal comprises a secure device having a card application isolated by a fire wall, and a data exchange card application which carries out data exchange with another card application, and the secure device has card application plug-in data which defines authentication processing and data communication processing which the data exchange card application carries out, in such a manner that authentication processing and data communication processing between the card application and the data exchange card application are carried out in the same manner as authentication processing and data communication processing between the card application and a dedicated host terminal, and authentication key data which is used for that authentication processing, and by an instruction which is transmitted from the mobile terminal on the basis of a manual operation of a user, or an instruction which is automatically transmitted from the mobile terminal, the data exchange card application of the secure device carries out data exchange with the card application by use of the card application plug-in data and authentication key data.

In this system, data exchange between card applications is possible in a secure device, or under the mediation of a mobile terminal, and rapid processing can be done. In addition, as for the card application, it is sufficient only to carry out the same operation as data exchange with a related dedicated host terminal.

A secure device and a mobile terminal loading the same, of the invention, can rapidly process data exchange between card applications by off-line processing. In addition, as for an existing card application such as electronic money and electronic boarding tickets, royalty points, it is sufficient to carry out a similar operation to that of a related one, and many alterations are not required.

In addition, it is possible to combine data exchanges between a plurality of card applications, by use of this secure device, and various tie-ups of services become possible.

In addition, a second view point of the invention aims to provide a secure device such as an IC card, which can rapidly carry out tie-up processing of a plurality of services in an inside of a card, and a mobile terminal which holds it.

A secure device of the invention comprises a tie-up coupon in which a processing content of tie-up processing between card applications and an execution condition of the tie-up processing are described, and a tie-up card application which carries out the tie-up processing between card applications on the basis of the tie-up coupon, and the tie-up card application collects information which is stored in another card application, and judges whether it satisfies the above-described execution condition or not, and carries out the tie-up processing when the execution condition is satisfied.

On that account, it is possible to carry out the tie-up processing between card applications instantaneously, only by a mobile terminal side to which the secure device is loaded.

In addition, as the tie-up processing, re-writing of information held in another card application is carried out by the tie-up card application.

In addition, the tie-up coupon includes an electronic value, and the tie-up card application issues the electronic value to another card application, as the tie-up processing.

In addition, the tie-up coupon includes card application plug-in data which defines authentication processing and data communication processing of the tie-up card application to another card application, and authentication key data which is used for the above-described authentication processing, and the tie-up card application loads the card application plug-in data to carry out information collection from the card application and tie-up processing.

In addition, the tie-up coupon further includes terminal application plug-in data which enables mediation processing by a mobile terminal, of the tie-up card application and another card application in the above-described information collection and tie-up processing, and the tie-up card application transmits the terminal application plug-in data to a mobile terminal, and carries out information collection from another card application and tie-up processing, through the mobile terminal.

In addition, a secure device of the invention comprises a first card application utilizing a first interface, a second card application utilizing a second interface, and a tie-up card application which carries out tie-up processing of the first card application and the second card application conditional upon a content of information which the first card application holds or information which the second card application holds.

In addition, this tie-up card application incorporates a plurality of card applications for carrying out processing by use of different interfaces.

In addition, a secure device of the invention comprises a tie-up coupon in which a processing content of tie-up processing with a card application of another secure device and an execution condition of the tie-up processing are described, and a tie-up card application which carries out the tie-up processing with the card application of another secure device on the basis of the tie-up coupon, and the tie-up card application collects information which is stored in the above-described card application of another secure device, and judges whether it satisfies the above-described execution condition or not, and carries out the tie-up processing when the execution condition is satisfied.

In addition, a mobile terminal of the invention comprises a secure device, the secure device has a tie-up coupon in which a processing content of tie-up processing between card applications and an execution condition of the tie-up processing are described, a tie-up card application which carries out the tie-up processing between card applications on the basis of the tie-up coupon, and another card application, and the tie-up card application collects information which is stored in another card application through the mobile terminal, and judges whether it satisfies the above-described execution condition or not, and carries out the tie-up processing through the mobile terminal, when the execution condition is satisfied.

It is all right even if this secure device is a thing with the form of being loaded to a mobile terminal, or a thing which is embedded in a mobile terminal as a component.

In addition, the tie-up coupon includes card application plug-in data which defines authentication processing and data communication processing of the tie-up card application to another card application, authentication key data which is used for the above-described authentication processing, and terminal application plug-in data which enables an access of a mobile terminal to a card application, and when the tie-up card application loads the card application plug-in data to carry out information collection from another card application and tie-up processing, the mobile terminal loads the terminal application plug-in data to mediate the information collection and tie-up processing.

In addition, the mobile terminal contains a first secure device having the tie-up card application, and a second secure device having at least one of card applications with which the tie-up card application carries out tie-up processing.

In addition, the mobile terminal receives the tie-up coupon through a wireless network, and stores it in a secure device.

In addition, a tie-up coupon management server of the invention issues the tie-up coupon on which a processing content of tie-up processing between card applications and an execution condition of the tie-up processing are described, to a secure device which is loaded to a mobile terminal, through a wireless network.

A secure device of the invention can rapidly carry out the tie-up processing between card applications in an inside of a secure device. On that account, without adding a new function for realizing tie-up of services to an external device such as a POS terminal, which communicates with a secure device to carry out required processing, it is possible to incorporate services by each card application, at low cost.

In addition, a mobile terminal of the invention downloads the tie-up coupon in this secure device, and in addition, mediates data exchange of the tie-up card application and a card application, to support the tie-up processing between card applications.

DETAILED DESCRIPTION OF THE PREFERRED EMBODIMENTS

Hereinafter, an embodiment of the invention is described with reference to the drawings.

First Embodiment

An IC card in a first embodiment of the invention carries out data exchange between card applications, through a mobile terminal which holds it.

Figure 1:
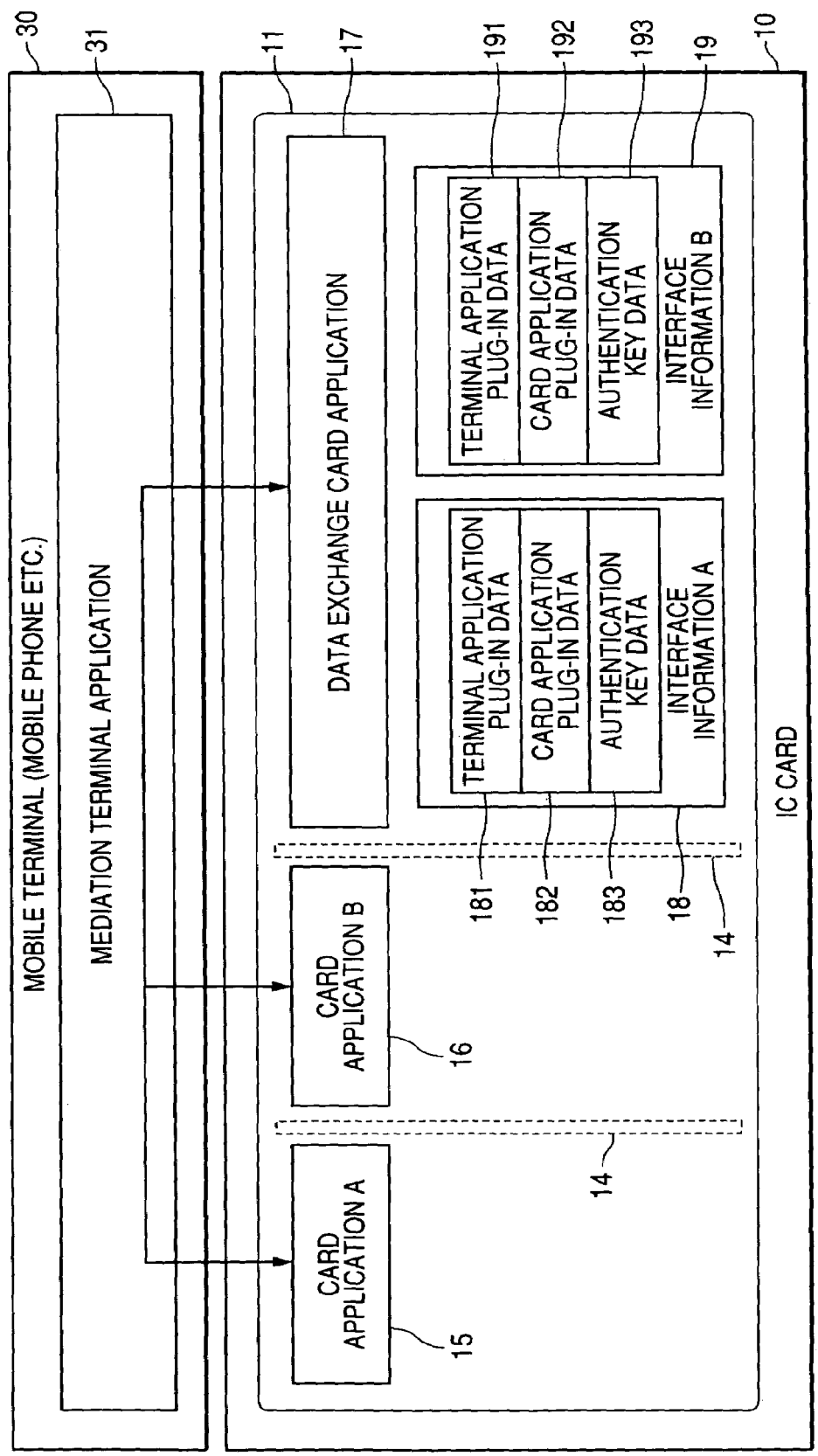
FIG. 1 is a block diagram illustrating a configuration of an IC card and a mobile terminal, in a first embodiment of the invention.

FIG. 1 shows a configuration of this IC card 10 and a mobile terminal 30 such as a mobile phone.

The IC card 10 is equipped with a host interface (host I/F, omitted in the figure) for communicating with a dedicated host terminal and the mobile terminal 30, and a tamper resistance module (TRM) 11 with high confidentiality, and TRM 11 has, in its inside, CPU for executing a card application, and a memory which stores the card application and various data. In TRM 11, a card OS, which corresponded to multi-task, is installed, and it is possible to carry out a plurality of card applications, and in addition, it is possible to maintain confidentiality of data which is stored in an internal memory. As for the host I/F, it is equipped with a contact interface or a non-contact interface, or both kinds of interfaces.

In the mobile terminal 30, a mediation terminal application 31 for mediating data exchange between card applications is installed.

In TRM 11 of the IC card 10, a card application A 15, a card application B 16, and a data exchange card application 17, which are isolated by a fire wall 14, are stored. The data exchange card application 17 carries out data exchange with the card application A 15 and the card application B 16, through the mediation terminal application 31.

Figure 19:
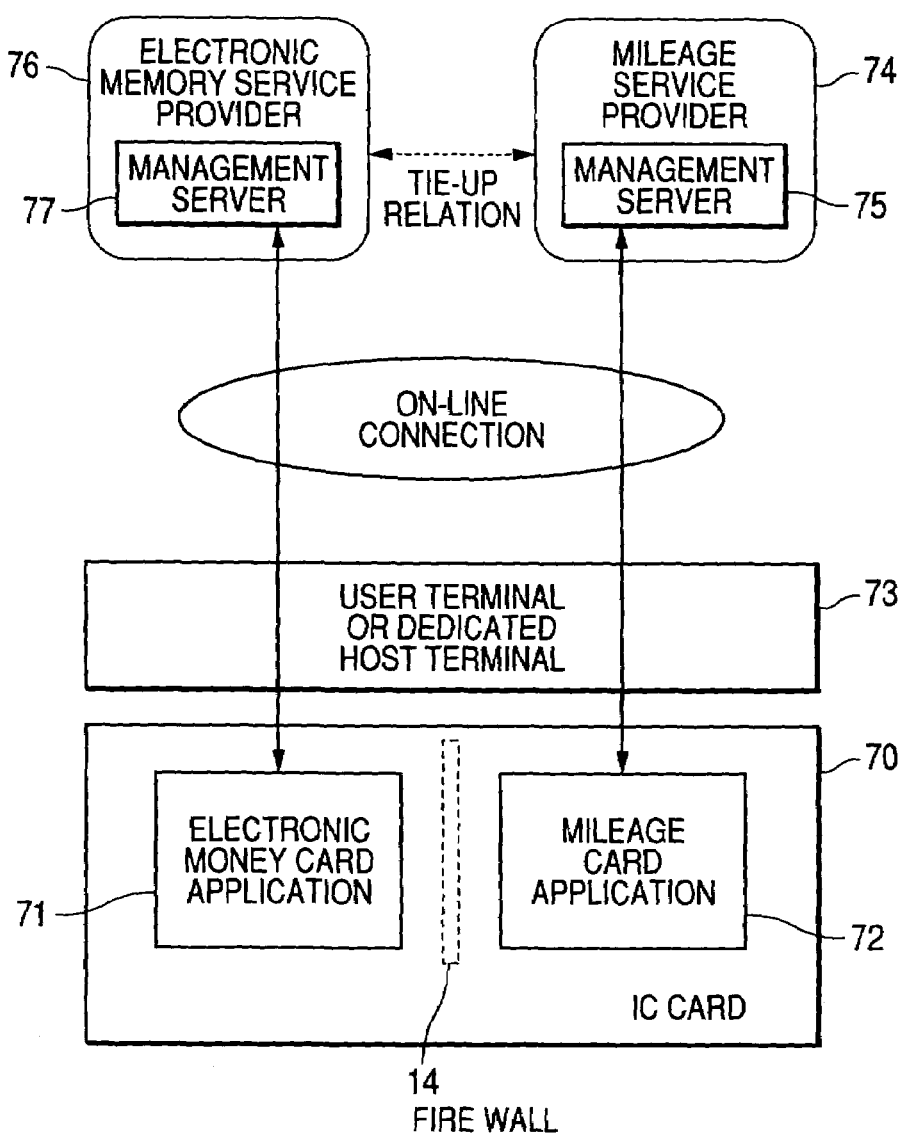
FIG. 19 is a schematic diagram illustrating a related data exchange system between card applications.

In addition, as data which the data exchange card application 17 manages, the internal memory of TRM 11 stores interface information A 18 for carrying out processing which is similar to authentication processing and data communication processing which a dedicated host terminal (e.g., 73 of FIG. 19) and a management server (e.g., 77 of FIG. 19) carry out with the card application A 15, and interface information B 19 for carrying out processing which is similar to authentication processing and data communication processing which a dedicated host terminal and a management server (e.g., 75 of FIG. 19) carry out with the card application B 16.

The interface information A 18 includes terminal application plug-in data 181 which is added to the mediation terminal application 31, card application plug-in data 182 which is added to the data exchange card application 17, in case that the data exchange card application 17 carries out data exchange with the card application A 15, and a group of key data (authentication key data) 183 which the data exchange card application 17 uses for authentication processing with the card application A 15.

The terminal application plug-in data 181 is information which is used for the mediation terminal application 31 to access to the card application A 15, and includes, as its content, information with such a range that even if it is spread out in a memory on the mobile terminal 30, there is no security problem. For example, it includes, as its content, application ID (AID) of the card application A 15, a group of APDU commands which specifies formats of a command and a response which are used for a communication with the card application A 15, and so on.

The card application plug-in data 182 is information which defines authentication processing and data exchange processing with the card application A 15, which the data exchange card application 17 carries out by use of the authentication key data 183.

In addition, the interface information B 19 includes, in the same manner, a terminal application plug-in data 191, card application plug-in data 192 and authentication key data 193, in such a case that the data exchange card application 17 carries out data exchange with the card application B 16.

For example, in case that a user carried out an operation for requesting processing which comes along with data exchange of the card application A 15 and the data exchange card application 17, in the mobile terminal 30, the terminal application plug-in data 181 is added to the mediation terminal application 31, and the mediation terminal application 31 mediates the card application A 15 and the data exchange card application 17. The data exchange card application 17 carries out authentication processing with the card application A 15, by use of the authentication key data 183, in accordance with the card application plug-in data 182, and after that, exchanges data with the card application A 15.

At this time, the card application A 15 carries out exactly the same operation as in the case of exchanging data with a dedicated host terminal. That is, it means that it is possible to use a related card application A as it is, without adding all changes.

Figure 2:
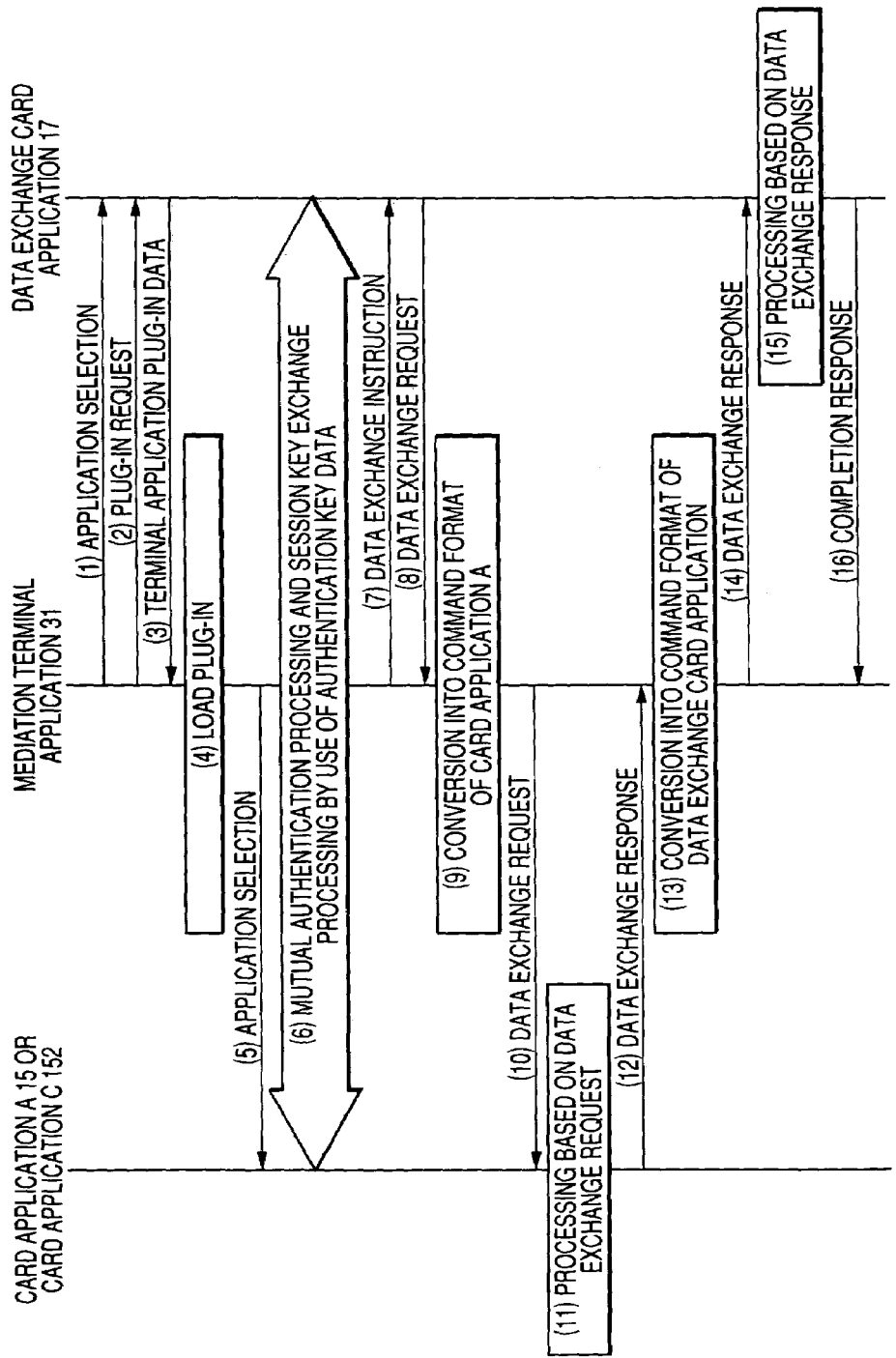
FIG. 2 is a sequence diagram illustrating data exchange procedures between card applications, in the first, second, and third embodiments of the invention.

FIG. 2 shows a sequence in this case.

When a user carries out an operation for requesting processing which comes along with data exchange with the card application A 15 and the data exchange card application 17, in the mobile terminal 30, the mediation terminal application 31 selects the data exchange card application 17 as one of data mediation (1), and requests the terminal application plug-in data 181 (2). The data exchange card application 17 sends the terminal application plug-in data 181, which is included in the interface information A 18 of the card application A15, to the mediation terminal application 31 (3), and the mediation terminal application loads the terminal application plug-in data 181 which is received (4). The mediation terminal application 31 selects the card application A 15, as the other of data mediation, by use of AID of the card application A 15 which is included in the terminal application plug-in data 181 (5).

Figure 3:
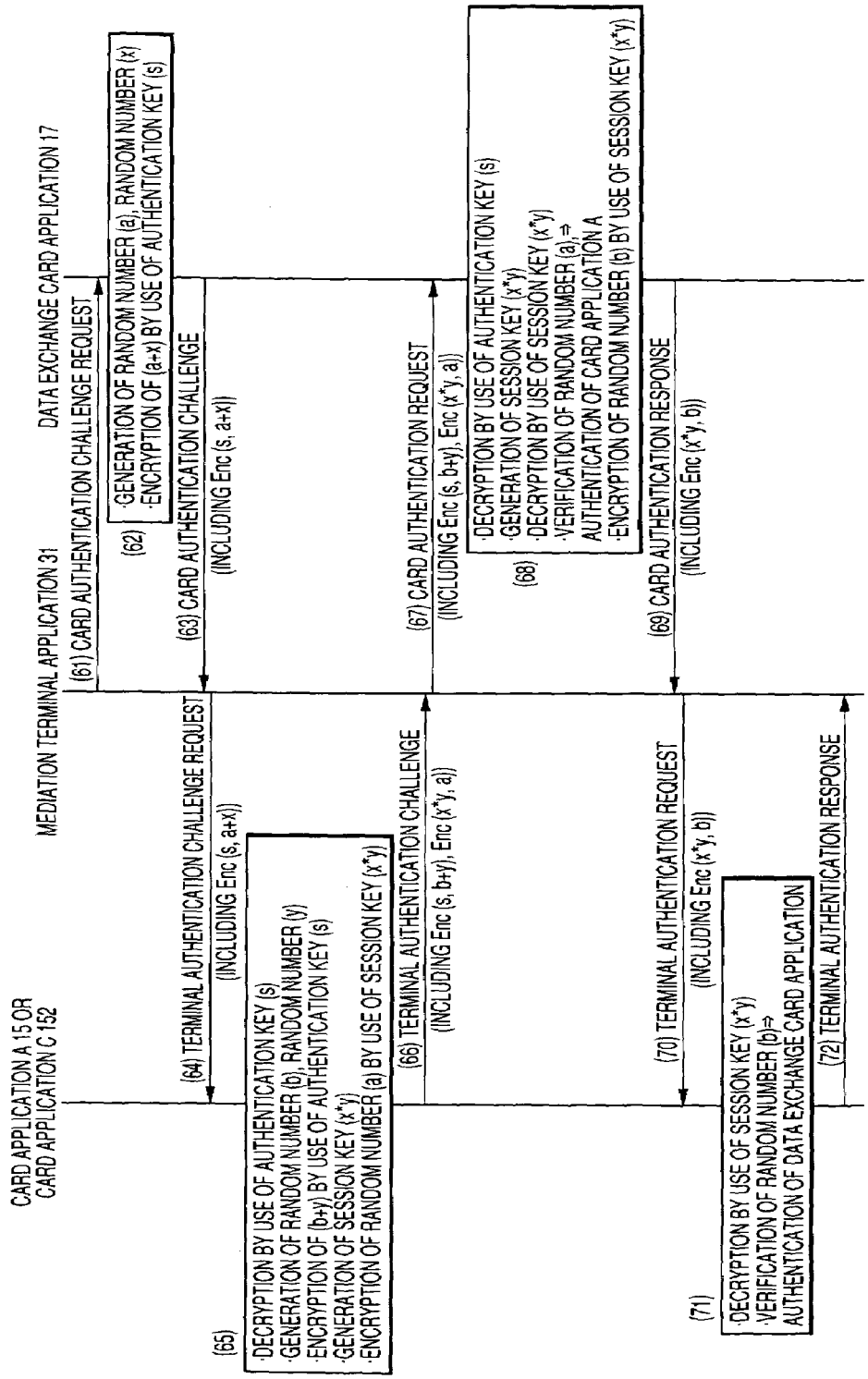
FIG. 3 is a sequence diagram illustrating mutual authentication procedures between card applications, in the first, second, and third embodiments of the invention.

The data exchange card application carries out mutual authentication processing with the card application A 15, by use of the authentication key data 183, on the basis of the card application plug-in data 182, and exchange a session key which is used as an encryption key of data exchange (6). FIG. 3 shows, as one of this mutual authentication processing, procedures based upon such a well-known system that the data exchange card application and the card application A 15, which have an authentication key s in common, carry out mutual authentication by a challenge response system, and exchange a session key (x*y). Here, + of (a+x), (a+y) is to mean data coupling, and * of (x*y) is to mean exclusive OR, respectively. The mediation terminal application 31 converts a command to be sent to the data exchange card application 17 and the card application A 15, into a command format of a destination, during a period of this processing, and then, transmits it. Meanwhile, FIG. 3 shows about mutual authentication processing of a common key encryption system which used the common authentication key s, but mutual authentication processing between the data exchange card application and the card application A is not limited to this system, and it is also all right even if mutual authentication processing based on a well-known system such as mutual authentication processing of an public key encryption system and mutual authentication processing which used both encryption systems of the common key and the public key is carried out.

When mutual authentication processing of the data exchange card application and the card application A 15 and exchange processing of the session key are completed, the mediation terminal application instructs data exchange to the data exchange card application (7), and the data exchange card application 17 transmits a data exchange request message to the card application A 15, which is encrypted by the session key (8). The mediation terminal application 31 converts this into a command format of the card application A 15 (9), and sends it to the card application A 15 (10). The card application A 15 carries out processing based upon a data exchange request (11), and sends a data exchange response message which is encrypted by the session key, to the mediation terminal application (12), and the mediation terminal application converts this into a command format of the data exchange card application (13), and transmits it to the data exchange card application (14). The data exchange card application carries out processing based on a data exchange response (15), and when the processing is completed, returns a completion response to the mediation terminal application 31 (16).

A sequence of FIG. 2 shows such a case that the data exchange card application 17 transmits the data exchange request message one time to the data exchange instruction (7), but it is also all right even if the data exchange request message is transmitted a plurality of times, in accordance with a content of the data exchange instruction (7), and execution of read and write of a file, and a command other than it, is requested to the card application A 15.

In addition, in the sequence of FIG. 2, after the mutual authentication processing and the exchange processing of the session key are completed, the mediation terminal application transmits the data exchange instruction (7) to the data exchange card application 17, but it is also all right even if the data exchange card application 17 carries out the mutual authentication processing with the card application A 15 and the exchange processing of the session key, and furthermore, the data exchange processing, as a series of processing, to the data exchange instruction (7) from the mediation terminal application.

The card application A 15 and the interface information A 18, or the card application B 16 and the interface information B 19, which are stored in the IC card 10, are provided from a card application issuance entity and a data exchange card application issuance entity.

Figure 4:
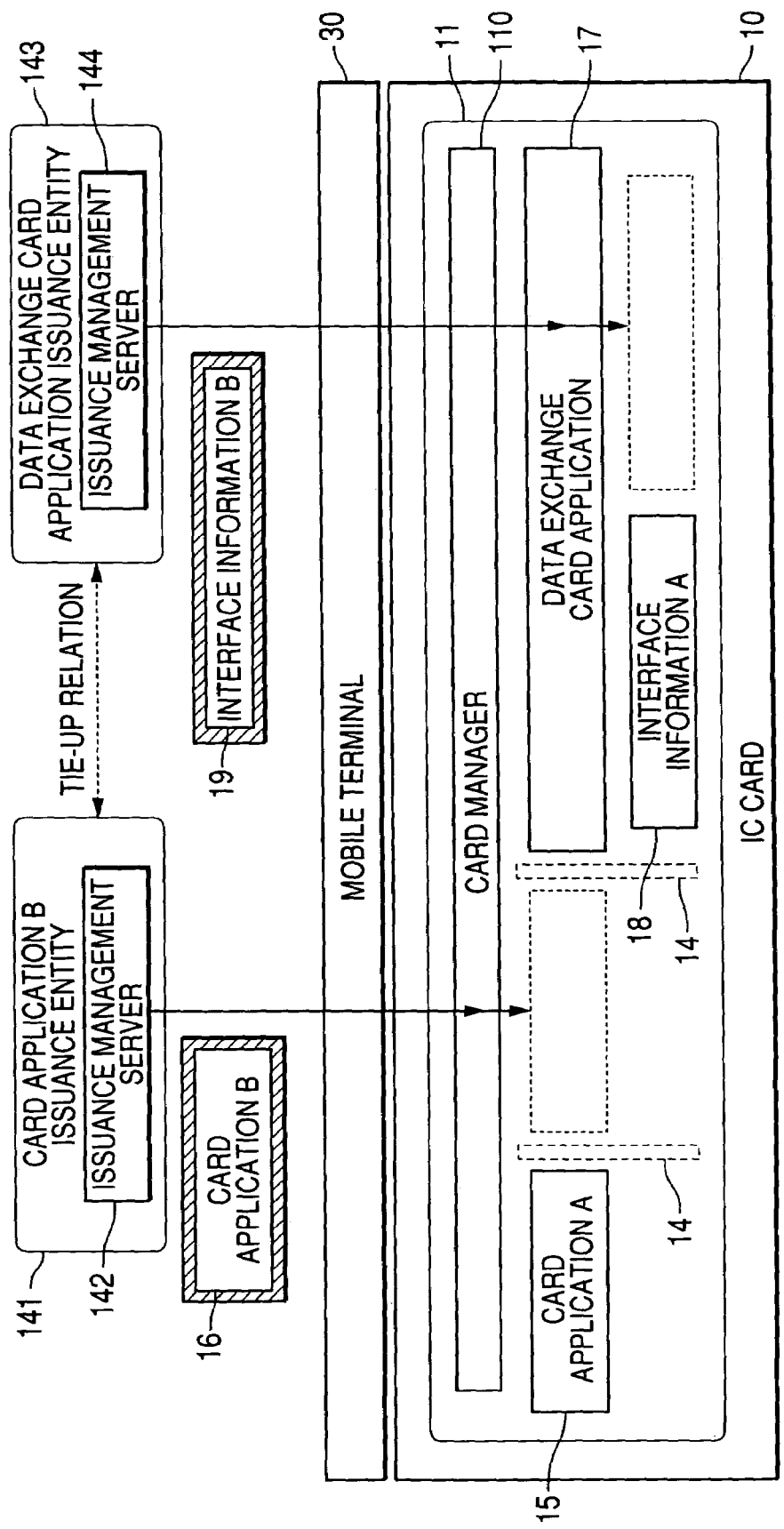
FIG. 4 is a schematic diagram illustrating download of a card application and interface information, in the first embodiment of the invention.

FIG. 4 schematically shows such a case that the card application B 16 and the interface information B 19 are newly downloaded in the IC card 10.

The card application B 16 is downloaded in the IC card 10 through the mobile terminal 30 from a issuance management server 142 of a card application B issuance entity 141, in an encrypted state, and is decrypted and its electronic signature is verified by a card manager 110 which manages a card application on the IC card 10, and is registered as a card application. In addition, the interface information B 19 is downloaded in the IC card 10 through the mobile terminal 30 from a issuance management server 144 of a data exchange card application issuance entity 143 which has an alliance with the card application B issuance entity 141 in an encrypted state, and is decrypted and its electronic signature is verified by the data exchange card application 17, and is registered as interface information with the card application B 16.

There is not necessarily such a necessity that download of interface information is carried out around the same time as download of a corresponding card application, and it is also all right even if only the interface information is downloaded at a later time. For example, such a case that a user of the IC card 10, who has already utilized a service provided by the card application B 16, newly entered into a contract of such a service that the card application B 16 carries out data exchange with another card application falls under its category, and a user of the IC card 10 is not required to carry out update of the card application B 16, and is allowed to be able to utilize such a service that the card application B 16 carries out data exchange with another card service, by downloading only the interface information B 19 from the issuance management server 144.

In addition, in the foregoing, a mode of using the IC card 10 by loading it on the mobile terminal 30 is explained, but it is also all right even if it is such an embodiment that a secure device, which has a similar function to that of the IC card 10, is emedded in a mobile terminal.

In addition, in the foregoing, it is explained that the mediation terminal application 31 of the mobile terminal 30 carries out conversion of command formats between card applications between which data exchange is carried out, but it is also all right even if information such as an APDU command for specifying a format of a command and a response of a card application which carries out data exchange, which is incorporated in the terminal application plug-in data, is incorporated in the card application plug-in data, and thereby, the data exchange card application 17 generates the APDU command to be transmitted to a card application with which the mediation terminal application 31 carries out data exchange, and the data exchange card application 17 interprets a response from the card application, which responds to it, as it is. In this case, communication control in handing-over of data with a card application and the data exchange card application 17, which carry out data exchange, and provision of a user interface such as screen display in the mobile terminal 30, which comes along with it are a role of the mediation terminal application 31.

Second Embodiment

A second embodiment of the invention is a thing which used a mobile EC card in which an internal memory has large storage capacity, as a secure device, in lieu of the IC card in the first embodiment, and data exchange between card applications is carried out through a mobile terminal which holds this mobile EC card.

Figure 5:
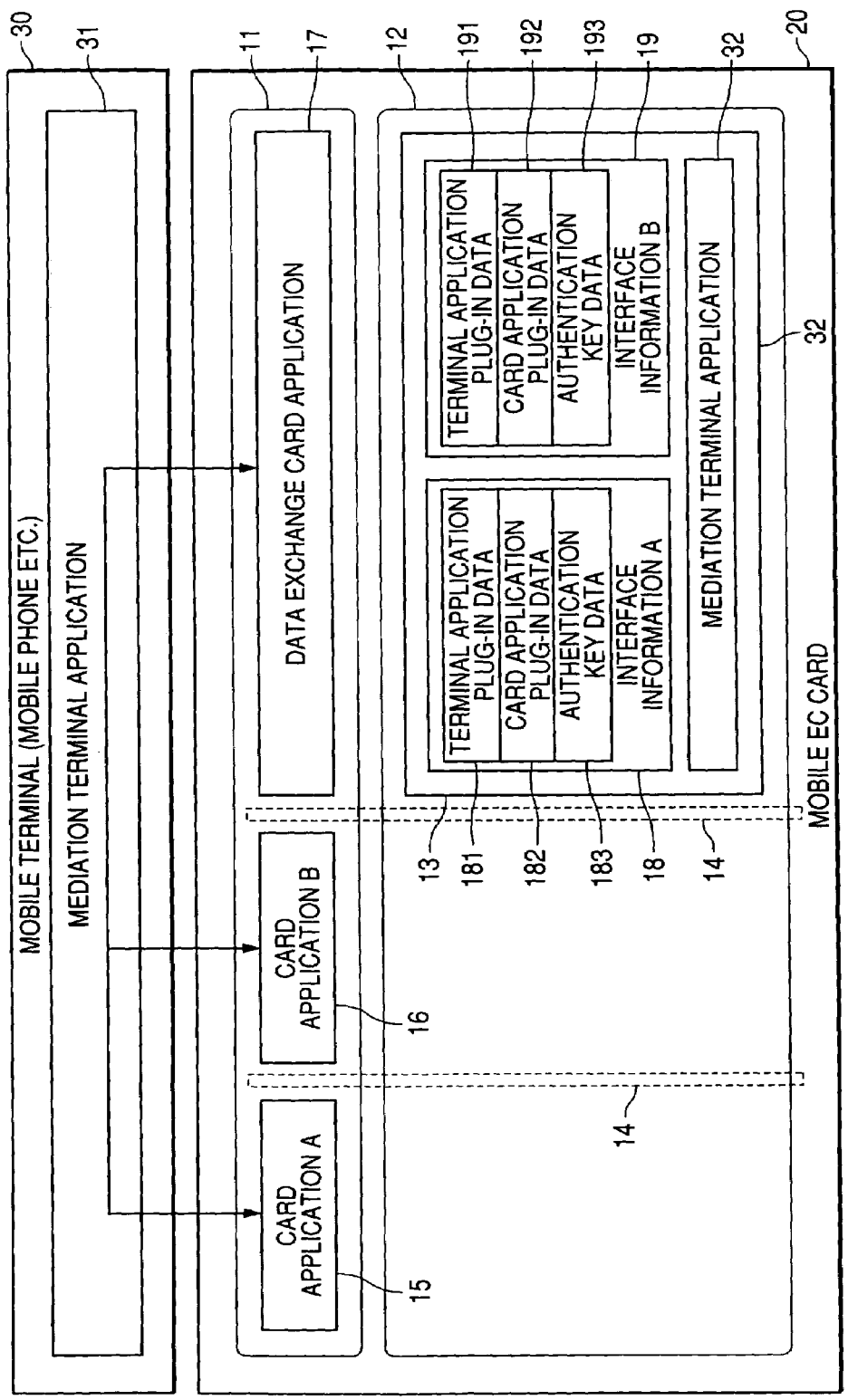
FIG. 5 is a block diagram illustrating a configuration of a mobile EC card and a mobile terminal, in the second embodiment of the invention.

FIG. 5 shows a configuration of this mobile EC card 20, and a mobile terminal 30 such as a mobile phone.

The mobile EC card 20 is equipped with a host interface (host I/F, omitted in the figure) for communicating with a dedicated host terminal and the mobile terminal 30, a tamper resistance module (TRM) 11 with high confidentiality, and a flash memory 12 with large storage capacity, and it is possible to set up a secure flash memory area, which has confidentiality pursuant to TRM, in the flash memory 12, with respect to each card application. TRM 11 has, in its inside, CPU for executing a card application, and a memory which stores the card application. In TRM 11, a card OS, which corresponded to multi-task, is installed, and it is possible to carry out a plurality of card applications, and in addition, data of each secure flash memory area is managed in such a manner that only a corresponding card application of TRM 11 can access to it, and therefore, in the secure flash memory area, confidentiality pursuant to TRM 11 is maintained. As for the host I/F, it is equipped with a contact interface or a non-contact interface, or both kinds of interfaces.

In the mobile terminal 30, a mediation terminal application 31 for mediating data exchange between card applications is installed.

In TRM 11 of the mobile EC card 20, a card application A 15, a card application B 16, and a data exchange card application 17, which are isolated by a fire wall 14, are stored. The data exchange card application 17 carries out data exchange with the card application A 15 and the card application B 16, through the mediation terminal application 31.

In addition, the secure flash memory area 13, which the data exchange card application 17 manages, stores interface information A 18 for carrying out processing which is similar to authentication processing and data communication processing which a dedicated host terminal (e.g., 73 of FIG. 19) and a management server (e.g., 77 of FIG. 19) carry out with the card application A 15, and interface information B 19 for carrying out processing which is similar to authentication processing and data communication processing which a dedicated host terminal and a management server (e.g., 75 of FIG. 19) carry out with the card application B 16.

The interface information A 18 includes terminal application plug-in data 181 which is added to the mediation terminal application 31, card application plug-in data 182 which is added to the data exchange card application 17, in case that the data exchange card application 17 carries out data exchange with the card application A 15, and a group of key data (authentication key data) 183 which the data exchange card application 17 uses for authentication processing with the card application A 15.

The terminal application plug-in data 181 is information which is used for the mediation terminal application 31 to access to the card application A 15, and includes, as its content, information with such a range that even if it is spread out in a memory on the mobile terminal 30, there is no security problem. For example, it includes, as its content, application ID (AID) of the card application A 15, a group of APDU commands which specifies formats of a command and a response which are used for a communication with the card application A 15, and so on.

The card application plug-in data 182 is information which defines authentication processing and data exchange processing with the card application A 15, which the data exchange card application 17 carries out by use of the authentication key data 183.

In addition, the interface information B 19 includes, in the same manner, a terminal application plug-in data 191, card application plug-in data 192 and authentication key data 193, in such a case that the data exchange card application 17 carries out data exchange with the card application B 16.

For example, in case that a user carried out an operation for requesting processing which comes along with data exchange of the card application A 15 and the data exchange card application 17, in the mobile terminal 30, the terminal application plug-in data 181 is added to the mediation terminal application 31, and the mediation terminal application 31 mediates the card application A 15 and the data exchange card application 17. The data exchange card application 17 carries out authentication processing with the card application A 15, by use of the authentication key data 183, in accordance with the card application plug-in data 182, and after that, exchanges data with the card application A 15.

At this time, the card application A 15 carries out exactly the same operation as in the case of exchanging data with a dedicated host terminal. That is, it means that it is possible to use a related card application A as it is, without adding all changes.

A basic sequence in this case is the same as the case of the first embodiment, and becomes as shown in FIG. 2.

When a user carries out an operation for requesting processing which comes along with data exchange of the card application A 15 and the data exchange card application 17, in the mobile terminal 30, the mediation terminal application 31 selects the data exchange card application 17 as one of data mediation (1), and requests the terminal application plug-in data 181 (2). The data exchange card application 17 reads out the terminal application plug-in data 181, which is included in the interface information A 18 of the card application A 15 from the secure flash memory area 13, and sends it to the mediation terminal application 31 (3), and the mediation terminal application loads the terminal application plug-in data 181 which is received (4). The mediation terminal application 31 selects the card application A 15, as the other of data mediation, by use of AID of the card application A 15 which is included in the terminal application plug-in data 181 (5).

The data exchange card application carries out mutual authentication processing with the card application A 15, by use of the authentication key data 183, on the basis of the card application plug-in data 182 which is read out from the secure flash memory area 13, and exchange a session key which is used as an encryption key of data exchange (6). The mutual authentication processing and exchange processing of the session key at this time, as shown in FIG. 3, carry out processing which is similar to the case of the first embodiment.

When mutual authentication processing of the data exchange card application and the card application A 15 and exchange processing of the session key are completed, the mediation terminal application instructs data exchange to the data exchange card application (7), and the data exchange card application 17 transmits a data exchange request message to the card application A 15, which is encrypted by the session key (8). The mediation terminal application 31 converts this into a command format of the card application A 15 (9), and sends it to the card application A 15 (10). The card application A 15 carries out processing based upon a data exchange request (11), and sends a data exchange response message which is encrypted by the session key, to the mediation terminal application (12), and the mediation terminal application converts this into a command format of the data exchange card application (13), and transmits it to the data exchange card application (14). The data exchange card application carries out processing based on a data exchange response (15), and when the processing is completed, returns a completion response to the mediation terminal application 31 (16).

A sequence of FIG. 2 shows such a case that the data exchange card application 17 transmits the data exchange request message one time to the data exchange instruction (7), but it is also all right even if the data exchange request message is transmitted a plurality of times, in accordance to a content of the data exchange instruction (7), and execution of read and write of a file, and a command other than it, is requested to the card application A 15.

In addition, in the sequence of FIG. 2, after the mutual authentication processing and the exchange processing of the session key are completed, the mediation terminal application transmits the data exchange instruction (7) to the data exchange card application 17, but it is also all right even if the data exchange card application 17 carries out the mutual authentication processing with the card application A 15 and the exchange processing of the session key, and furthermore, the data exchange processing, as a series of processing, to the data exchange instruction (7) from the mediation terminal application.

In the same manner as in the case of the first embodiment, the card application A 15 and the interface information A 18, or the card application B 16 and the interface information B 19, which are stored in the mobile EC card 20, are provided from a card application issuance entity and a data exchange card application issuance entity.

Figure 6:
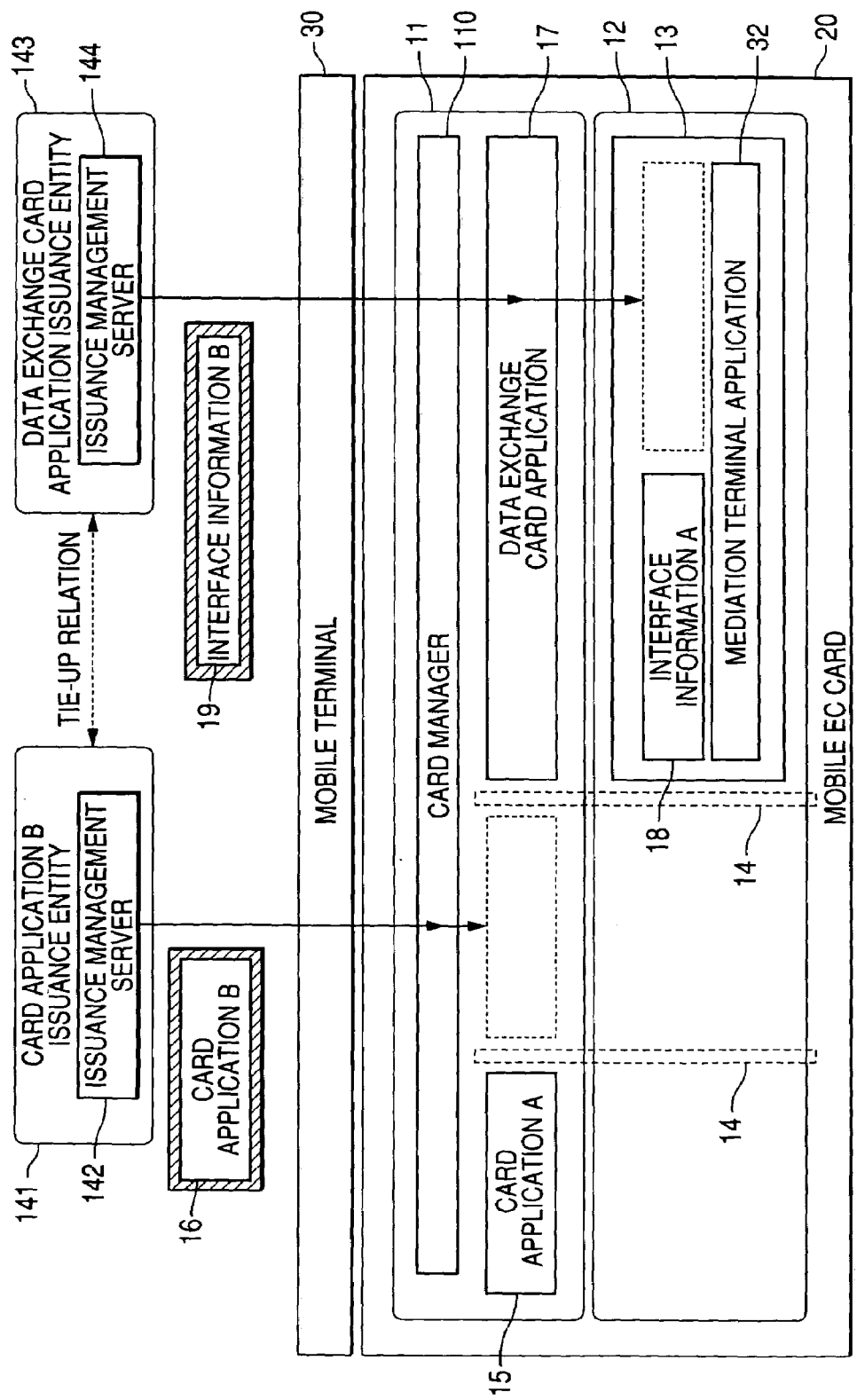
FIG. 6 is a schematic diagram illustrating download of a card application and interface information, in the second embodiment of the invention.

FIG. 6 schematically shows such a case that the card application B 16 and the interface information B 19 are newly downloaded in the mobile EC card 10.

The card application B 16 is downloaded in the mobile EC card 20 through the mobile terminal 30 from a issuance management server 142 of a card application B issuance entity 141, in an encrypted state, and is decrypted and its electronic signature is verified by a card manager 110 which manages a card application on the mobile EC card 20, and is registered as a card application. In addition, the interface information B 19 is downloaded in the mobile EC card 20 through the mobile terminal 30 from a issuance management server 144 of a data exchange card application issuance entity 143 which has an alliance with the card application B issuance entity 141 in an encrypted state, and is decrypted and its electronic signature is verified by the data exchange card application 17, and is stored in the secure flash memory area 13, and is registered as interface information with the card application B 16.

In case of the mobile EC card 20, it is possible to set up an extremely large secure flash memory area 13 as a memory area of confidentiality, as compared with commonly used IC cards, and therefore, it is possible to store interface information to large numbers of card applications, and in addition, it is possible to store interface information with large data capacity, which defied complex data exchange processing.

In addition, there is not necessarily such a necessity that download of interface information is carried out around the same time as download of a corresponding card application, and it is also all right even if only the interface information is downloaded at a later time. For example, such a case that a user of the IC card 10, who has already utilized a service provided by the card application B 16, newly entered into a contract of such a service that the card application B 16 carries out data exchange with another card application falls under its category, and a user of the IC card 10 is not required to carry out update of the card application B 16, and is allowed to be able to utilize such a service that the card application B 16 carries out data exchange with another card service, by downloading only the interface information B 19 from the issuance management server 144.

In addition, in the foregoing, a mode of using the mobile EC card 20 by loading it on the mobile terminal 30 is explained, but it is also all right even if it is such an embodiment that a secure device, which has a similar function to that of the mobile EC card 20, is embedded in a mobile terminal, as a component.

In addition, in the foregoing, it is explained that the mediation terminal application 31 of the mobile terminal 30 carries out conversion of command formats between card applications between which data exchange is carried out, but it is also all right even if information such as an APDU command for specifying a format of a command and a response of a card application which carries out data exchange, which is incorporated in the terminal application plug-in data, is incorporated in the card application plug-in data, and thereby, the data exchange card application 17 generates the APDU command to be transmitted to a card application with which the mediation terminal application 31 carries out data exchange, and the data exchange card application 17 interprets a response from the card application, which responds to it, as it is. In this case, communication control in handing-over of data with a card application and the data exchange card application 17, which carry out data exchange, and provision of a user interface such as screen display in the mobile terminal 30, which comes along with it are a role of the mediation terminal application 31.

In addition, in the foregoing, it is explained that the mediation terminal application 31 is installed in the mobile terminal 30, but it is also all right even if a code of the mediation terminal application (mediation terminal application 32) is stored in the secure flash memory area 13, and on the occasion of carrying out data exchange processing with another card application, the data exchange card application 17 embeds authentication information in the mediation terminal application 32 and transmits it to the mobile terminal 30 side. In this case, by firstly carrying out such processing that the data exchange card application 17 verifies the mediation terminal application, which is activated on the mobile terminal, by use of the embedded authentication information, it is possible to improve safety. In addition, furthermore, it is also all right even if the data exchange card application embeds terminal application plug-in data, which corresponds to a card application with which data exchange is carried out, to the mediation terminal application 32, besides the authentication information, and transmits it to the mobile terminal 30 side. In this case, by firstly carrying out such processing that the data exchange card application 17 verifies the mediation terminal application which is activated on the mobile terminal (authentication information and terminal application plug-in data are embedded), by use of the embedded authentication information, it is further possible to improve safety.

Third Embodiment

A third embodiment of the invention is a thing which is configured so as to carry out data exchange between card applications of different secure devices, by use of a similar system to the system of data exchange between card applications, which is shown in the first and second embodiments.

Figure 7:
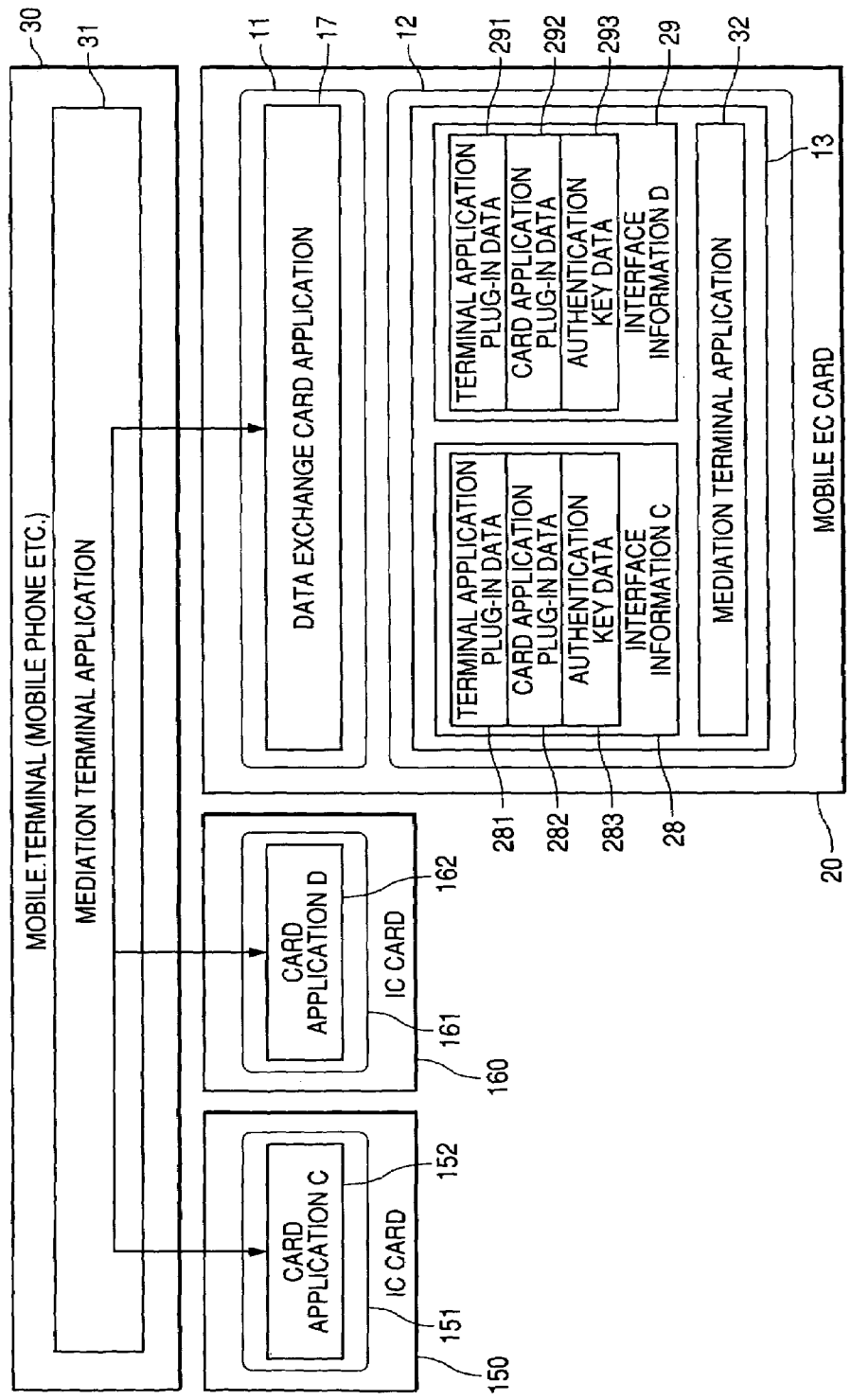
FIG. 7 is a block diagram illustrating a configuration of a mobile EC card and a mobile terminal, in the third embodiment of the invention.

FIG. 7 shows a configuration of a mobile EC card 20 and an IC card 150, an IC card 160, and a mobile terminal 30 which mediates data exchange, as different secure devices which carry out data exchange.

In the same manner as in the case of the second embodiment, a mediation terminal application 31, which mediates data exchange between card applications, is installed in the mobile terminal 30.

TRM 151 of the IC card 150 stores a card application C 152, and TRM 161 of the IC card 160 stores a card application D 162, respectively, and TRM 11 of the mobile card EC card 20 stores a data exchange card application 17. The data exchange card application 17 carries out data exchange with the card application C 152 and the card application D 162 through the mediation terminal application 31.

In addition, the secure flash memory area 13, which the data exchange card application 17 manages, stores interface information C 28 for carrying out processing which is similar to authentication processing and data communication processing which a dedicated host terminal (e.g., 73 of FIG. 19) and a management server (e.g., 77 of FIG. 19) carry out with the card application C 152, and interface information D 29 for carrying out processing which is similar to authentication processing and data communication processing which a dedicated host terminal and a management server (e.g., 75 of FIG. 19) carry out with the card application D 162.

The interface information C 28 includes terminal application plug-in data 281 which is added to the mediation terminal application 31, card application plug-in data 282 which is added to the data exchange card application 17, in case that the data exchange card application 17 carries out data exchange with the card application C 152, and a group of key data (authentication key data) 283 which the data exchange card application 17 uses for authentication processing with the card application C 152.

The terminal application plug-in data 281 is information which is used for the mediation terminal application 31 to access to the card application C 152, and includes, as its content, information with such a range that even if it is spread out in a memory on the mobile terminal 30, there is no security problem. For example, it includes, as its content, application ID (AID) of the card application C 152, a group of APDU commands which specifies formats of a command and a response which are used for a communication with the card application C 152, and so on.

The card application plug-in data 282 is information which defines authentication processing and data exchange processing with the card application C 152, which the data exchange card application 17 carries out by use of the authentication key data 283.

In addition, the interface information D 29 includes, in the same manner, a terminal application plug-in data 291, card application plug-in data 292 and authentication exchange with the card application D 162.

For example, in case that a user carried out an operation for requesting processing which comes along with data exchange of the card application C 152 and the data exchange card application 17, in the mobile terminal 30, the terminal application plug-in data 281 is added to the mediation terminal application 31, and the mediation terminal card application C 152, by use of the authentication key data 283, in accordance with the card application plug-in data 282, and after that, exchanges data with the card application C 152.

At this time, the card application C 152 carries out exactly the same operation as in the case of exchanging data with a dedicated host terminal. That is, it means that it is possible to use a related card application C as it is, without adding all changes.

A basic sequence in this case is the same as the case of the second embodiment, and becomes as shown in FIG. 2.

When a user carries out an operation for requesting processing which comes along with data exchange of the card application C 152 of the IC card 150 and the data exchange terminal application 31 selects the data exchange card application 17 of the mobile EC card 20 as one of data mediation (1), and requests the terminal application plug-in data 181 (2). The data exchange card application 17 reads out the terminal application plug-in data 281, which is included in the interface information C 28 of the card application C 152, from the secure flash memory area 13, and sends it to the mediation terminal application 31 (3), and the mediation terminal application loads the terminal application plug-in data 281 which is received (4). The mediation terminal application 31 selects the card application C 152 of the IC card 150, as the other of data mediation, by use of AID of the card application C 152 which is included in the terminal application plug-in data 281 (5).

The data exchange card application carries out mutual authentication processing with the card application C 152, by use of the authentication key data 283, on the basis of the card application plug-in data 282 which is read out from the secure flash memory area 13, and exchange a session key which is used as an encryption key of data exchange (6). The mutual authentication processing and exchange processing of the session key at this time, as shown in FIG. 3, carry out processing which is similar to the case of the second embodiment.

When mutual authentication processing of the data exchange card application and the card application C 152 and exchange processing of the session key are completed, the mediation terminal application instructs data exchange to the data exchange card application (7), and the data exchange card application 17 transmits a data exchange request message to the card application C 152, which is encrypted by the session key (8). The mediation terminal application 31 converts this into a command format of the card application C 152 (9), and sends it to the card application C 152 (10). The card application C 152 carries out processing based upon a data exchange request (11), and sends a data exchange response message which is encrypted by the session key, to the mediation terminal application (12), and the mediation terminal application converts this into a command format of the data exchange card application (13), and transmits it to the data exchange card application (14). The data exchange card application carries out processing based on a data exchange response (15), and when the processing is completed, returns a completion response to the mediation terminal application 31 (16).

A sequence of FIG. 2 shows such a case that the data exchange card application 17 transmits the data exchange request message one time to the data exchange instruction (7), but it is also all right even if the data exchange request message is transmitted a plurality of times, in accordance to a content of the data exchange instruction (7), and execution of read and write of a file, and a command other than it, is requested to the card application C 152.

In addition, in the sequence of FIG. 2, after the mutual authentication processing and the exchange processing of the session key are completed, the mediation terminal application transmits the data exchange instruction (7) to the data exchange card application 17, but it is also all right even if the data exchange card application 17 carries out the mutual authentication processing with the card application C 152 and the exchange processing of the session key, and furthermore, the data exchange processing, as a series of processing, to the data exchange instruction (7) from the mediation terminal application.

In the same manner as in the case of the second embodiment, the card application C 152 which is stored in the IC card 150 and the interface information C 28 which is stored in the mobile EC card 20, or the card application D 162 which is stored in the IC card 160 and the interface information D 29 which is stored in the mobile EC card 20, are provided from a card application issuance entity and a data exchange card application issuance entity.

Figure 8:
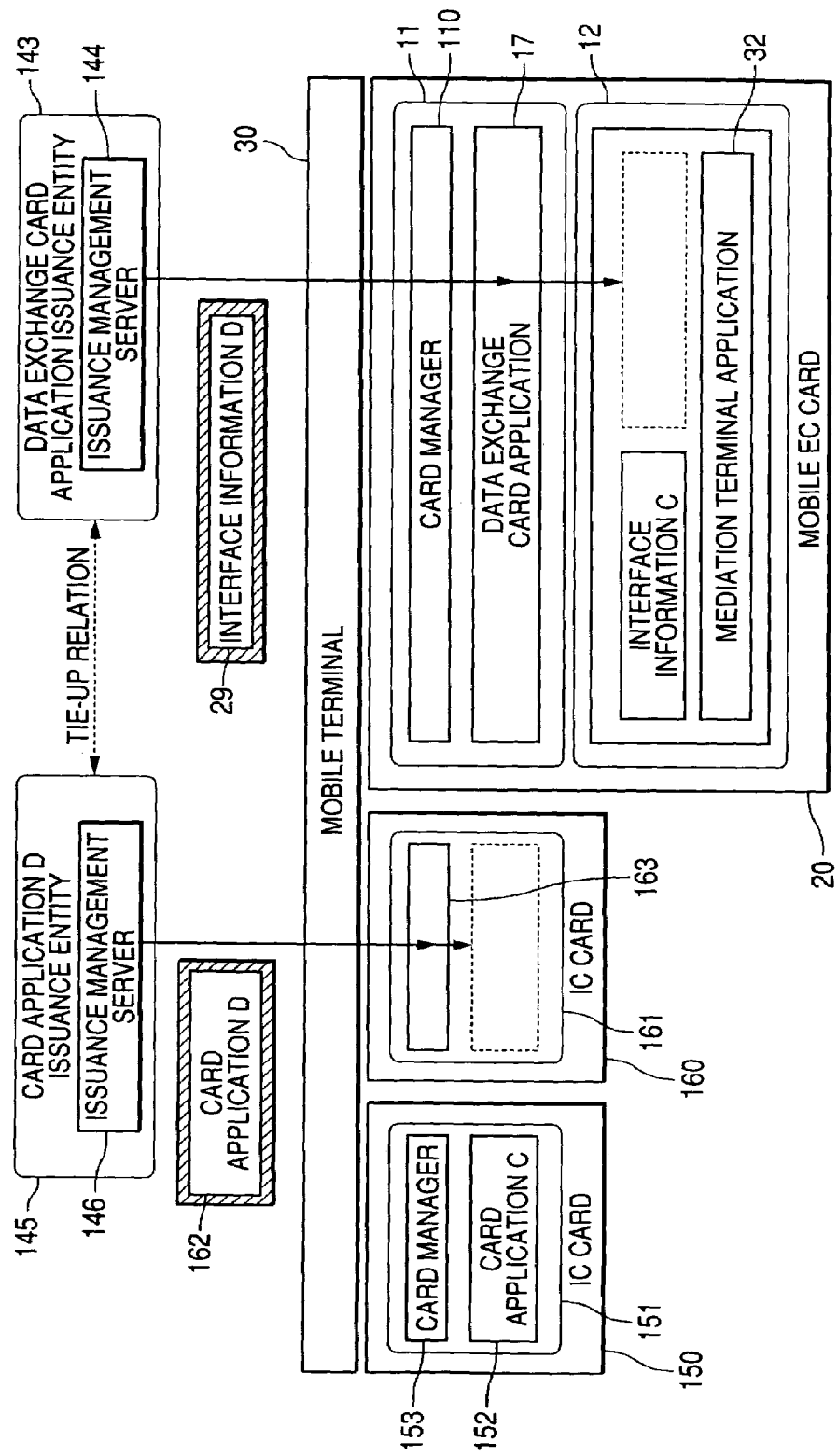
FIG. 8 is a schematic diagram illustrating download of a card application and interface information, in the third embodiment of the invention.

FIG. 8 schematically show such a case that the card application D 162 is newly downloaded in the IC card 160, and the interface information D 29 is newly downloaded in the mobile EC card 20, respectively.

The card application D 162 is downloaded in the IC card 160 through the mobile terminal 30 from a issuance management server 146 of a card application D issuance entity 145, in an encrypted state, and is decrypted and its electronic signature is verified by a card manager 163 which manages a card application on the IC card 160, and is registered as a card application. In addition, the interface information D 29 is downloaded in the mobile EC card 20 through the mobile terminal 30 from a issuance management server 144 of a data exchange card application issuance entity 143 which has an alliance with the card application D issuance entity 145 in an encrypted state, and is decrypted and its electronic signature is verified by the data exchange card application 17, and is stored in the secure flash memory area 13, and is registered as interface information with the card application D 162.

In case of the mobile EC card 20, it is possible to set up an extremely large secure flash memory area 13 as a memory area of confidentiality, as compared with commonly used IC cards, and therefore, it is possible to store interface information to large numbers of card applications, and in addition, it is possible to store interface information with large data capacity, which defied complex data exchange processing.

In addition, there is not necessarily such a necessity that download of interface information is carried out around the same time as download of a corresponding card application, and it is also all right even if only the interface information is downloaded at a later time. For example, such a case that a user of the IC card 160, who has already utilized a service provided by the card application D 162, newly entered into a contract of such a service that the card application D 162 carries out data exchange with another card application falls under its category, and a user of the IC card 160 is not required to carry out update of the card application D 162, and is allowed to be able to utilize such a service that the card application D 162 carries out data exchange with another card service, by downloading only the interface information D 29 from the issuance management server 144.

In addition, in the foregoing, a mode of using the IC card 150, the IC card 160, and the mobile EC card 20 by loading them on the mobile terminal 30 is explained, but it is also all right even if it is such an embodiment that a secure device, which has a similar function to that of the IC card 150, the IC card 160, and the mobile EC card 20, is embedded in a mobile terminal, as a component.

In addition, in the foregoing, it is explained that the mediation terminal application 31 of the mobile terminal 30 carries out conversion of command formats between card applications between which data exchange is carried out, but it is also all right even if information such as an APDU command for specifying a format of a command and a response of a card application which carries out data exchange, which is incorporated in the terminal application plug-in data, is incorporated in the card application plug-in data, and thereby, the data exchange card application 17 generates the APDU command to be transmitted to a card application with which the mediation terminal application 31 carries out data exchange, and the data exchange card application 17 interprets a response from the card application, which responds to it, as it is. In this case, communication control in handing-over of data with a card application and the data exchange card application 17, which carry out data exchange, and provision of a user interface such as screen display in the mobile terminal 30, which comes along with it are a role of the mediation terminal application 31.

In addition, in the foregoing, it is explained that the mediation terminal application 31 is installed in the mobile terminal 30, but it is also all right even if a code of the mediation terminal application (mediation terminal application 32) is stored in the secure flash memory area 13, and on the occasion of carrying out data exchange processing with another card application, the data exchange card application 17 embeds authentication information in the mediation terminal application 32 and transmits it to the mobile terminal 30 side. In this case, by firstly carrying out such processing that the data exchange card application 17 verifies the mediation terminal application, which is activated on the mobile terminal, by use of the embedded authentication information, it is possible to improve safety. In addition, furthermore, it is also all right even if the data exchange card application 17 embeds terminal application plug-in data, which corresponds to a card application with which data exchange is carried out, to the mediation terminal application 32, besides the authentication information, and transmits it to the mobile terminal 30 side. In this case, by firstly carrying out such processing that the data exchange card application 17 verifies the mediation terminal application which is activated on the mobile terminal (authentication information and terminal application plug-in data are embedded), by use of the embedded authentication information, it is further possible to improve safety.

Fourth Embodiment

An IC card in a fourth embodiment of the invention utilizes a sharable interface for data exchange between card applications.

The sharable interface is an interface which is disposed so as to enable data exchange with a card application of the other party side, even under existence of a fire wall, and normally, description of API, which is laid open to the other party side, is incorporated in a source code of a card application.

In the invention, without carrying out re-design of API which is laid open to another card application, authentication processing which is carried out therein, and so on, API, which provides a similar function to that of a command group which is inputted through a host I/F of an IC card to a card application, is defined in advance as the sharable interface.

Figure 9:
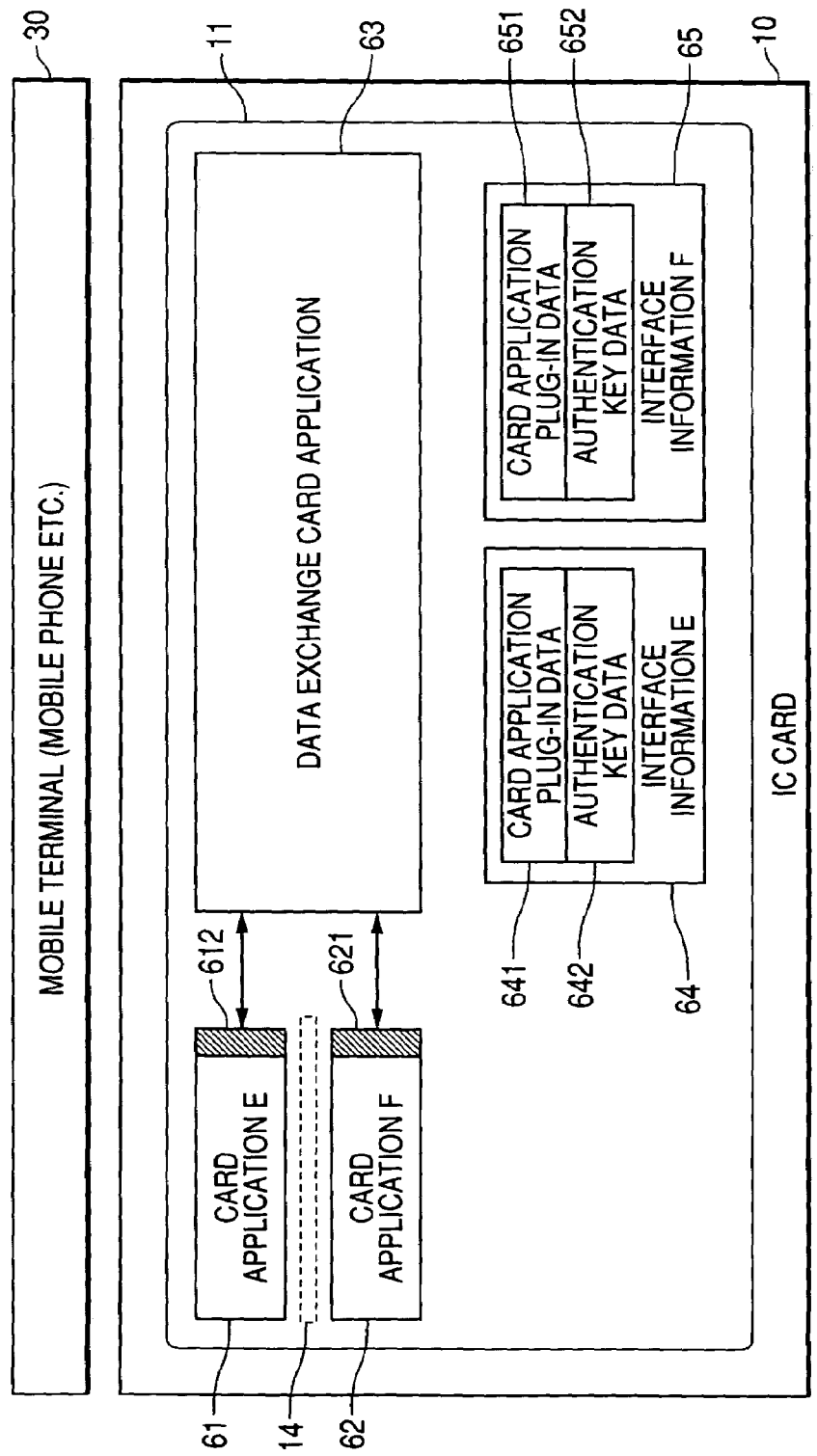
FIG. 9 is a block diagram illustrating a configuration of an IC card and a mobile terminal, in a fourth embodiment of the invention.

As shown in FIG. 9, TRM 11 of this IC card 10 stores a data exchange card application 63, a card application E 61 in which a sharable application 612 is disposed, and a card application F 62 in which a sharable interface 621 is disposed, and the data exchange card application 63 carries out data exchange with the card application E 61 through the sharable interface 612, and with card application F 62 thorough the sharable interface 621, respectively.

The sharable interface 612 of the card application E 61 provides, here, a similar function to that of a command group which is inputted through a host I/F with a dedicated host terminal, to the card application E 61. Therefore, the card application E 61 carries out similar processing as that of a command which is sent from the dedicated host terminal, to a request from another card application by use of the sharable interface 612, and returns a response which is similar to a reply to the dedicated host terminal. In addition, the sharable interface 621 of the card application F 62 also provides a similar function to that of a command group which is inputted through a host I/F with the dedicated host terminal, to the card application F 62, in the same manner.

In addition, as data which the data exchange card application 63 manages, an internal memory of TRM 11 stores interface information E 64 for carrying out processing which is similar to authentication processing and data communication processing which dedicated host terminal (e.g., 73 of FIG. 19) and a management server (e.g., 77 of FIG. 19) carry out with the card application E 61, and interface information F 65 for carrying out processing which is similar to authentication processing and data communication processing which a dedicated host terminal and a management server (e.g., 75 of FIG. 19) carry out with the card application F 62.

The interface information E 64 includes card application plug-in data 641 which is added to the data exchange card application 63, in case that the data exchange card application 63 carries out data exchange with the card application E 61, and a group of key data (authentication key data) 642 which the data exchange card application 63 uses for authentication processing with the card application E 61. The card application plug-in data 641 is information for enabling the data exchange card application 63 to access to the card application E 61, and includes, for example, API of the sharable interface 612 of the card application E 61, and in addition, includes information which defines authentication processing and data exchange processing with the card application E 61, which the data exchange card application 63 carries out by use of authentication key data 642. In addition, the interface information B 65 includes a card application plug-in data in case that the data exchange card application 63 carries out data exchange with the card application F 62, and authentication key data 652, in the same manner.

For example, in case that a user carried out an operation for requesting processing which comes along with data exchange of the card application E 61 and the data exchange card application 63, in the mobile terminal 30, the data exchange card application 63 accesses to the sharable interface 612 of the card application E 61, on the basis of the card application plug-in data 641, to carry out data exchange. At this time, the data exchange card application 63 carries out authentication processing with the card application E 61, by use of the authentication key data 642.

Figure 10:
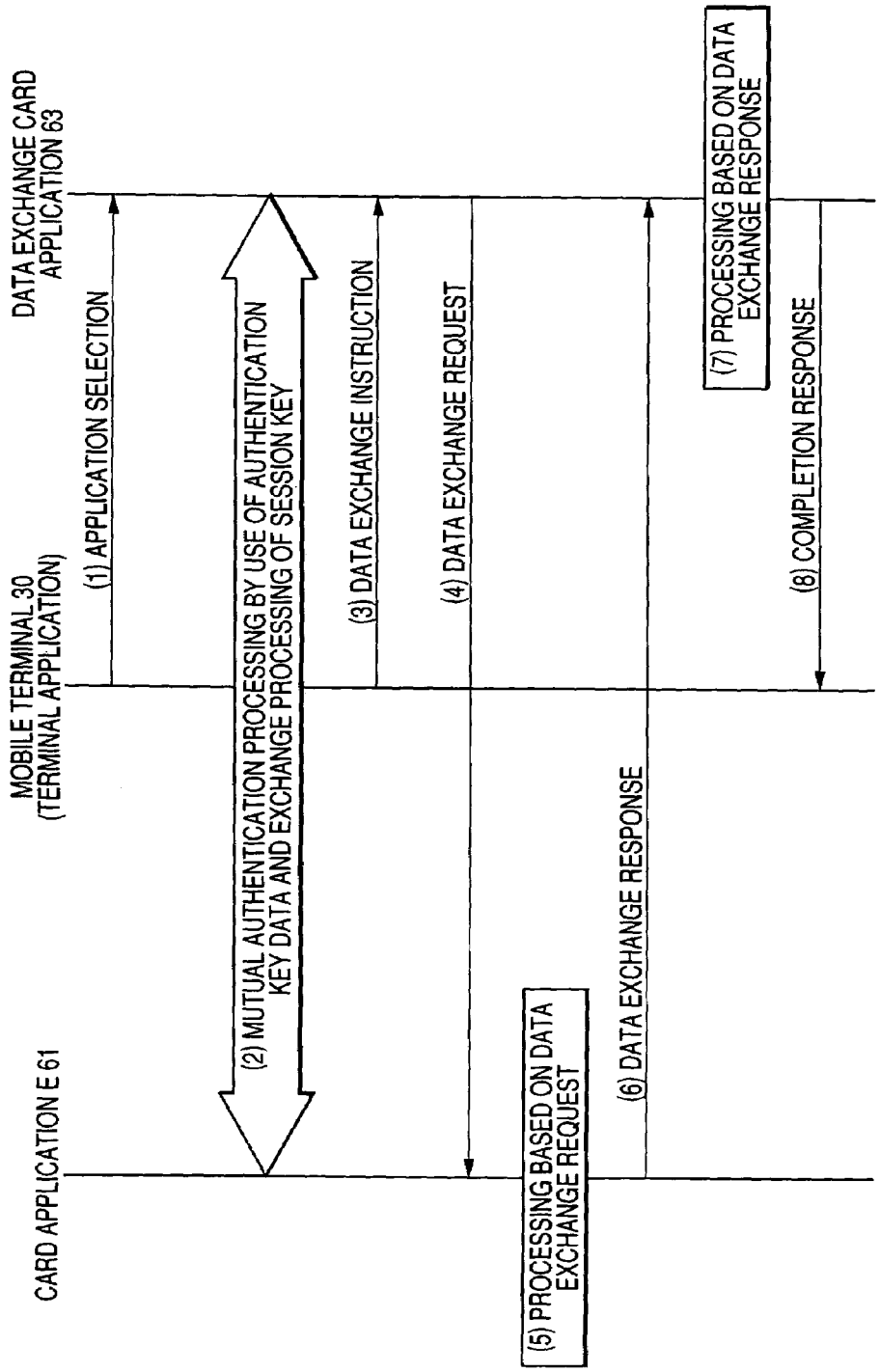
FIG. 10 is a sequence diagram illustrating data exchange procedures between card applications, in the fourth, fifth embodiment of the invention.

FIG. 10 shows a sequence in this case.

When a user carries out an operation for requesting processing which comes along with data exchange of the card application E 61 and the data exchange card application 63, in the mobile terminal 30, a terminal application of the mobile terminal 30 selects the data exchange card application 63 (1), and requests mutual authentication processing with the card application E 61.

Figure 11:
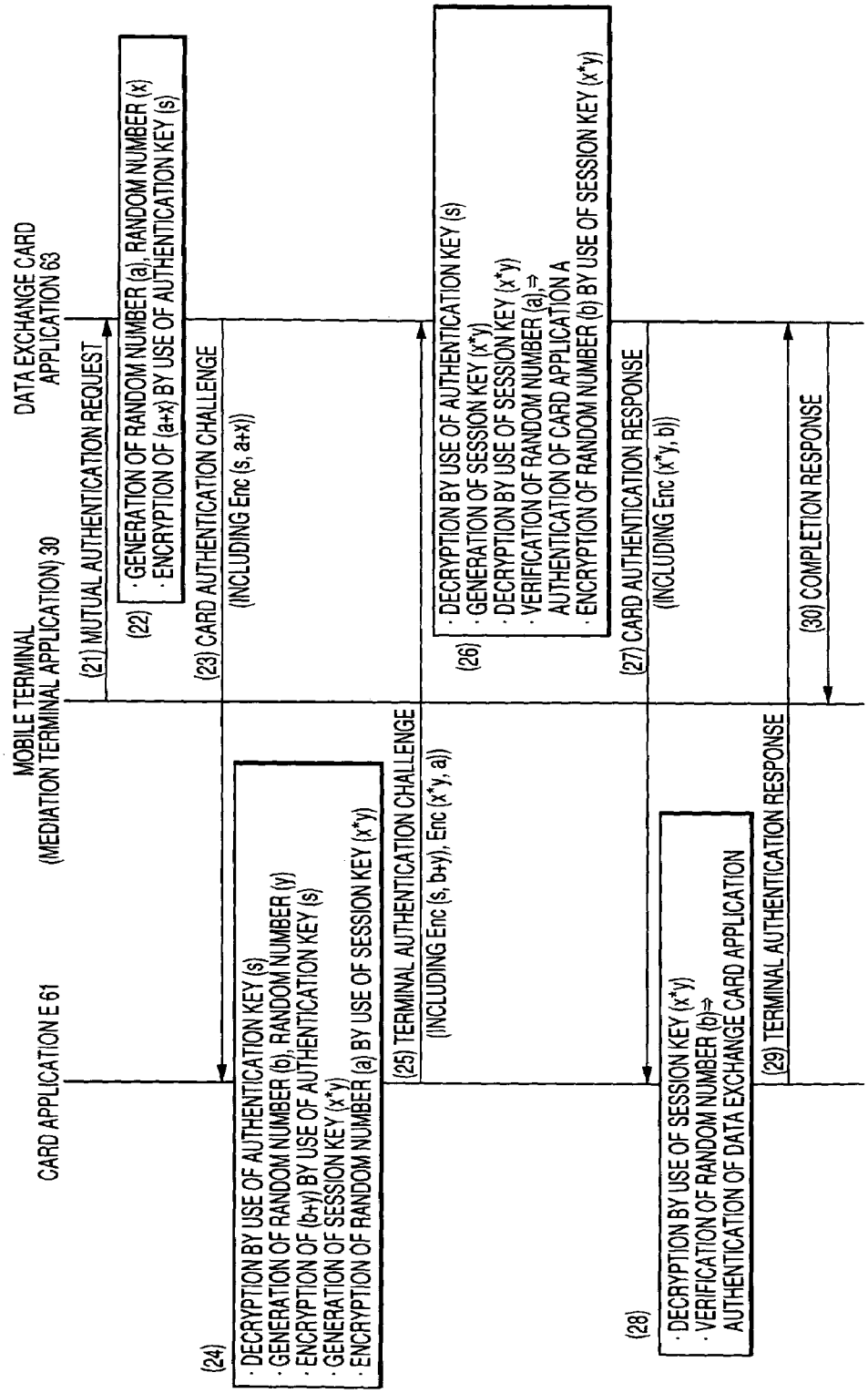
FIG. 11 is a sequence diagram illustrating mutual authentication procedures between card applications, in the fourth, fifth embodiment of the invention.

The data exchange card application accesses to the sharable interface 612 of the card application E, on the basis of the card application plug-in data 641, and carries out mutual authentication processing with the card application E, by use of authentication key data 642, and exchange a session key which is used as an encryption key of data exchange (2). FIG. 11 shows, as one of this mutual authentication processing, procedures based upon such a well-known system that the data exchange card application and the card application E 61, which have an authentication key s in common, carry out mutual authentication by a challenge & response system, and exchange a session key (x*y). Here, + of (a+x), (a+y) is to mean data coupling, and * of (x*y) is to mean exclusive OR, respectively.

Meanwhile, FIG. 1 shows about mutual authentication processing of a common key encryption system which used the common authentication key s, but mutual authentication processing between the data exchange card application and the card application A is not limited to this system, and it is also all right even if mutual authentication processing based on a well-known system such as mutual authentication processing of an public key encryption system and mutual authentication processing which used both encryption systems of the common key and the public key is carried out.

When mutual authentication processing of the data exchange card application and the card application E and exchange processing of the session key are completed, the terminal application instructs data exchange to the data exchange card application (3), and the data exchange card application transmits a data exchange request message to the card application E which is encrypted by the session key, by use of the sharable interface 612 of the card application E (4). The card application E carries out processing based on the data exchange request (5), and transmits a data exchange response message which is encrypted by the session key, to the data exchange card application (6). The data exchange card application carries out processing based on a data exchange response (7), and when the processing is completed, returns a completion response to the terminal application (8).

A sequence of FIG. 10 shows such a case that the data exchange card application 63 transmits the data exchange request message one time to the data exchange instruction (3), but it is also all right even if the data exchange request message is transmitted a plurality of times, in accordance to a content of the data exchange instruction (3), and execution of read and write of a file, and a command other than it, is requested to the card application E 61.

In addition, in the sequence of FIG. 10, after the mutual authentication processing and the exchange processing of the session key are completed, the terminal application transmits the data exchange instruction (3) to the data exchange card application 63, but it is also all right even if the data exchange card application 63 carries out the mutual authentication processing with the card application E 61 and the exchange processing of the session key, and furthermore, the data exchange processing, as a series of processing, to the data exchange instruction (3) from the terminal application.

The card application E 61 and the interface information E 64, or the card application F 62 and the interface information F 65, which are stored in the IC card 10, are provided from a card application issuance entity and a data exchange card application issuance entity.

Figure 12:
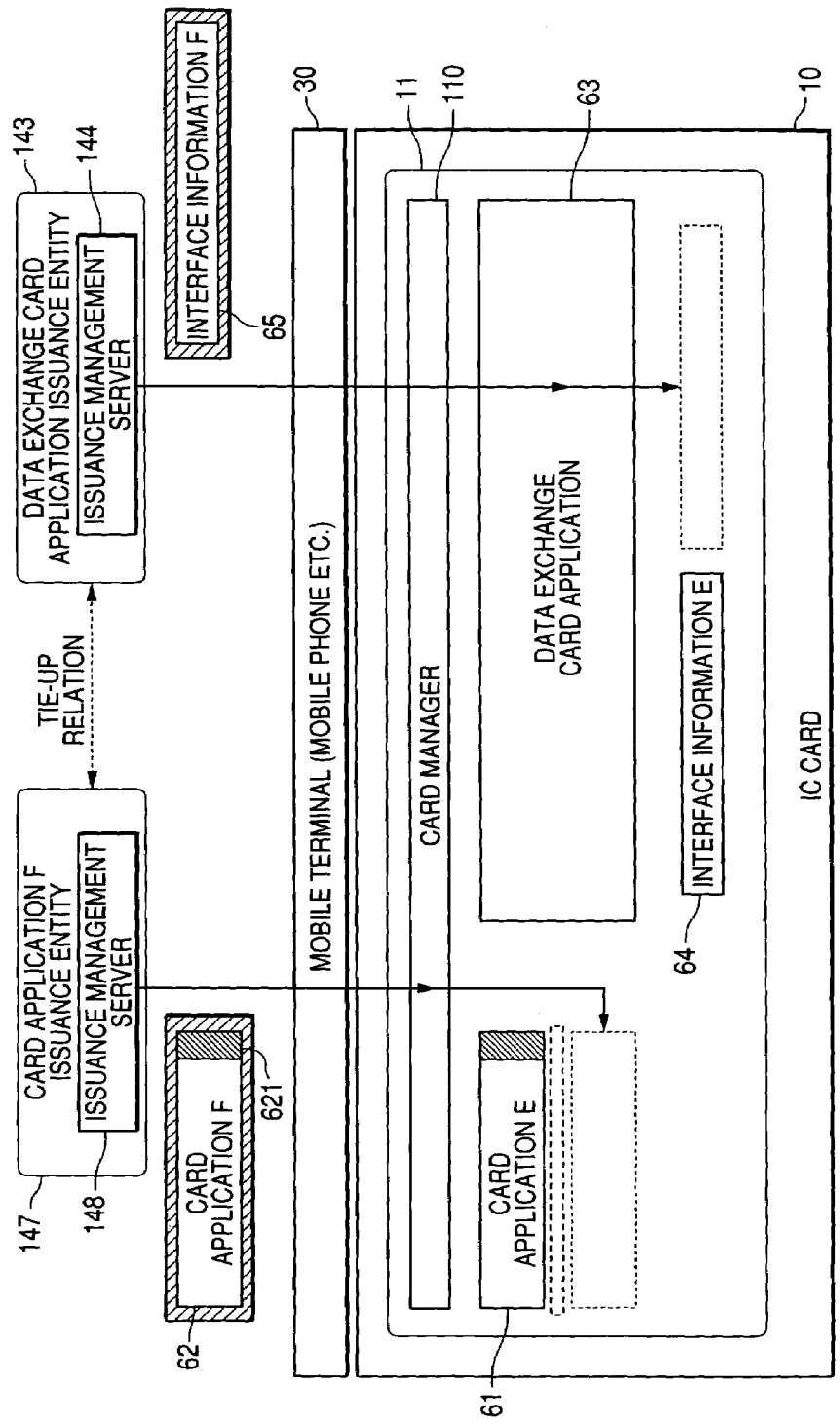
FIG. 12 is a schematic diagram illustrating download of a card application and interface information, in the fourth embodiment of the invention.

FIG. 12 schematically shows such a case that the card application F 62 and the interface information F 65 are newly downloaded in the IC card 10.

The card application F 62 is downloaded in the IC card 10 through the mobile terminal 30 from a issuance management server 148 of a card application F issuance entity 147 in an encrypted state, and is decrypted and its electronic signature is verified by a card manager 110 which manages a card application on the IC card 10, and is registered as a card application. In addition, the interface information F 65 is downloaded in the IC card 10 through the mobile terminal 30 from a issuance management server 144 of a data exchange card application issuance entity 143 which has an alliance with the card application F issuance entity 147 in an encrypted state, and is decrypted and its electronic signature is verified by the data exchange card application 63, and is registered as interface information with the card application F 62.

There is not necessarily such a necessity that download of interface information is carried out around the same time as download of a corresponding card application, and it is also all right even if only the interface information is downloaded at a later time. For example, such a case that a user of the IC card 10, who has already utilized a service provided by the card application F 62, newly entered into a contract of such a service that the card application F 62 carries out data exchange with another card application falls under its category, and a user of the IC card 10 is not required to carry out update of the card application F 62, and is allowed to be able to utilize such a service that the card application F 62 carries out data exchange with another card service, by downloading only the interface information F 65 from the issuance management server 144.

In this way, in this IC card, in case that the data exchange card application and the card application E carry out data exchange, the data exchange card application accesses to the sharable interface, on the basis of the card application plug-in data, and requests data exchange to the card application E, and processes data which is received from the card application E through the sharable interface. In the card applications E, F, it is all right if API, which provides a similar function to that of a command group which is inputted through a host I/F of an IC card to a card application, is defined in advance as the sharable interface, and there is not such a necessity to re-design API which is laid open to another card application, authentication processing which is carried out therein, and so on, correspond to the sharable interface, and therefore, it is also possible to reduce test items in design and development, and it is possible to extremely lessen an influence to an existing card application due to addition of a sharable interface.

In addition, in the foregoing, a mode of using the IC card 10 by loading it on the mobile terminal 30 is explained, but it is also all right even if it is such an embodiment that a secure device, which has a similar function to that of the IC card 10, is embedded in a mobile terminal, as a component.

Fifth Embodiment

A fifth embodiment of the invention is a thing which used a mobile EC card in which storage capacity of an internal memory is large, as a secure device, in lieu of the IC card in the fourth embodiment, and API, which provides a similar function to that of a command group which is inputted through a host I/F of an IC card to a card application, is defined as the sharable interface, and data exchange between card applications is carried out by use of this sharable interface.

Figure 13:
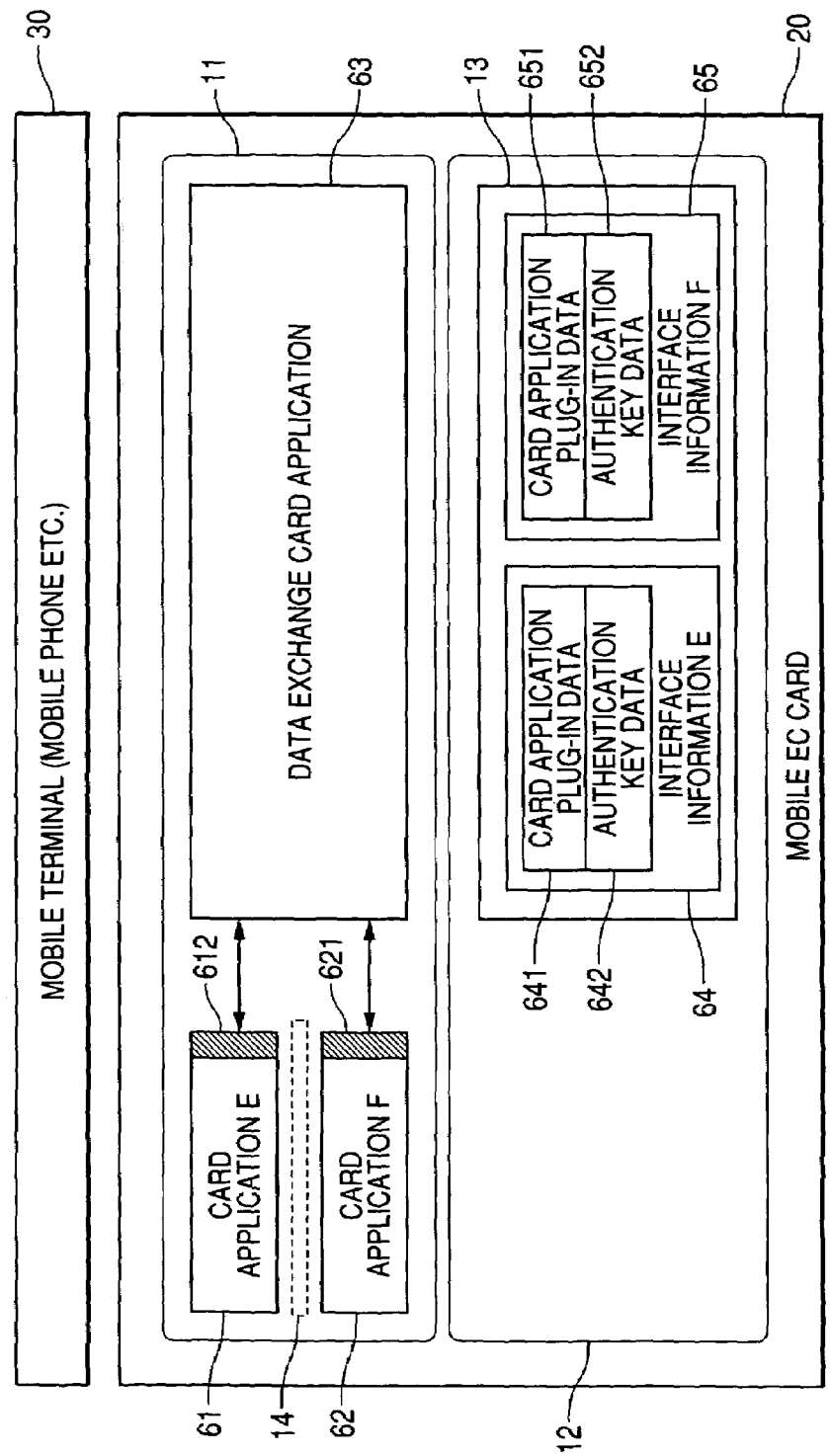
FIG. 13 is a block diagram illustrating a configuration of a mobile EC card and a mobile terminal, in the fifth embodiment of the invention.

As shown in FIG. 13, TRM 11 of this mobile EC card 20 stores a data exchange card application 63, a card application E 61 in which a sharable application 612 is disposed, and a card application F 62 in which a sharable interface 621 is disposed, and the data exchange card application 63 carries out data exchange with the card application E 61 through the sharable interface 612, and with card application F 62 thorough the sharable interface 621, respectively.

The sharable interface 612 of the card application E 61 provides, here, a similar function to that of a command group which is inputted through a host I/F with a dedicated host terminal, to the card application E 61. Therefore, the card application E 61 carries out similar processing as that of a command which is sent from the dedicated host terminal, to a request from another card application by use of the sharable interface 612, and returns a response which is similar to a reply to the dedicated host terminal. In addition, the sharable interface 621 of the card application F 62 also provides a similar function to that of a command group which is inputted through a host I/F with the dedicated host terminal, to the card application F62, in the same manner.

In addition, the secure flash memory area 13, which the data exchange card application 63 manages, stores interface information E 64 for carrying out processing which is similar to authentication processing and data communication processing which a dedicated host terminal (e.g., 73 of FIG. 19) and a management server (e.g., 77 of FIG. 19) carry out with the card application E 61, and interface information F 65 for carrying out processing which is similar to authentication processing and data communication processing which a dedicated host terminal and a management server (e.g., 75 of FIG. 19) carry out with the card application F 62.

The interface information E 64 includes card application plug-in data 641 which is added to the data exchange card application 63, in case that the data exchange card application 63 carries out data exchange with the card application E 61, and a group of key data (authentication key data) 642 which the data exchange card application 63 uses for authentication processing with the card application E 61. The card application plug-in data 641 is information for enabling the data exchange card application 63 to access to the card application E 61, and includes, for example, API of the sharable interface 612 of the card application E 61, and in addition, includes information which defines authentication processing and data exchange processing with the card application E 61, which the data exchange card application 63 carries out by use of authentication key data 642. In addition, the interface information B 65 includes a card application plug-in data in case that the data exchange card application 63 carries out data exchange with the card application F 62, and authentication key data 652, in the same manner.

For example, in case that a user carried out an operation for requesting processing which comes along with data exchange of the card application E 61 and the data exchange card application 63, in the mobile terminal 30, the data exchange card application 63 accesses to the sharable interface 612 of the card application E 61, on the basis of the card application plug-in data 641, to carry out data exchange. At this time, the data exchange card application 63 carries out authentication processing with the card application E 61, by use of the authentication key data 642.

A basic sequence in this case is the same as in the case of the fourth embodiment, and becomes as shown in FIG. 10.

When a user carries out an operation for requesting processing which comes along with data exchange of the card application E 61 and the data exchange card application 63, in the mobile terminal 30, a terminal application of the mobile terminal 30 selects the data exchange card application 63 (1), and requests mutual authentication processing with the card application E 61.

The data exchange card application accesses to the sharable interface 612 of the card application E, on the basis of the card application plug-in data 641 which is read out from the secure flash memory area 13, and carries out mutual authentication processing with the card application E, by use of authentication key data 642, and exchange a session key which is used as an encryption key of data exchange (2). The mutual authentication processing and exchange processing of the session key at this time, as shown in FIG. 11, carry out processing which is similar to the case of the fourth embodiment.

When mutual authentication processing of the data exchange card application and the card application E and exchange processing of the session key are completed, the terminal application instructs data exchange to the data exchange card application (3), and the data exchange card application transmits a data exchange request message to the card application E which is encrypted by the session key, by use of the sharable interface 612 of the card application E (4). The card application E carries out processing based on the data exchange request (5), and transmits a data exchange response message which is encrypted by the session key, to the data exchange card application (6). The data exchange card application carries out processing based on a data exchange response (7), and when the processing is completed, returns a completion response to the terminal application (8).

A sequence of FIG. 10 shows such a case that the data exchange card application 63 transmits the data exchange request message one time to the data exchange instruction (3), but it is also all right even if the data exchange request message is transmitted a plurality of times, in accordance to a content of the data exchange instruction (3), and execution of read and write of a file, and a command other than it, is requested to the card application E 61.

In addition, in the sequence of FIG. 10, after the mutual authentication processing and the exchange processing of the session key are completed, the terminal application transmits the data exchange instruction (3) to the data exchange card application 63, but it is also all right even if the data exchange card application 63 carries out the mutual authentication processing with the card application E 61 and the exchange processing of the session key, and furthermore, the data exchange processing, as a series of processing, to the data exchange instruction (3) from the terminal application.

The card application E 61 and the interface information E 64, or the card application F 62 and the interface information F 65, which are stored in the mobile EC card 20, are provided from a card application issuance entity and a data exchange card application issuance entity.

Figure 14:
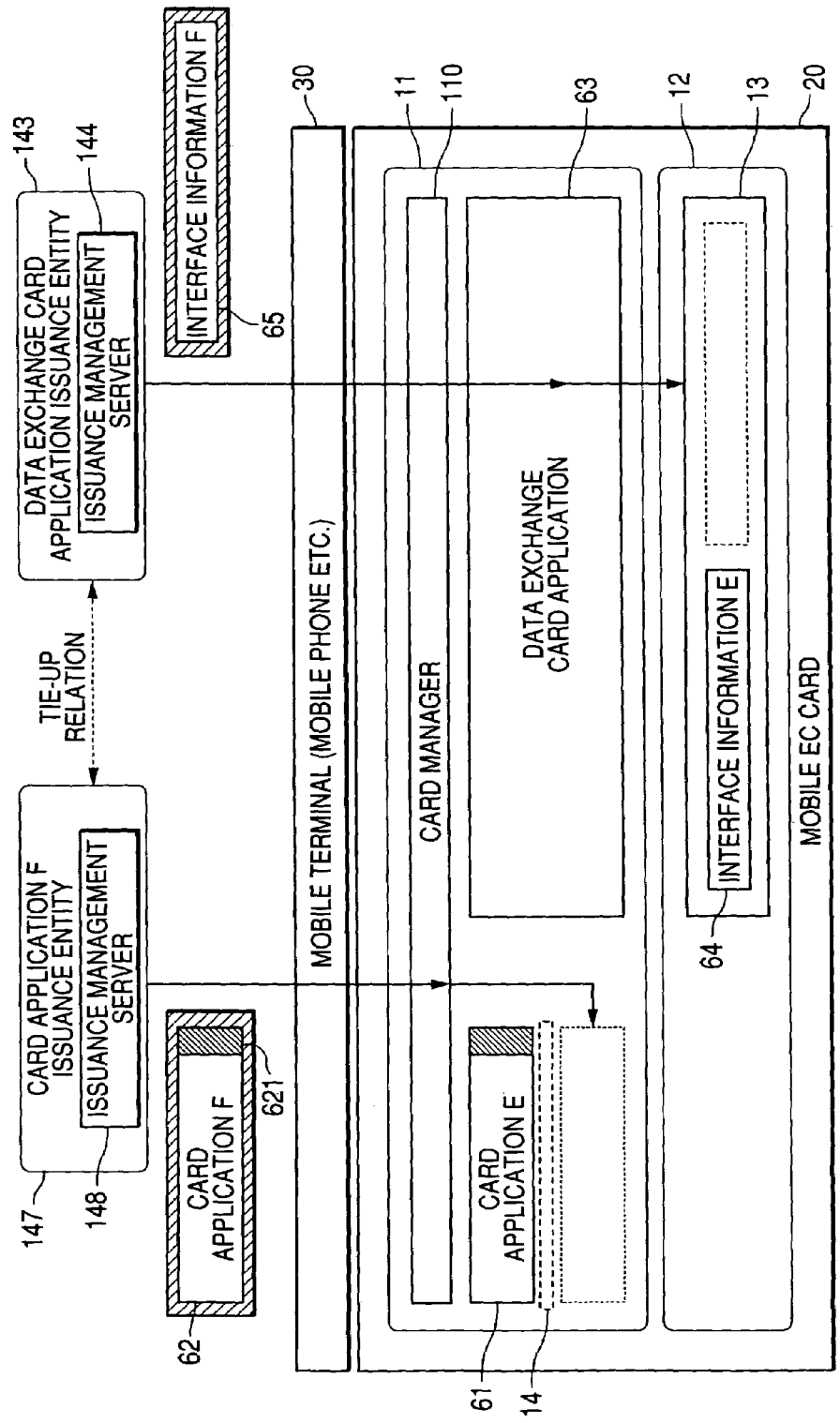
FIG. 14 is a schematic diagram illustrating download of a card application and interface information, in the fifth embodiment of the invention.

FIG. 14 schematically show such a case that the card application F 62 and the interface information F 65 are newly downloaded in the mobile EC card 20.

The card application F 62 is downloaded in the mobile EC card 20 through the mobile terminal 30 from a issuance management server 148 of a card application F issuance entity 147 in an encrypted state, and is decrypted and its electronic signature is verified by a card manager 110 which manages a card application on the mobile EC card 20, and is registered as a card application. In addition, the interface information F 65 is downloaded in the mobile EC card 20 through the mobile terminal 30 from a issuance management server 144 of a data exchange card application issuance entity 143 which has an alliance with the card application F issuance entity 147 in an encrypted state, and is decrypted and its electronic signature is verified by the data exchange card application 63, and is stored in the secure flash memory area 13, and is registered as interface information with the card application F 62.

In case of the mobile EC card 20, it is possible to set up an extremely large secure flash memory area 13 as a memory area of confidentiality, as compared with commonly used IC cards, and therefore, it is possible to store interface information to large numbers of card applications, and in addition, it is possible to store interface information with large data capacity, which defied complex data exchange processing.

In addition, there is not necessarily such a necessity that download of interface information is carried out around the same time as download of a corresponding card application, and it is also all right even if only the interface information is downloaded at a later time. For example, such a case that a user of the mobile EC card 20, who has already utilized a service provided by the card application F 62, newly entered into a contract of such a service that the card application F 62 carries out data exchange with another card application falls under its category, and a user of the mobile EC card 20 is not required to carry out update of the card application F 62, and is allowed to be able to utilize such a service that the card application F 62 carries out data exchange with another card service, by downloading only the interface information F 65 from the issuance management server 144.

In this way, in this mobile EC card, in case that the data exchange card application and the card application E carry out data exchange, the data exchange card application accesses to the sharable interface, on the basis of the card application plug-in data, and requests data exchange to the card application E, and processes data which is received from the card application E through the sharable interface.

In the card applications E, F, it is all right if API, which provides a similar function to that of a command group which is inputted through a host I/F of an IC card to a card application, is defined in advance as the sharable interface, and there is not such a necessity to re-design API which is laid open to another card application, authentication processing which is carried out therein, and so on, correspond to the sharable interface, and therefore, it is also possible to reduce test items in design and development, and it is possible to extremely lessen an influence to an existing card application due to addition of a sharable interface.

In addition, in the foregoing, a mode of using the mobile EC card 20 by loading it on the mobile terminal 30 is explained, but it is also all right even if it is such an embodiment that a secure device, which has a similar function to that of the mobile EC card 20, is embedded in a mobile terminal, as a component.

Sixth Embodiment

In a sixth embodiment of the invention, one example of a system which realizes tie-up of plural services by use of a mobile terminal in which the IC card of the invention is loaded will be described. In this system, an electronic boarding ticket service in which an IC card is utilized as a railway boarding ticket, and a credit settlement service in which an IC card is utilized as a credit card are tied up, and in case that a meal expense at a suburban restaurant and an accommodation expense at a hotel are paid by credit, a service of paying back a railway traveling expense to an actual place (traveling expense refund coupon service) is carried out.

Figure 20:
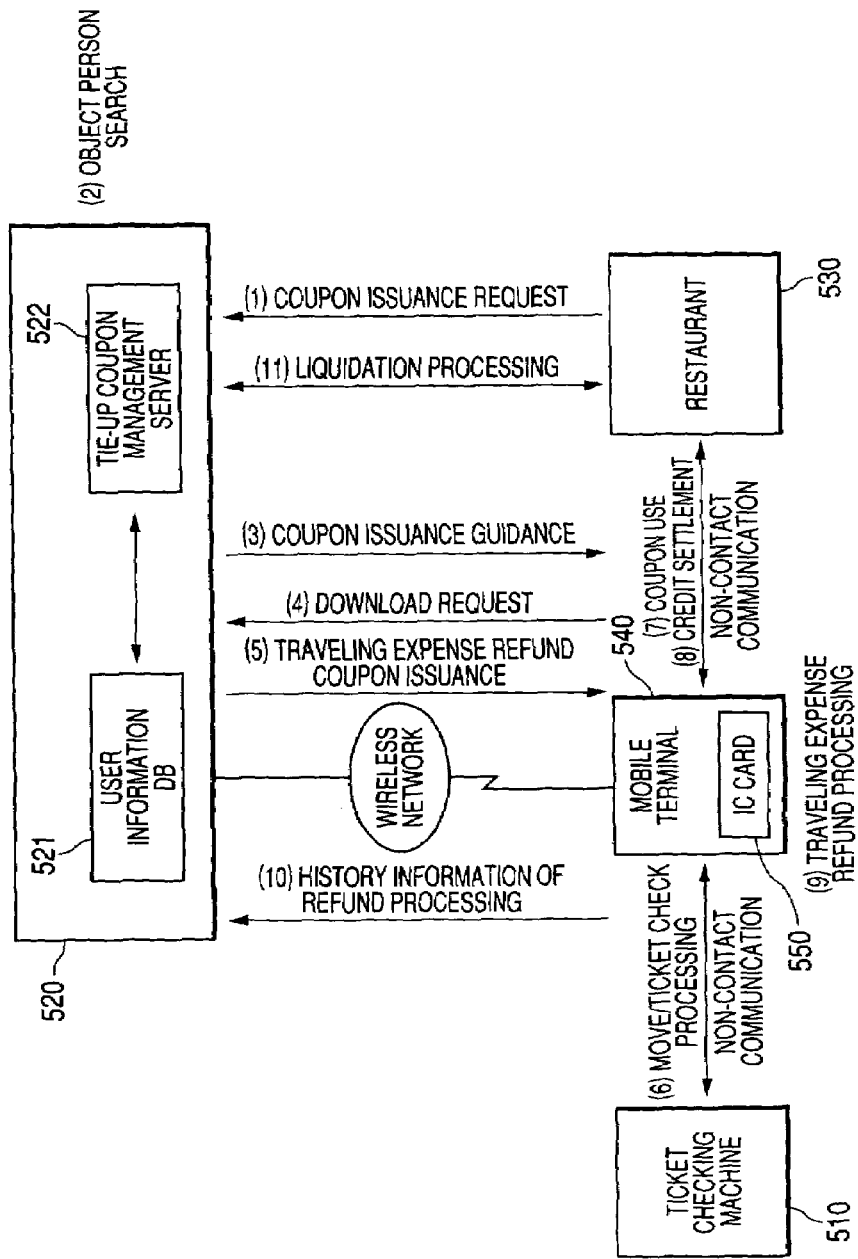
FIG. 20 is a conceptual diagram explaining a system of a traveling expense refund coupon, in a sixth embodiment of the invention.

This system is, as shown in FIG. 20, equipped with a restaurant (or hotel) 530 which carries out the traveling expense refund coupon service, a tie-up service provider 520 which receives a request of the restaurant 530 to issue traveling expense refund coupons, a mobile terminal 540 in which an IC card 550, which is utilized for the electronic boarding ticket service and the credit settlement service, is loaded, and a ticket checking machine 510 which writes a ticket check history in the IC card 550 of the mobile terminal 540 at the time that a user passes through a ticket gate.

The traveling expense refund coupon is a reservation ticket of a special menu (restaurant) and an accommodation plan (hotel), which guaranteed to refund a traveling expense, and the tie-up service provider 520 is a railway company, a credit card company which forms an alliance with it, and so on, and is equipped with a user information database (DB) 521 in which personal information (user information such as user's address, user attribute and a type of a card application that a user possesses) of users are collected, and a tie-up coupon management server 522 which generates/manages the traveling expense refund coupons, and issues the traveling expense refund coupons on the basis of a request from the restaurant (or hotel) 530.

In FIG. 20, operation procedures of this system are shown by numerical characters in parentheses. The restaurant (or hotel) 530 requests issuance of the traveling expense refund coupons to the tie-up service provider 520, by specifying a issuance condition of the coupons (upper limit of a traveling expense refund amount, a minimum utilization amount which fits with the traveling expense refund, coupon issuance number, an inhabited area of object persons, etc.) (1). The tie-up service provider 520 searches object persons in the specified inhabited area, from the user information DB 521 (2), and transmits a issuance guidance of the traveling expense refund coupons to a relevant mobile terminal 540

(3). A user, who desires the traveling expense refund coupon, requests download of the coupon to the tie-up service provider 520, by use of the mobile terminal 540 (4), and the tie-up service provider 520 downloads the traveling expense refund coupon in response to the request (5). This traveling expense refund coupon is stored in the IC card 550 which is loaded in the mobile terminal 540.

The IC card 550 has non-contact communication means which carries out non-contact communication with the ticket checking machine 510 and a POS terminal, and contact communication means which carries out contact communication with the mobile terminal 540 or the POS terminal, and in addition, a card application which carries out the electronic boarding ticket service, a card application which carries out the credit settlement service, and a tie-up card application which carries out tie-up processing between card applications of both sides on the basis of the traveling expense refund coupon are stored.

A user, who obtained the traveling expense refund coupon, holds up the mobile terminal 540 on the ticket checking machine 510 at a ticket gate of a boarding station or a getting-off station, in case that a user goes out to the restaurant 530, taking a train. At this time, the ticket checking machine 510 carries out non-contact communication with the IC card 550 which is loaded in the mobile terminal 540, and selects a card application of the electronic boarding ticket service, and carries out ticket gate processing, and the card application writes a ticket checking history in the IC card 550 (6). Meanwhile, it is also all right even if the ticket gate processing in this case is not carried out in such a state that the IC card 550 is loaded in the mobile terminal 540, but is carried out by holding up the IC card 550 directly to the ticket checking machine 510.

Next, a user displays the traveling expense refund coupon on a screen of the mobile terminal 540 at the restaurant 530 and presents it to the restaurant side, and has a meal, and at the time of payment of its expense, holds up the mobile terminal 540 on a POS terminal of the restaurant 530, and uses the traveling expense refund coupon (7), and furthermore, makes settlement by credit (8). At this time, the POS terminal carries out non-contact communication with the IC card 550 which is loaded in the mobile terminal 540, and selects a tie-up card application, and writes in the traveling expense refund coupon that it is used, and furthermore, selects a card application of the credit settlement service, and carries out credit settlement processing, and the card application writes a credit utilization history in the IC card 550. Meanwhile, it is also all right even if a use of the traveling expense refund coupon and the credit settlement processing in this case are not carried out in such a state that the IC card 550 is loaded in the mobile terminal 540, but is carried out by handing over the IC card 550 to a shop side so that a POS terminal and the IC card 550 carry out contact communication.

The tie-up card application of the IC card 550 reads out the credit utilization history, the ticket checking history and so on, and adds a traveling expense to an actual place, which is obtained from the ticket checking history, to a pre-paid balance of an electronic boarding ticket, in case that utilization of credit satisfies a condition of traveling expense refund (9). The mobile terminal 540 transmits history information of the traveling expense refund processing to the tie-up service provider 520 (10). After that, the tie-up service provider 520 carries out liquidation processing of a traveling expense which is refunded, with the restaurant 530 (11).

In this way, in this system, the traveling expense refund processing is carried out only by the mobile terminal 540 side in which the IC card 550 is loaded, and therefore, with regard to the ticket gate processing which is carried out with the ticket checking machine 510, and the credit settlement processing which is carried out with a POS terminal of the restaurant 530, there is no necessity to change an existing system. On that account, there is no necessity to add a new function to the ticket checking machine 510 and a POS terminal, and it is possible to hold down a cost which is required for equipment investment of this entire system.

In addition, in this system, a traveling expense to be refund is calculated on the basis of a ticket checking history, and therefore, it is possible to accurately calculate an actual expense, so that there is no case to refund an excessive amount of money, and therefore, it is possible to suppress burden of an expense of the restaurant 530 side. For example, in case that someone rode beyond a zone of a commuter pass to come to a shop, it is possible to do such a thing that only a traveling expense of an excess zone is refunded. In addition, it is also possible to accurately refund a round trip traveling expense, by doubling a traveling expense at the time of coming to the shop.

In addition, in this system, it is possible to limit transmission destinations of a issuance guidance of the traveling expense refund coupon, and it is possible to appropriately specify object persons of the traveling expense refund coupon service.

Various shops/business entities of not only restaurants and hotels but also leisure facilities and department stores can become members of this system, and a member shop of this system can realize to pull in more customers, by issuing the traveling expense refund coupons by targeting such time of year and a time zone that customers are few. This traveling expense refund coupon is not a discount of a price of a commercial good and a service, and therefore, it is possible to keep a brand image of a shop and commercial goods.

A credit card company, which becomes the tie-up service provider 520, can obtain commission income due to coupon issuance, from member shops, and in addition, can make an allowance for increase of credit utilization money amounts.

In addition, a railway company, which becomes the tie-up service provider 520, can obtain commission income due to coupon issuance, from member shops, and in addition, can make an allowance for increase of passengers getting on and off of a railway.

Meanwhile, here, it explained such a case that a traveling expense is refunded according to utilization of a member shop, but it is also all right even if, in lieu of it (or together with it), in case that the tie-up service provider 520 is a credit company, an electronic value such as an electronic shopping ticket which can be utilized at member shops is stored in the IC card 550, according to utilization at member shops, and in case that the tie-up service provider 520 is a credit company under the control of a department store, an electronic value such as an electronic shopping ticket which can be utilized at the department store is stored in the IC card 550, and in addition, in case that the tie-up service provider 520 is a railway company, an electronic value such as prepaid money which can be utilized at member shops along a railway line is stored in the IC card 550, according to utilization at member shops. In this case, a user utilizes again an electronic value which is stored in the IC card 550, and thereby, it leads to increase of sales of a member shop and the tie-up service provider 520.

Seventh Embodiment

In a seventh embodiment of the invention, it explains as to a configuration which is more suitable to tie-up of services in the invention, in case that an IC card 550 in which an internal memory is of large storage capacity (here, called as "mobile EC card") is used.

Figure 21:
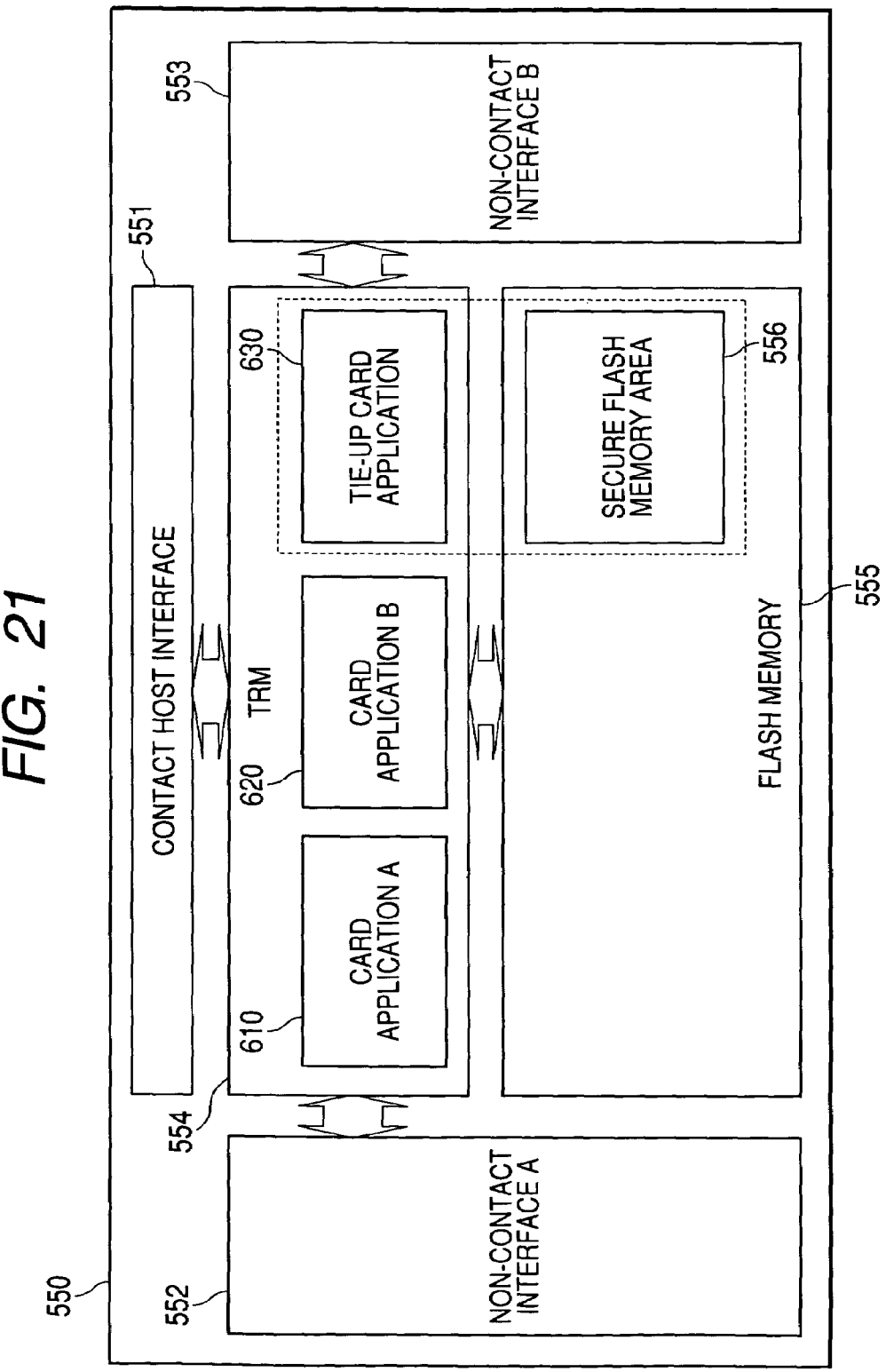
FIG. 21 is a block diagram illustrating a hardware configuration of a mobile EC card, in a seventh embodiment of the invention.

FIG. 21 shows a hardware configuration of a mobile EC card 550. This mobile EC card 550 is equipped with a contact host inter face (I/F) 551 for carrying out contact communication with a mobile terminal 540, a non-contact I/F A 552 for carrying out non-communication contact with, for example, an automatic ticket checking machine, a non-contact I/F B 553 for carrying out non-communication contact with, for example, a POS terminal, a tamper resistance module (TRM) 554 with high confidentiality which stored card applications A 610 and B 620, a tie-up card application 630, and a flash memory 555 with large storage capacity, and it is possible to set up a secure flash memory area 556 having confidentiality pursuant to TRM 554, with respect to each card application, in the flash memory area 556.

TRM 554 has, in its inside, CPU which carries out a card application, and a memory which stores the card application. In TRM 554, a card OS, which corresponded to multi-task, is installed, and it is possible to carry out a plurality of card applications, and in addition, each data of the secure flash memory area 556 is managed in such a manner that only a corresponding card application of TRM 554 can access to it, and on that account, in the secure flash memory area 556, confidentiality pursuant to TRM 554 is maintained.

A plurality of card applications, which are stored in the mobile EC card 550, are isolated from another card application, respectively, by a fire wall, although it is the same as in the case of a commonly used IC card, and it is configured in such a manner that direct handing-over of data between card applications is not possible normally, but in the mobile EC card 550 of the invention, as one of card applications, a tie-up card application, which carries out tie-up processing between card applications, is installed in TRM 554, and this tie-up card application carries out exchange of data with another each card application, through the mobile terminal 540, and carries out tie-up processing between card applications.

Figure 22:
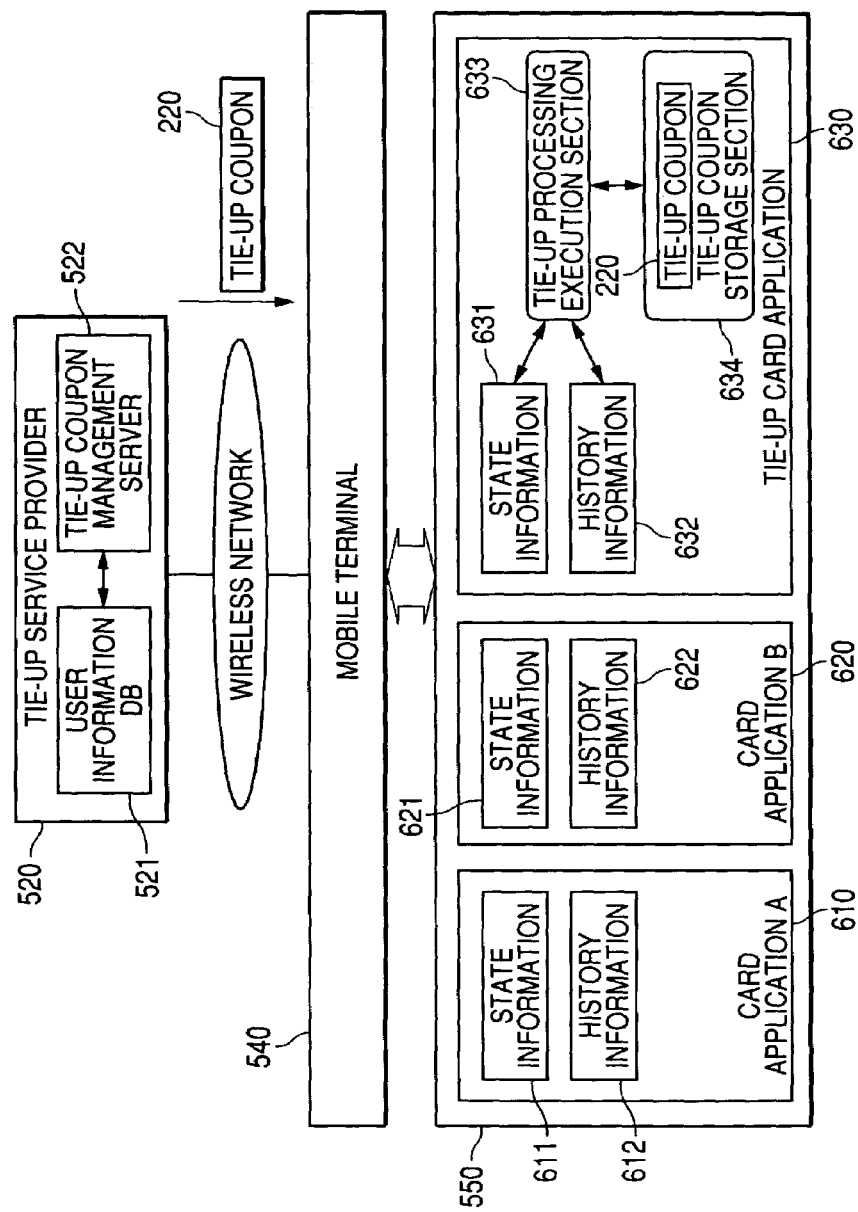
FIG. 22 is a block diagram illustrating a card application of the mobile EC card in a system of the seventh embodiment of the invention.

FIG. 22 shows such a state that the card application A 610 which carries out, for example, an electronic boarding ticket service, the card application B 620 which carries out, for example, a credit settlement service, and the tie-up card application 630 which carried out tie-up processing of both card applications are stored in the mobile EC card 550.

The card application A 610 holds state information 611 which shows a state of the card application A 610, and history information 612 of processing which is carried out with a ticket checking machine 510 through the non-contact I/F A 552, and the card application B 620 holds state information 621 which shows a state of the card application B 620, and history information 622 of processing which is carried out with a POS terminal through the non-contact I/F B 553, and the tie-up card application 630 holds state information 631 which shows a state of the tie-up card application 630, a tie-up processing execution section 633 which carries out tie-up processing between the card application A 610 and the card application B 620, and history information 632 of tie-up processing, and furthermore, a tie-up coupon 220 (corresponds to the "traveling expense refund coupon" of the sixth embodiment), which is downloaded through a wireless network from a tie-up coupon management server 522 of a tie-up service provider 520, is stored by a tie-up coupon storage section 634 which is disposed in, for example, a secure flash memory area 556. In the tie-up coupon storage section 634, a plurality of tie-up coupons 220 are stored.

Figure 23:
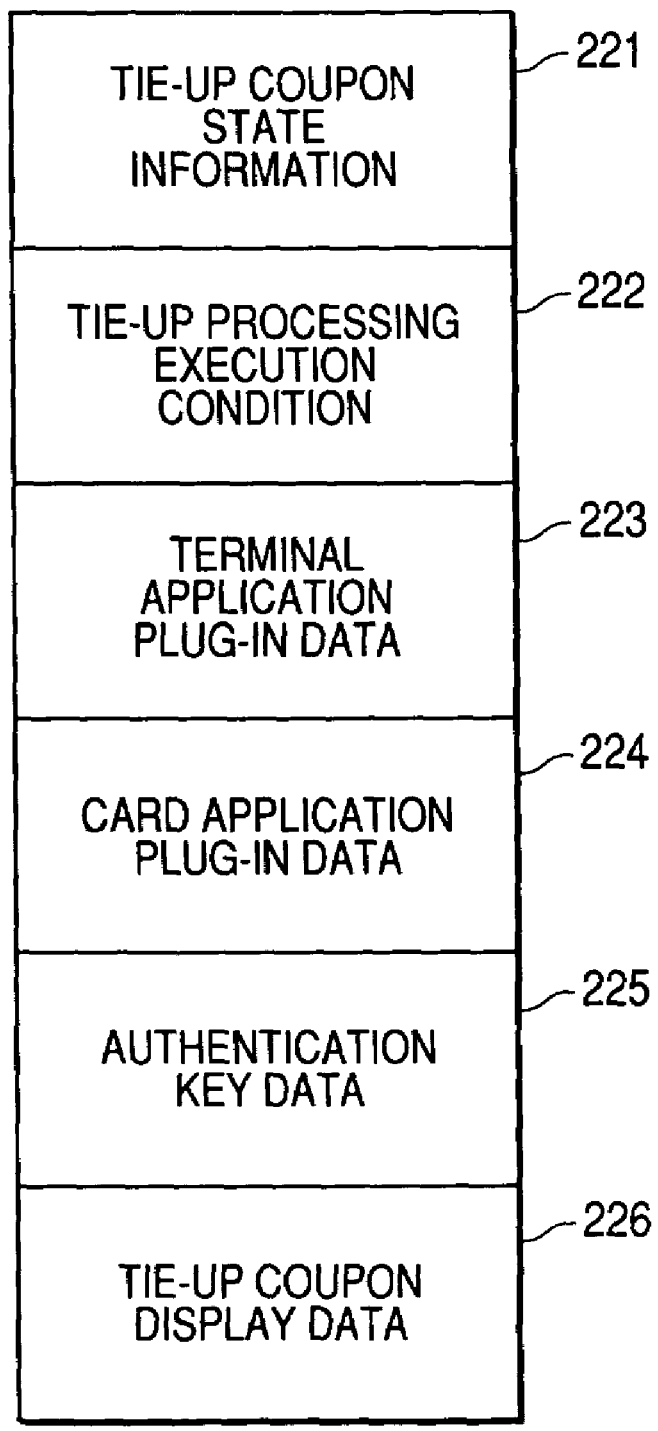
FIG. 23 is a view illustrating a data format of a tie-up coupon in the system of the seventh and eighth embodiments of the invention.

As for the tie-up coupon 220, as shown in FIG. 23, a data format is configured by tie-up coupon state information 221 which shows a state of the tie-up coupon 220 itself (whether it is used or not, whether tie-up processing is completed or not), a tie-up processing execution condition 222 which shows conditions for the tie-up processing execution section 633 of the tie-up card application 630 to carry out the tie-up processing, terminal application plug-in data 223 which is loaded in a terminal application of the mobile terminal 540 on the occasion of tie-up processing, card application plug-in data 224 which is loaded in the tie-up processing execution section 633 of the tie-up card application 630 on the occasion of tie-up processing, authentication key data 225 comprising a group of key data which the tie-up card application 630 uses for authentication processing and data processing with other card applications 610, 620 on the occasion of tie-up service, and tie-up coupon display data 226 comprising text and image information for displaying a content of the tie-up coupon 220 on a screen of the mobile terminal 540.

The tie-up processing execution condition 222 defines conditions which should be satisfied by the tie-up coupon state information 221 and state information 631, 611, 621 or history information 632, 612, 622 of the tie-up card application 630 and other card applications 610, 620, and in addition, there is also such a case that a data content on a specific server which is connected through a wireless network is defined as a condition. In the traveling expense refund coupon, tie-up processing between card applications is carried out, in case that ID of a traveling expense refund coupon available shop, ID of a station which is neighborhood of the same shop, a type of a credit card, a lower limit of a utilization money amount etc. are defined as the tie-up processing execution condition 222, and a type of a credit card which is described in the state information 621 of the card application B and ID of a credit utilization shop which is described in the history information 622 coincide with a type of a credit card of the tie-up processing execution condition 222, and ID of a traveling expense refund coupon available shop, and a utilization money amount at that shop, which is described in the history information 622, is higher than a lower limit of a utilization money amount of the tie-up processing execution condition 222, and in addition, a getting-off station ID which is described in the history information 612 of the card application A coincides with a neighborhood station ID of the tie-up processing execution condition 222.

In addition, the terminal application plug-in data 223 is such information that the terminal application of the mobile terminal 540 carries out, on the basis of its content, mediation processing between the tie-up card application 630 and the card application A 610, or between the tie-up card application 630 and the card application B 620. For example, information for carrying out mediation processing of the former includes, as its content, a group of APDU commands etc. which specify formats of a command and a response which are used for application ID (AID) of the card application A 610 and for a response with the card application A 610, and in addition, information for carrying out mediation processing of the latter includes, as its content, a group of APDU commands etc. which specify formats of a command and a response which are used for application ID (AID) of the card application B 620 and for a response with the card application B 620.

In addition, the card application plug-in data 224 is such information that the tie-up processing execution section 633 of the tie-up card application 630 carries out, on the basis of its content, authentication processing and data exchange processing with the card application A 610 or the card application B 620.

Figure 24:
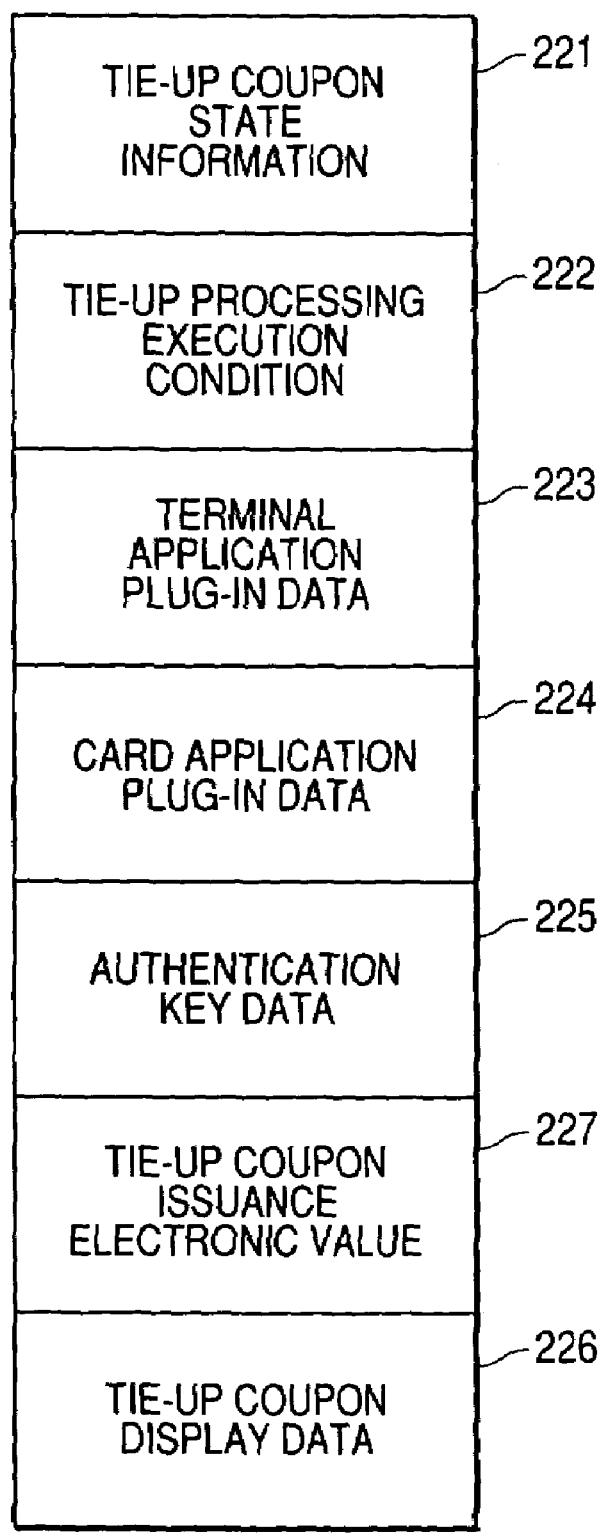
FIG. 24 is a view illustrating another data format of the tie-up coupon in the system of the seventh and eighth embodiments of the invention.

Meanwhile, in case of issuing electronic shopping tickets and electronic tickets of a movie and an event, according to utilization of member shops, an electronic value ("tie-up coupon issuance electronic value" 227) such as electronic shopping tickets and electronic tickets, which are issued for another card application in tie-up processing, is added to an inside of a data format of a tie-up coupon, as shown in FIG. 24. It is also all right even if this tie-up coupon issuance electronic value 227 is an electronic value such as an electronic boarding ticket and a discount coupon for next coming to a shop, and object data such as a music content and a video content.

A user can select one tie-up coupon from tie-up coupons which are stored in the tie-up coupon storage section 634 of the mobile EC card 550, and display it on a screen of the mobile terminal 540, by operating the mobile terminal 540. At this time, the tie-up processing execution section 633 collects information which is necessary for judgment of an execution condition of the tie-up processing, and from the mobile EC card 550, data showing a content of a tie-up coupon, which includes information of which requirement is satisfied or not among individual requirements of the tie-up processing execution condition 222, is transmitted to the mobile terminal 540, and displayed on a screen of the mobile terminal 540, together with the tie-up coupon state information 221 and the tie-up coupon display data 226 of the tie-up coupon 220.

Figure 25:
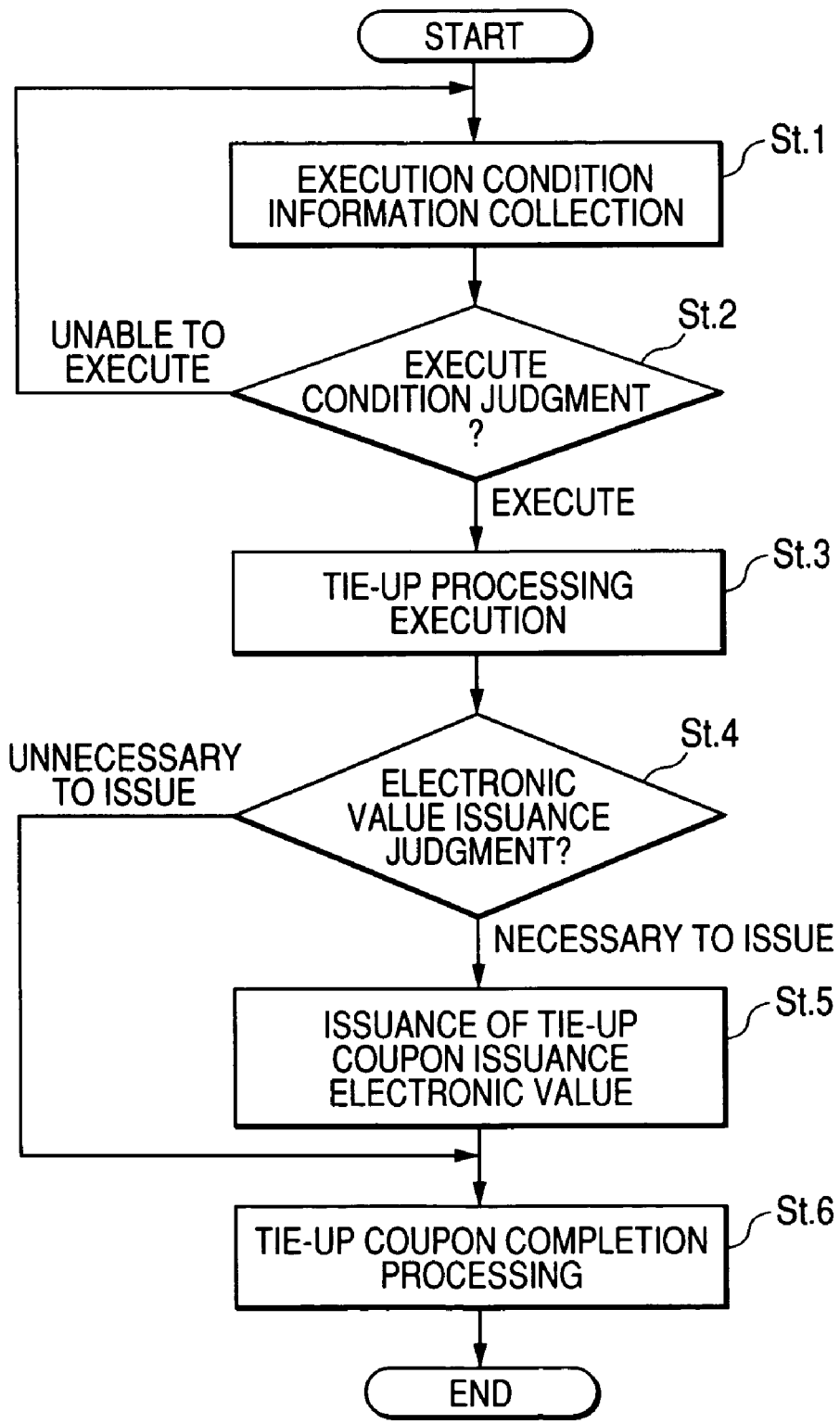
FIG. 25 is a flow chart illustrating tie-up processing procedures in the system of the seventh and eighth embodiments of the invention.

A flow chart of FIG. 25 shows procedures for carrying out the tie-up processing between card applications, on the basis of the stored tie-up coupon 220. This processing is carried out, in succession to settlement processing etc. with a POS terminal.

The tie-up card application 630 transmits the terminal application plug-in data 223 in the tie-up coupon 220, to the mobile terminal 540, and loads the card application plug-in data 224, and collects state information 611, 621 and history information 612, 622 of another card application, which are necessary for judgment of the tie-up processing execution condition 222, through the terminal application of the mobile terminal 540 (step 1).

At this time, in case of collecting, for example, history information 612 of the card application A, the terminal application loads the received terminal application plug-in data, and accesses to the card application A by use of AID of the card application A which is included in the terminal application plug-in data and a command group correspond to the card application A, and selects the card application A as a card application which is linked up with the tie-up card application 630.

The tie-up processing execution section 633 of the tie-up card application 630 carries out mutual authentication processing with the card application A by use of authentication key data 225, on the basis of the card application plug-in data 224, and exchange a session key which is used as an encryption key of data exchange. Next, the tie-up processing execution section 633 encrypts a data exchange request message which requests history information 612 of the card application A, by use of the session key, and transmits it to the card application A through the terminal application. The card application A transmits a data exchange response message which includes history information 612 encrypted by the session key, on the basis of this data exchange request, to the tie-up processing execution section 633 of the tie-up card application 630 through the terminal application. The terminal application, which mediates this data exchange, converts data which is sent from the tie-up card application 630 to the card application A, into a command format of the card application A, and converts data, which is sent from the card application A to the tie-up card application 630, into a command format of the tie-up card application 630.

Also in case of collecting the state information 611 of the card application A, processing which is similar to the case of collecting the history information 612 is carried out, and in addition, also in case of collecting the state information 621 and the history information 622 of the card application B, similar processing is carried out.

The tie-up processing execution section 633, which collected information necessary for judgment of an execution condition, judges whether the collected information satisfies the tie-up processing execution condition 222 or not (step 2). For example, in case of the traveling expense refund coupon, it judges whether a coupon is used (already presented to a shop), and a specified money amount or more is used in the specified credit card, at a specified shop.

In case that the execution condition is satisfied, the tie-up processing execution section 633 carries out mutual authentication processing by use of the authentication key data 225 with a card application which becomes an object of tie-up processing, and exchange a session key, in the same manner as in the case of the step 1. Then, on the basis of the card application plug-in data 224, data, which is encrypted by a session key, is transmitted, and tie-up processing is carried out (step 3). For example, in case of the traveling expense refund coupon, ticket check history of an electronic boarding ticket card application is read out, and a money amount, which is equivalent to a traveling expense which a user paid, is added to prepaid balance of the electronic boarding ticket card application.

Next, the tie-up processing execution section 633 judges whether the tie-up coupon 220 is set up so as to issue the tie-up coupon issuance electronic value 227 or not (step 4). In case that the tie-up coupon issuance electronic value 227 is set up, the tie-up coupon issuance electronic value is encrypted by the session key, and transmitted to a card application which is specified (step 5).

Next, the tie-up processing execution section 633 stores a history of the tie-up processing, in the history information 632 of the tie-up card application 630, and erases the tie-up coupon 220 to complete the tie-up processing (step 6).

After that, the mobile terminal 540 receives a completion response of the tie-up processing, from the mobile EC card 550, and displays a result of the tie-up processing on a screen.

In addition, a history of the tie-up processing, which is stored in the history information 632 of the tie-up card application 630, is transmitted to the tie-up coupon management server 522 through a wireless network, at appropriate timing, at a later date.

In addition, in the above-described explanation, it explained that the tie-up coupon includes the electronic value such as an electronic boarding ticket and a discount coupon for next visit to a shop, and object data such as a music content and a video content, as the tie-up coupon issuance electronic value 227, but it is also all right even if the tie-up coupon further includes a card application and a terminal application which handle this tie-up coupon issuance electronic value 227.

In case of issuing the tie-up coupon issuance electronic value to a card application, there is such cases that a card application, to which the tie-up coupon issuance electronic value should be issued, has to be installed in the mobile EC card 550 in advance, and in addition, on the occasion of utilizing the tie-up coupon issuance electronic value, a terminal application has to be installed in the mobile terminal 540. On the occasion of such processing that the card application and the terminal application, which handle the tie-up coupon issuance electronic value 227, is incorporated in the tie-up coupon and the tie-up processing execution section 633 issues the tie-up coupon issuance electronic value 227, the card application is installed in the mobile EC card and the terminal application is installed in the mobile terminal, respectively, according to need, and thereby, even in case that necessary card application and terminal application are not installed in advance, it becomes possible for a user to utilize the tie-up coupon issuance electronic value 227.

Figure 29:
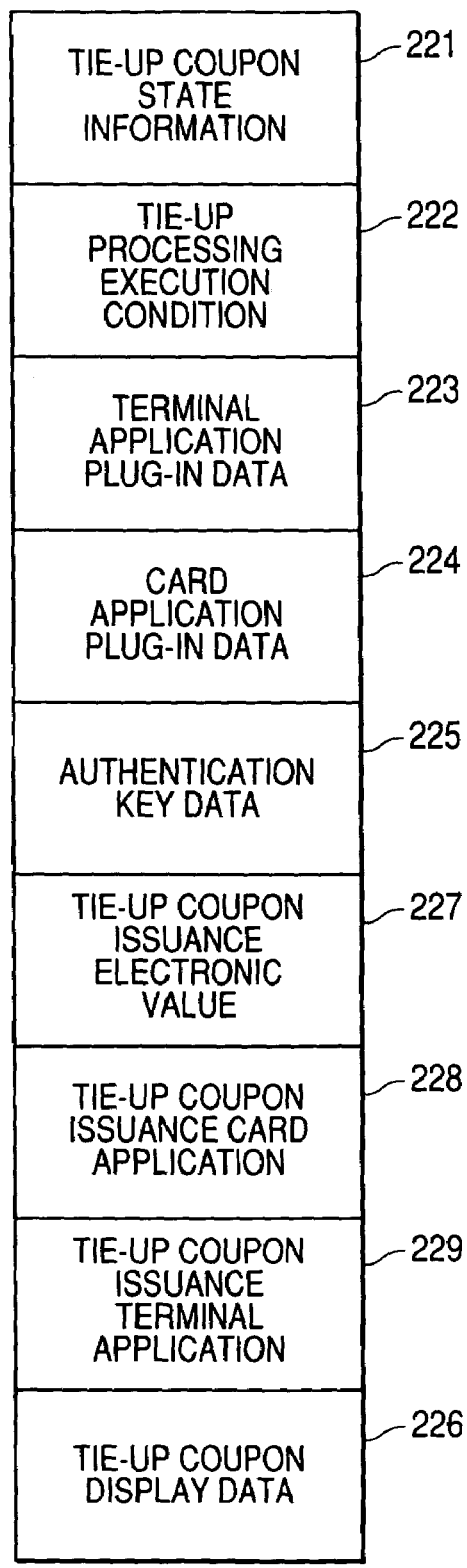
FIG. 29 is a view illustrating another data format of a tie-up coupon in the system in the seventh and eighth embodiments of the invention.

In this case, as shown in FIG. 29, the tie-up coupon includes the tie-up coupon issuance card application 228 which is a card application for processing the tie-up coupon issuance electronic value 227, and the tie-up coupon issuance terminal application 229 which is a terminal application for directly processing the tie-up coupon issuance electronic value 227 or for indirectly processing the tie-up coupon issuance electronic value 227 which is processed by the card application.

There is not such a necessity that the tie-up coupon always includes three kinds of data of the tie-up coupon issuance electronic value 227 and the tie-up coupon issuance card application 228 and the tie-up coupon issuance terminal application 229, and depending on a type of the tie-up coupon issuance electronic value 227, there is such a case that the tie-up coupon issuance electronic value 227 and the tie-up coupon issuance card application 228 are included, and there is such a case that the tie-up coupon issuance electronic value 227 and the tie-up coupon issuance terminal application 229 are included.

In case that the tie-up coupon issuance electronic value is an electronic value of a type requiring a specific card application and a specific terminal application, the tie-up coupon includes three kinds of data of the tie-up coupon issuance electronic value 227 and the tie-up coupon issuance card application 228 and the tie-up coupon issuance terminal application 229. For example, in case that the tie-up coupon issuance electronic value is an electronic shopping ticket which is available only at a specific shop and shopping center and a card application which can handle that electronic shopping ticket and a terminal application which carries out display etc. of a content of that electronic shopping ticket become necessary in order to utilize that electronic shopping ticket, the tie-up coupon includes the electronic shopping ticket, as the tie-up coupon issuance electronic value 227, an electronic shopping ticket card application which carries out management of the electronic shopping ticket and use processing of the electronic shopping ticket, as the tie-up coupon issuance card application 228, and an electronic shopping ticket terminal application which communicates with the electronic shopping ticket card application to carry out display of a content of the electronic shipping ticket and a use operation from a mobile terminal, as the tie-up coupon issuance terminal application 229, respectively.

In addition, in case that the tie-up coupon issuance electronic value is such an electronic value that a specific card application is required but a terminal application is not required, the tie-up coupon includes the tie-up coupon issuance electronic value 227 and the tie-up coupon issuance card application 228. For example, in case that the tie-up coupon issuance electronic value is an entrance ticket to an event place, which targets trusted customers and a card application which can handle that electronic entrance ticket becomes necessary in order to utilize that electronic entrance ticket, the tie-up coupon includes the electronic entrance ticket, as the tie-up coupon issuance electronic value 227, and an electronic entrance ticket card application which carries out management of the electronic entrance ticket and use processing of the electronic entrance ticket, as the tie-up coupon issuance card application 228, respectively.

In addition, in case that the tie-up coupon issuance electronic value is an electronic value of a type of requiring a specific terminal application but not requiring a card application, the tie-up coupon includes the tie-up coupon issuance electronic value 227 and the tie-up coupon issuance terminal application 229. For example, in case that the tie-up coupon issuance electronic value is a video content which is provided only to trusted customers, and a dedicated terminal application, which can reproduce that video content, becomes necessary in order to reproduce that video content, the tie-up coupon includes the video content, as the tie-up coupon issuance electronic value 227, and a content player terminal application which carries out management and reproduction of the video content, as the tie-up coupon issuance card application 228, respectively.

In addition, in case that the tie-up coupon includes the tie-up coupon issuance card application 228, the terminal application plug-in data 223 further includes such information that the terminal application of the mobile terminal 540 carries out mediation processing between the tie-up card application 630 and the card manager 640 on the basis of its content, concretely speaking, information which has, as its content, the group of APDU commands etc. which specifies formats of a command and a response which the terminal application uses for communication with the card manager 640, and the authentication key data 225 of the tie-up coupon further includes key data which is used for authentication processing and data processing between the card manager 640 and the tie-up card application in install processing of the tie-up coupon issuance card application 228 by the tie-up card application into the mobile EC card 550, and the card application plug-in data 224 of the tie-up coupon further includes information which defines authentication processing and data processing with the card manager 640, which the tie-up card application carries out by use of the authentication key data 225 in install processing of the tie-up coupon issuance card application 228 by the tie-up card application into the mobile terminal 540.

In addition, in case that the tie-up coupon includes the tie-up coupon issuance terminal application 229, the card application plug-in data 224 of the tie-up coupon includes information which defines authentication processing and data processing with the mobile terminal 540, which the tie-up card application carries out, in install processing of the tie-up coupon issuance terminal application 229 by the tie-up card application into the mobile EC card 550.

Figure 30:
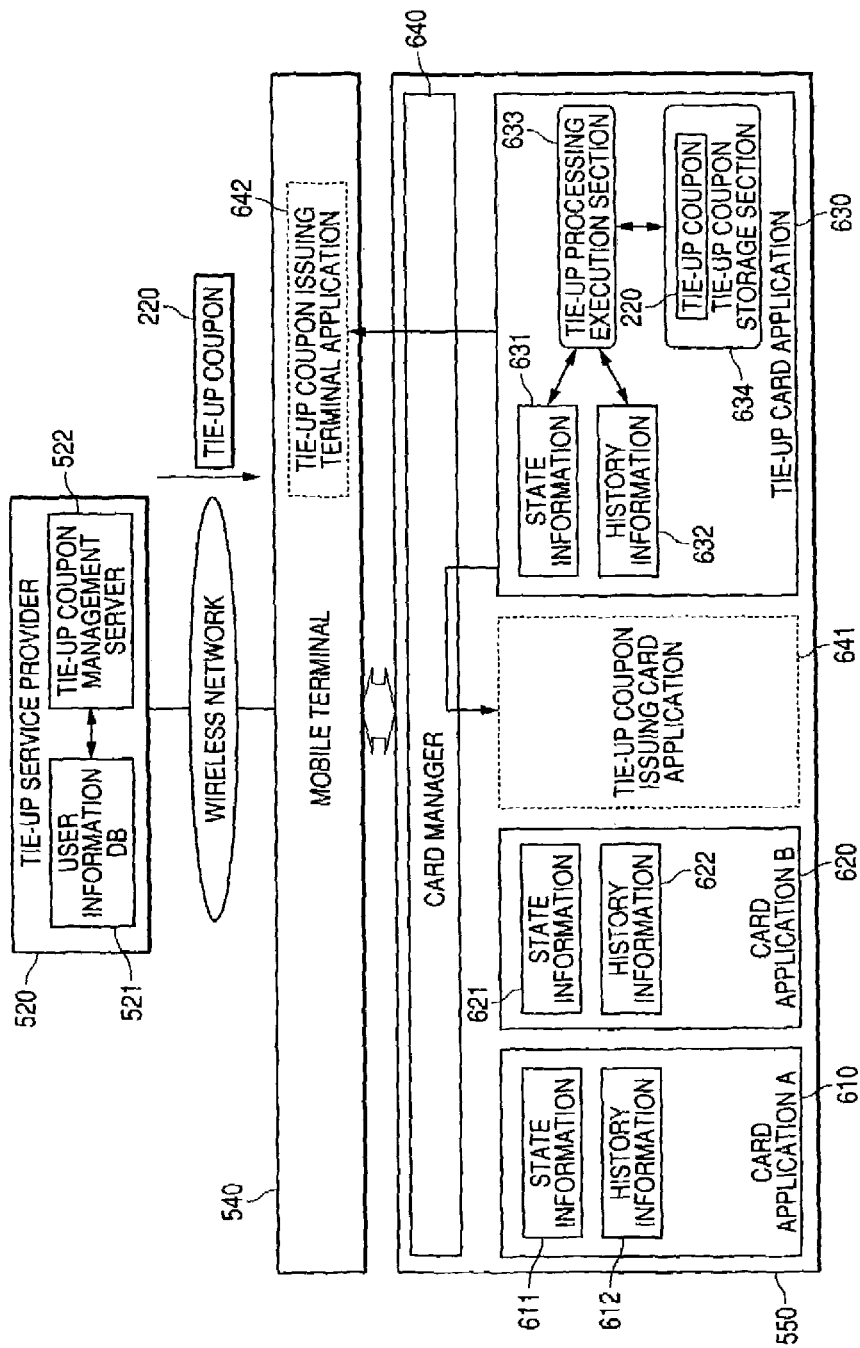
FIG. 30 is a block diagram illustrating a card application of a mobile EC card in another configuration in the system in the seventh embodiment of the invention.

In case that the tie-up coupon includes the tie-up coupon issuance card application 228 or the tie-up coupon issuance terminal application 229, the tie-up processing execution section 633 carries out processing as follows, before it carries out processing for issuing the tie-up coupon electronic value 227 to the specified card application or terminal application, in the step 5 of the flow of the tie-up processing in FIG. 25. In case that the tie-up coupon includes the tie-up coupon issuance card application 228, the tie-up processing execution section 633 installs the tie-up coupon issuance card application 228 into the mobile EC card 550 by tie-up processing with the card manager 640 which manages a card application in the mobile EC card, as shown in FIG. 30. At this time, the tie-up processing execution section 633 carries out mutual authentication processing with the card manager 640 by use of the authentication key data 225 on the basis of the card application plug-in data 224, and exchanges a session key which is used as an encryption key of data exchange, and encrypts the tie-up coupon issuance card application 228 by the session key, and then, transmits it to the card manager. The card manager 640 carries out decryption of the received tie-up coupon issuance card application 228 and verification of electronic signature, and registers it as a card application. In addition, in case that the tie-up coupon includes the tie-up coupon issuance terminal application 229, the tie-up processing execution section 633 installs the tie-up coupon issuance terminal application 229 into the mobile terminal 540 by tie-up processing with the mobile terminal 540, as shown in FIG. 30. At this time, the tie-up processing execution section 633 carries out mutual authentication processing with the mobile terminal 540 on the basis of the card application plug-in data 224, and transmits the tie-up coupon issuance terminal application 229 to the mobile terminal 540. The mobile terminal 540 carries out verification of an electronic signature of the received tie-up coupon issuance terminal application 229, and registers it as the terminal application. In this case, even if necessary card application and terminal application are not installed in the mobile EC card 550 or the mobile terminal 540 in advance, it becomes possible for a user to immediately utilize the tie-up coupon issuance electronic value 227.

In addition, in the above-described explanation, it explained that the tie-up processing execution section 633 installs the tie-up coupon issuance card application 228 into the mobile EC card, or installs the tie-up coupon issuance terminal application 229 into the mobile terminal 540, and then, issues the tie-up coupon issuance electronic value 227, but it is all right even if the tie-up processing execution section 633 carries out processing for incorporating the tie-up coupon issuance electronic value 227 into the tie-up coupon issuance card application 228 or the tie-up coupon issuance terminal application 229 which is specified in the tie-up card application on the basis of the card application plug-in data 224, and then, carries out processing for installing the tie-up coupon issuance card application 228 and the tie-up coupon issuance terminal application 229, and in addition, as a data configuration of the tie-up coupon, it is also all right even if information, which corresponds to the tie-up coupon issuance electronic value, is incorporated in the tie-up coupon issuance card application 228 or the tie-up coupon issuance terminal application 229, and in this case, the tie-up processing execution section 633 carries out only the processing for installing the tie-up coupon issuance card application 228 and the tie-up coupon issuance terminal application 229.

In this way, by using this mobile EC card, the tie-up coupon 220 is stored in the confidential secure flash memory area 556, and processing based on the card application plug-in data 224 is carried out in TRM 554 with a tamper nature, and therefore, the tie-up processing of plural services can be carried out safely only at the mobile terminal 540 side in which the mobile EC card 550 is loaded. On that account, there is no necessity to alter an existing system such as a POS terminal, in order to carry out tie-up processing between services.

It is also all right even if this mobile EC card is a thing which is loaded in a mobile terminal, and a thing which is embedded in a mobile terminal as a component.

In addition, here, it is explained that the mobile EC card is a thing which has the secure flash memory area, and has a large storage area, but it is also possible to use a normal IC card as the mobile EC card, by restricting a data size of the tie-up coupon display data 226, and by restricting the number of tie-up coupons which are stored in the tie-up coupon storage section 634.

Eighth Embodiment

In an eighth embodiment of the invention, a case of carrying out tie-up processing between card applications which are installed in different IC cards will be described.

Figure 26:
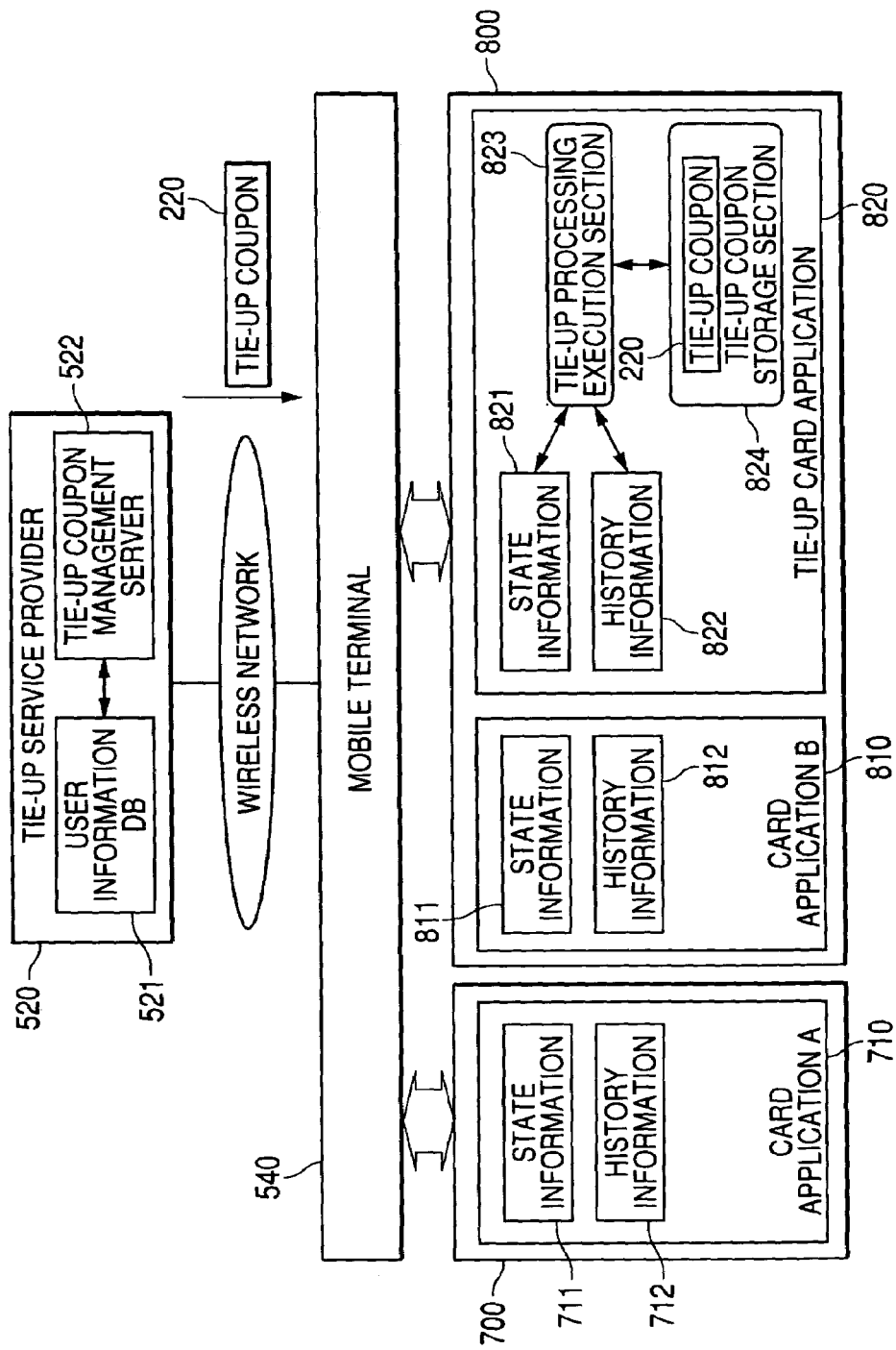
FIG. 26 is a view illustrating a card application of an IC card and a mobile EC card in a system of the eighth embodiment of the invention.

FIG. 26 shows a configuration of an IC card 700 in which a card application A 710 is installed, and a mobile EC card 800 in which a tie-up card application 820 and a card application B 810 are installed, and the tie-up card application 820 carries out tie-up processing with the card application B 810 and the card application A 710.

This IC card 700 is, for example, embedded in the mobile terminal 540 as a component, and the mobile EC card 800 is, for example, loaded in the mobile terminal.

The card application A 710 of the IC card 700 holds state information 711 which shows a state of the card application A 710, and history information 712 of processing which the card application A 710 carried out, and the card application B 810 of the mobile EC card 800 holds state information 811 which shows a state of the card application B 810, and history information 812 of processing which the card application B 810 carried out, and the tie-up card application 820 of the mobile EC card 800 holds state information 821 which shows a state of the tie-up card application 820, a tie-up processing execution section 823 which carries out tie-up processing between the card application A 710 and the card application B 810, and history information 822 of that tie-up processing, and furthermore, a tie-up coupon 220, which is downloaded through a wireless network from a tie-up coupon management server 522 of a tie-up service provider 520, is stored by a tie-up coupon storage section 824. In the tie-up coupon storage section 824, a plurality of tie-up coupons 220 are stored.

A data format of the tie-up coupon 220, which is downloaded from the tie-up coupon management server 522, does not change as compared with the thing which is shown in FIG. 23 or FIG. 24. In this regard, however, in this case, the tie-up processing execution condition 222 of the tie-up coupon 220 defines conditions which should be satisfied by the tie-up coupon state information 221 and the state information 711 or the history information 712 of the card application A 710 of the IC card 700, and the state information 811, 821 or the history information 812, 822 of the tie-up card application 800 and the card application B 810 of the mobile EC card 800.

The tie-up processing execution section 633 of the tie-up card application 630 carries out tie-up processing of the card application B 810 of the mobile EC card 800 and the card application A 710 of the IC card 700, by procedures in the flow chart of FIG. 25, on the basis of the stored tie-up coupon 220. This processing is carried out in succession to settlement processing of a POS terminal, etc.

The tie-up card application 820 transmits the terminal application plug-in data 223 in the tie-up coupon 220, to the mobile terminal 540, and loads the card application plug-in data 224, and collects the state information 711, 811 and the history information 712, 812 of the card application A 710 of the IC card 700 and the card application B 810 of the mobile EC card 800, which are necessary for judgment of the tie-up processing execution condition 222, through the terminal application of the mobile terminal 540 (step 1).

At this time, in case of collecting, for example, the history information 712 of the card application A 710 of the IC card 700, the terminal application loads the received terminal application plug-in data, and accesses to the card application A 710 of the IC card 700, by use of AID of the card application A which is included in the terminal application plug-in data and a command group correspond to the card application A, and selects the card application A as a card application which is linked up with the tie-up card application 820 of the mobile EC card 800.

The tie-up processing execution section 823 of the tie-up card application 820 carries out mutual authentication processing with the card application A 710 of the IC card 700, by use of authentication key data 225, on the basis of the card application plug-in data 224, and exchange a session key which is used as an encryption key of data exchange. Next, the tie-up processing execution section 823 encrypts a data exchange request message which requests the history information 712 of the card application A 710, by use of the session key, and transmits it to the card application A 710 of the IC card 700 through the terminal application. The card application A 710 transmits a data exchange response message which includes the history information 712 encrypted by the session key, on the basis of this data exchange request, to the tie-up processing execution section 823 of the tie-up card application 820 of the mobile EC card 800 through the terminal application. The terminal application, which mediates this data exchange, converts data which is sent from the tie-up card application 820 of the mobile EC card 800 to the card application A 710 of the IC card 700, into a command format of the card application A 710, and converts data, which is sent from the card application A 710 of the IC card 700 to the tie-up card application 820 of the mobile EC card 800, into a command format of the tie-up card application 820.

Also in case of collecting the state information 711 of the card application A, processing which is similar to the case of collecting the history information 712 is carried out, and in addition, also in case of collecting the state information 811 and the history information 812 of the card application B, similar processing is carried out.

The tie-up processing execution section 823 of the tie-up card application 820 of the mobile EC card application 800, which collected information necessary for judgment of an execution condition, in this way, judges whether the collected information satisfies the tie-up processing execution condition 222 or not (step 2). In case that the execution condition is satisfied, the tie-up processing execution section 823 of the tie-up card application 820 carries out mutual authentication processing with a card application which becomes an object of the tie-up processing, by use of the authentication key data 225, and exchanges a session key, in the same manner as in the case of the step 1. Then, on the basis of the card application plug-in data 224, data, which is encrypted by the session key, is transmitted, and tie-up processing is carried out (step 3).

Next, the tie-up processing execution section 823 of the tie-up card application 820 judges whether the tie-up coupon 220 is set up so as to issue the tie-up coupon issuance electronic value 227 or not (step 4), and in case that the tie-up coupon issuance electronic value 227 is set up, the tie-up coupon issuance electronic value is encrypted by the session key, and transmitted to a card application which is specified, and the tie-up coupon issuance electronic value is issued to the specified card application (step 5).

Next, the tie-up processing execution section 823 of the tie-up card application 820 stores a history of the tie-up processing, in the history information 822 of the tie-up card application 820, and erases the tie-up coupon 220 to complete the tie-up processing (step 6).

After that, the mobile terminal 540 receives a completion response of the tie-up processing, from the mobile EC card 550, and displays a result of the tie-up processing on a screen.

In addition, a history of the tie-up processing, which is stored in the history information 822 of the tie-up card application 820, is transmitted to the tie-up coupon management server 522 through a wireless network, at appropriate timing, at a later date.

In addition, in the above-described explanation, it explained that the tie-up coupon includes the electronic value such as an electronic boarding ticket and a discount coupon for next visit to a shop, and object data such as a music content and a video content, as the tie-up coupon issuance electronic value 227, but it is also all right even if the tie-up coupon further includes a card application and a terminal application which handle this tie-up coupon issuance electronic value 227.

In case of issuing the tie-up coupon issuance electronic value to a card application, there is such cases that a card application, to which the tie-up coupon issuance electronic value should be issued, has to be installed in the IC card 700 or the mobile EC card 800 in advance, and in addition, on the occasion of utilizing the tie-up coupon issuance electronic value, a terminal application has to be installed in the mobile terminal 540. On the occasion of such processing that the card application and the terminal application, which handle the tie-up coupon issuance electronic value 227, is incorporated in the tie-up coupon and the tie-up processing execution section 823 issues the tie-up coupon issuance electronic value 227, the card application is installed in the IC card or the mobile EC card and the terminal application is installed in the mobile terminal, respectively, according to need, and thereby, even in case that necessary card application and terminal application are not installed in advance, it becomes possible for a user to utilize the tie-up coupon issuance electronic value 227.

In this case, as shown in FIG. 29, the tie-up coupon includes the tie-up coupon issuance card application 228 which is a card application for processing the tie-up coupon issuance electronic value 227, and the tie-up coupon issuance terminal application 229 which is a terminal application for directly processing the tie-up coupon issuance electronic value 227 or for indirectly processing the tie-up coupon issuance electronic value 227 which is processed by the card application.

In addition, in case that the tie-up coupon includes the tie-up coupon issuance card application 228, the terminal application plug-in data 223 further includes such information that the terminal application of the mobile terminal 540 carries out mediation processing between the tie-up card application 820 and the card manager 643 of the IC card 700 or the card manager 640 of the mobile EC card 800 on the basis of its content, concretely speaking, information which has, as its content, the group of APDU commands etc. which specifies formats of a command and a response which the terminal application uses for communication with the card manager 643 or the card manager 640, and the authentication key data 225 of the tie-up coupon further includes key data which is used for authentication processing and data processing between the card manager 643 and the tie-up card application in install processing of the tie-up coupon issuance card application 228 by the tie-up card application into the IC card 700, or key data which is used for authentication processing and data processing between the card manager 640 and the tie-up card application in install processing of the tie-up coupon issuance card application 228 by the tie-up card application into the mobile EC card 800, and the card application plug-in data 224 of the tie-up coupon further includes information which defines authentication processing and data processing with the card manager 643, which the tie-up card application carries out by use of the authentication key data 225 in install processing of the tie-up coupon issuance card application 228 by the tie-up card application into the IC card 700, or information which defines authentication processing and data processing with the card manager 640, which the tie-up card application carries out by use of the authentication key data 225 in install processing of the tie-up coupon issuance card application 228 by the tie-up card application into the mobile EC card 800.

In addition, in case that the tie-up coupon includes the tie-up coupon issuance terminal application 229, the card application plug-in data 224 of the tie-up coupon includes information which defines authentication processing and data processing with the mobile terminal 540, which the tie-up card application carries out, in install processing of the tie-up coupon issuance terminal application 229 by the tie-up card application into the mobile terminal 540.

In case that the tie-up coupon includes the tie-up coupon issuance card application 228 or the tie-up coupon issuance terminal application 229, the tie-up processing execution section 823 carries out processing as follows, before it carries out processing for issuing the tie-up coupon electronic value 227 to the specified card application or terminal application, in the step 5 of the flow of the tie-up processing in FIG. 25. In case that the tie-up coupon includes the tie-up coupon issuance card application 228, the tie-up processing execution section 823 installs the tie-up coupon issuance card application 228 into the IC card 700 by tie-up processing with the card manager 643 which manages a card application in the IC card 700, or installs the tie-up coupon issuance card application 228 into the mobile EC card 800 by tie-up processing with the card manager 640 which manages a card application in the mobile EC card 800, as shown in FIG. 31 (In FIG. 31, as to a case of installing into the mobile EC card 800, it is not shown in the figure).

At this time, which card the tie-up coupon issuance card application 228 is installed into is defined in the card application plug-in data 224. In case of installing into the IC card 700, the tie-up processing execution section 823 carries out mutual authentication processing with the card manager 643 by use of the authentication key data 225 on the basis of the card application plug-in data 224, and exchanges a session key which is used as an encryption key of data exchange, and encrypts the tie-up coupon issuance card application 228 by the session key, and then, transmits it to the card manager. The card manager 643 carries out decryption of the received tie-up coupon issuance card application 228 and verification of electronic signature, and registers it as a card application. In case of installing into the mobile EC card 800, the tie-up processing execution section 823 carries out mutual authentication processing with the card manager 640 by use of the authentication key data 225 on the basis of the card application plug-in data 224, and exchanges a session key which is used as an encryption key of data exchange, and encrypts the tie-up coupon issuance card application 228 by the session key, and then, transmits it to the card manager. The card manager 640 carries out decryption of the received tie-up coupon issuance card application 228 and verification of electronic signature, and registers it as a card application.

Figure 31:
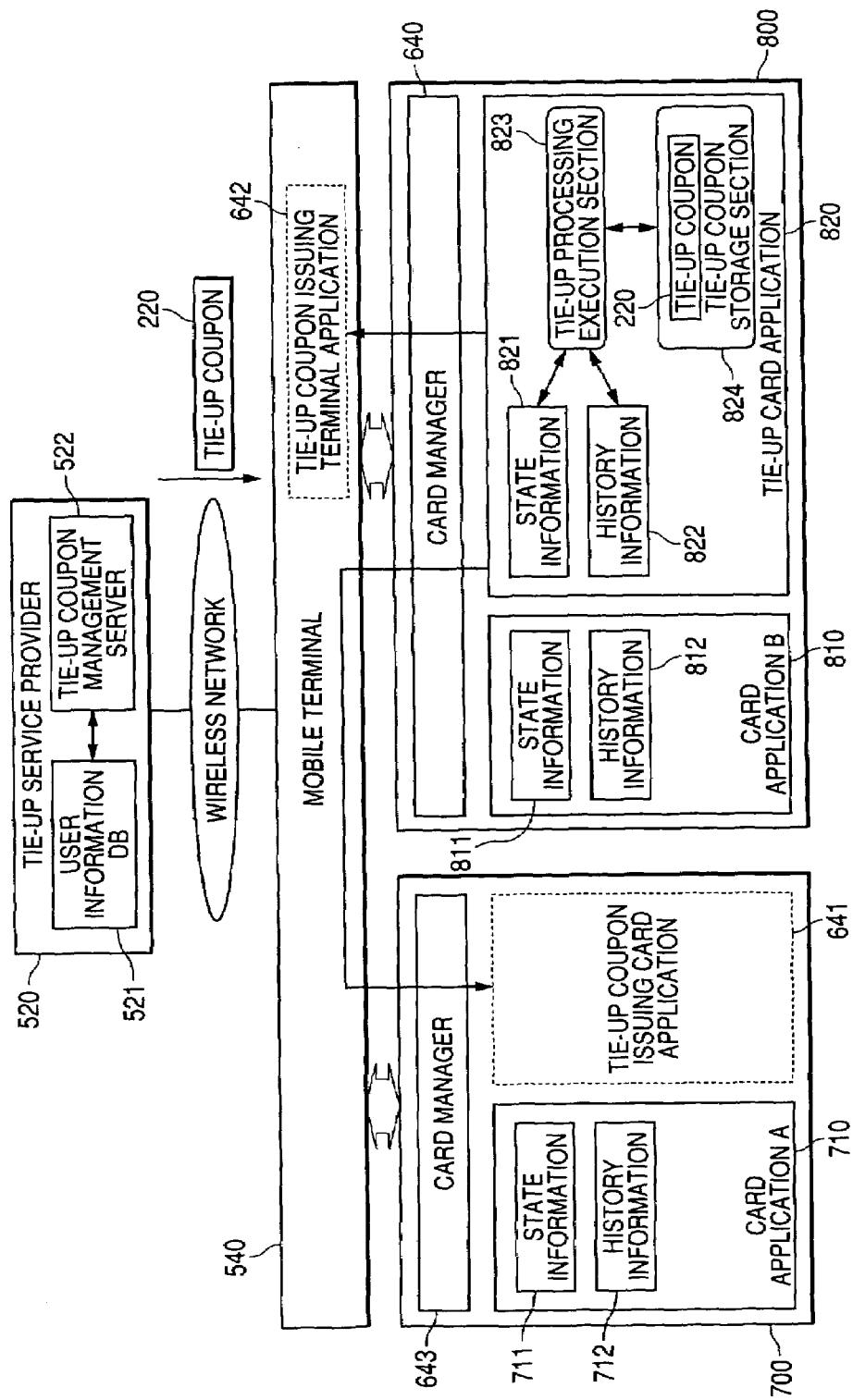
FIG. 31 is a view illustrating a card application of an IC card and a mobile EC card in another configuration in the system in the eighth embodiment of the invention.

In addition, in case that the tie-up coupon includes the tie-up coupon issuance terminal application 229, the tie-up processing execution section 823 installs the tie-up coupon issuance terminal application 229 into the mobile terminal 540 by tie-up processing with the mobile terminal 540, as shown in FIG. 31. At this time, the tie-up processing execution section 823 carries out mutual authentication processing with the mobile terminal 540 on the basis of the card application plug-in data 224, and transmits the tie-up coupon issuance terminal application 229 to the mobile terminal 540. The mobile terminal 540 carries out verification of an electronic signature of the received tie-up coupon issuance terminal application 229, and registers it as the terminal application. In this case, even if necessary card application and terminal application are not installed in the IC card 700 or the mobile EC card 800 or the mobile terminal 540 in advance, it becomes possible for a user to immediately utilize the tie-up coupon issuance electronic value 227.

In addition, in the above-described explanation, it explained that the tie-up processing execution section 823 installs the tie-up coupon issuance card application 228 into the IC card 700 (the mobile EC card 800), or installs the tie-up coupon issuance terminal application 229 into the mobile terminal 540, and then, issues the tie-up coupon issuance electronic value 227, but it is all right even if the tie-up processing execution section 823 carries out processing for incorporating the tie-up coupon issuance electronic value 227 into the tie-up coupon issuance card application 228 or the tie-up coupon issuance terminal application 229 which is specified in the tie-up card application on the basis of the card application plug-in data 224, and then, carries out processing for installing the tie-up coupon issuance card application 228 and the tie-up coupon issuance terminal application 229, and in addition, as a data configuration of the tie-up coupon, it is also all right even if information, which corresponds to the tie-up coupon issuance electronic value, is incorporated in the tie-up coupon issuance card application 228 or the tie-up coupon issuance terminal application 229, and in this case, the tie-up processing execution section 823 carries out only the processing for installing the tie-up coupon issuance card application 228 and the tie-up coupon issuance terminal application 229.

By configuring the mobile terminal 540 and the mobile EC card 800 and the tie-up coupon 220 in this manner, it is also possible to carry out the tie-up processing between card applications which are stored in different secure devices.

In addition, here, it is explained that the mobile EC card is a thing which has the secure flash memory area, and has a large storage area, but it is also possible to use a normal IC card as the mobile EC card, by restricting a data size of the tie-up coupon display data 226, and by restricting the number of tie-up coupons which are stored in the tie-up coupon storage section 634.

EXAMPLES

More concrete embodiments of the invention will be described with reference to the drawings.

First Example

As a first example of the invention, such a case that a function of data exchange between card applications is utilized to issue a mileage point according to the use of a railway, and processing of converting that mileage point into electronic money is carried out by off-line will be described.

Figure 15:
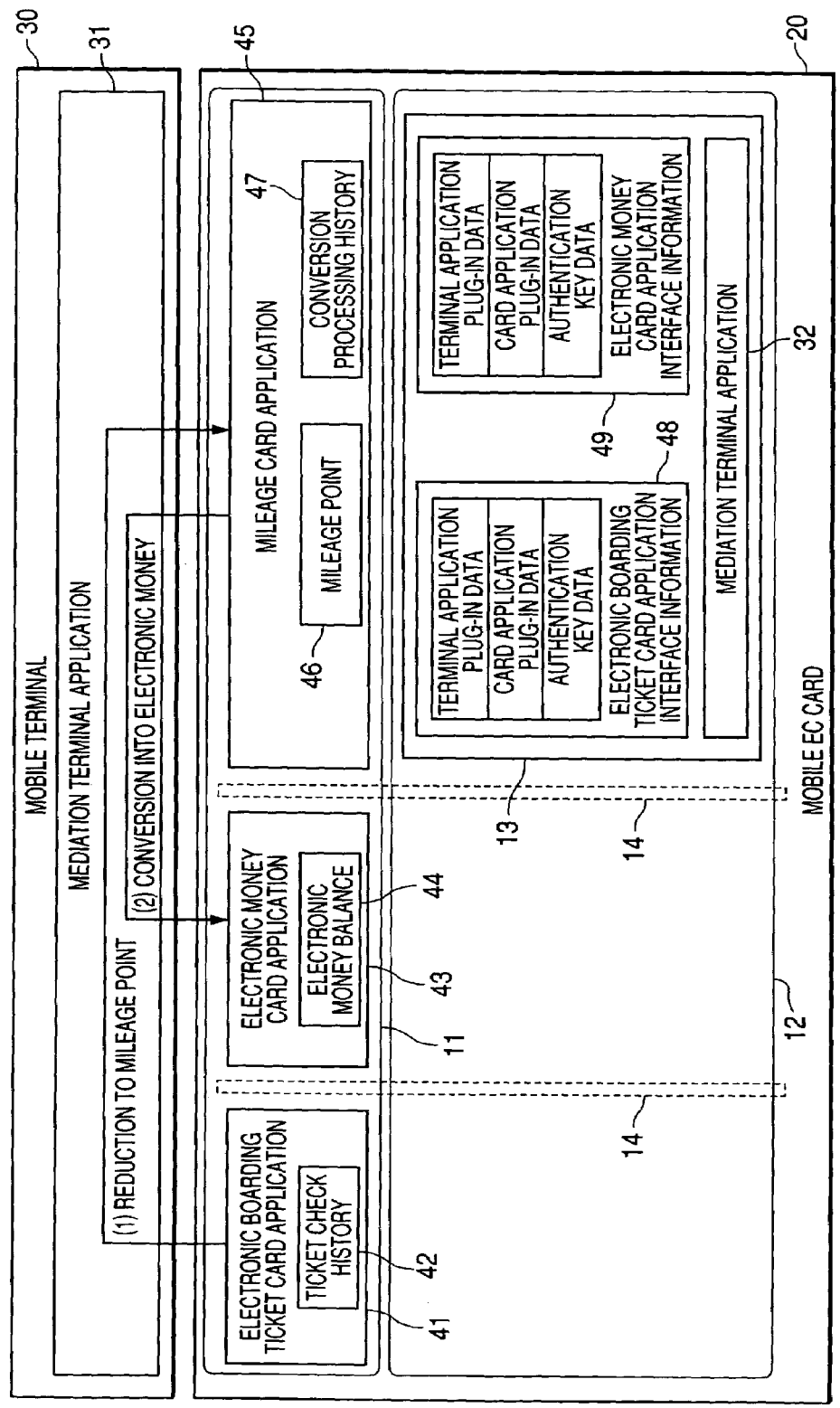
FIG. 15 is a block diagram of a mobile EC card and a mobile terminal in a first example (exchange of mileage points and electronic money) of the invention.

FIG. 15 shows a block diagram of a mobile EC card 20 and a mobile terminal 30 based on the configuration of the second embodiment of the invention.

A mediation terminal application 31 is installed in the mobile terminal 30, and an electronic boarding ticket card application 41 which functions as a boarding ticket, an electronic money card application 43 which functions as electronic money, and a mileage card application 45 which has a function as a data exchange card application are installed in TRM 11 of the mobile EC card 20.

In the electronic boarding ticket card application 41, a ticket check history 42 is stored, in addition to electronic boarding ticket information (omitted in the drawing) such as a ticket, a commuter pass, and a railway prepaid card, and in the electronic money card application 43, balance 44 of electronic money is stored.

In the mileage card application 45, a mileage point 46, and a conversion processing history 47 which shows a history of conversion processing from a ticket check history to a mileage point, and conversion processing from a mileage point to electronic money are stored, in addition to mileage member information (omitted in the drawing). In addition, in a secure flash memory area 13 which the mileage card application 45 manages, interface information 48 of the electronic boarding ticket card application 41, and interface information 49 of the electronic money card application 43 are stored.

Card application plug-in data of this electronic boarding ticket card application interface information 48 includes boarding history conversion table data for calculating a mileage point from a ticket check history, and in addition, its authentication key data includes an authentication key for reading out the ticket check history 42 of the electronic boarding ticket card application 41.

In addition, card application plug-in data of the electronic money card application interface information 49 includes mileage electronic money conversion table data for converting a mileage point into electronic money, and in addition, its authentication key data includes an authentication key for accessing to the electronic money balance 44 of the electronic money card application 43.

Figure 16:
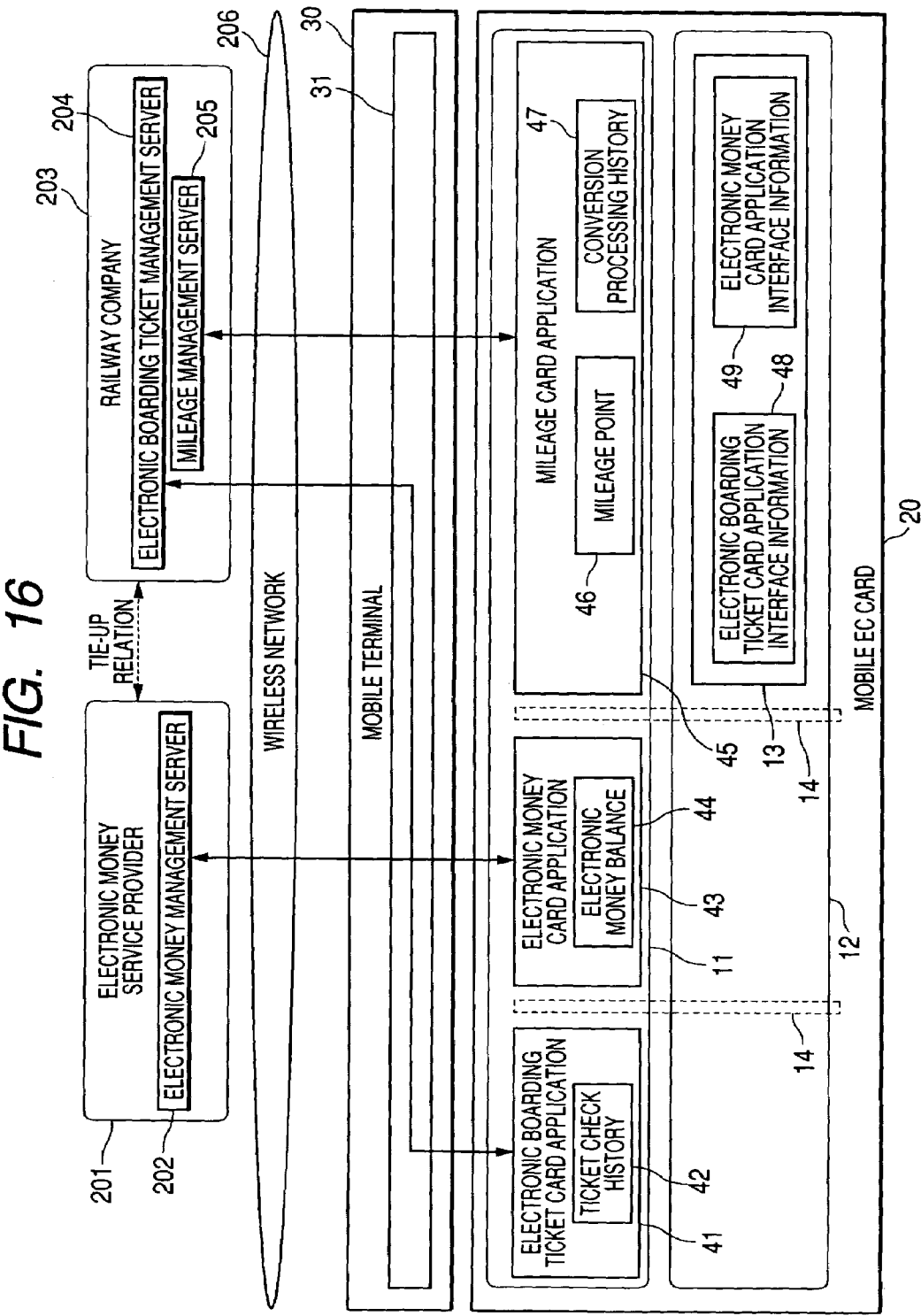
FIG. 16 is a schematic diagram of a system configuration of the first example (exchange of mileage points and electronic money) of the invention.

FIG. 16 schematically shows a system configuration including a server group of a service provider side which manages the electronic boarding ticket information of the electronic boarding ticket card application 41, the electronic money balance 44 of the electronic money card application 43, and the mileage point 46 of the mileage card application 45.

In FIG. 16, the electronic money balance 44, which the electronic money card application 43 holds, is managed by an electronic money management server 202 of an electronic money service provider 201, and the electronic boarding ticket information, which the electronic boarding ticket card application 41 holds, and the mileage point 46, which the mileage card application 45 holds, are managed by an electronic boarding ticket management server 204 and a mileage management server 205 of a railway company 203, respectively.

A user of the mobile EC card 20 loads the mobile EC card 20 in the mobile terminal 30, and carries out communication with the electronic money management server 202, through a wireless network 206 such as a mobile phone network, and charges electronic money to the electronic money balance 44 of the electronic money card application 43, and communicates with the electronic boarding ticket management server 204 to download an electronic boarding ticket, and communicates with the mileage management server 205 to carry out upload of the conversion processing history 47 and update of the mileage point 46.

In case that a user of the mobile EC card 20 passes through an automatic ticket checking machine of a railway, the electronic boarding ticket card application 41 communicates with the automatic ticket checking machine to carry out predetermined ticket check processing, and records history information of that ticket check processing in the ticket check history 42.

In addition, in case that a user of the mobile EC card 20 pays for a commercial good and a service, the electronic money card application 43 communicates with a settlement terminal of a shop side to carry out predetermined electronic settlement processing, and records balance information after the settlement processing, in the electronic money balance 44.

On one hand, the mileage card application 45, which has a data exchange function, reads out the ticket check history 42 from the electronics boarding ticket card application 41, through a mediation terminal application 31, and calculates miles, on the basis of a conversion rate which is determined by the ticket check history conversion table data and mileage member information (category etc. of a member), and adds it to the mileage point 46, and stores its conversion history in the conversion processing history 47 (1). Conversion processing from this ticket check history to a mileage point is automatically carried out by such a matter that the mediation terminal application 31 is automatically activated by the mobile terminal 30. In addition, the mileage card application 45 converts mileage points into electronic money, on the basis of a conversion rate which is determined by the electronic conversion table data and mileage member information (category etc. of a member), and subtracts the converted portion from the mileage point 45, and adds it to the electronic money balance 44 of the electronic money card application 43, through the mediation terminal application 31, and adds its conversion history to the conversion processing history 47 (2). This conversion processing history 47 is uploaded to the mileage management server 205, at a later date. Conversion processing from this mileage point to electronic money can be set up so as to be carried out by a manual operation of a user, or so as to be carried out automatically, depending on setup to the mobile terminal 30.

In this way, it is possible to instantaneously carry out calculation of mileage points and conversion to electronic money by off-line processing, by this mobile EC card 20 and the mobile terminal 30. In addition, as the electronic boarding ticket card application 41 and the electronic money card application 43, it is possible to use an existing card application as it is, and there is no necessity to carry out a new development such as re-design of a card application.

In the foregoing, the example, which is based on the configuration of the second embodiment of the invention, is described, but it is possible to implement it on the basis of the configuration of other first, third, fourth, fifth embodiments, and in each of them, a nearly similar advantage can be realized.

Meanwhile, in the above-described example, the case of a railway boarding ticket is explained, but it is possible to implement it in the same manner, even in case of a boarding ticket of an airplane, a bus, and a ship.

Second Example

Next, as a second example of the invention, a case of carrying out exchange of currencies and exchange processing with a traveler's check (hereinafter, the traveler's check is referred to as "TC") by utilizing a function of data exchange between card applications will be described.

Figure 17:
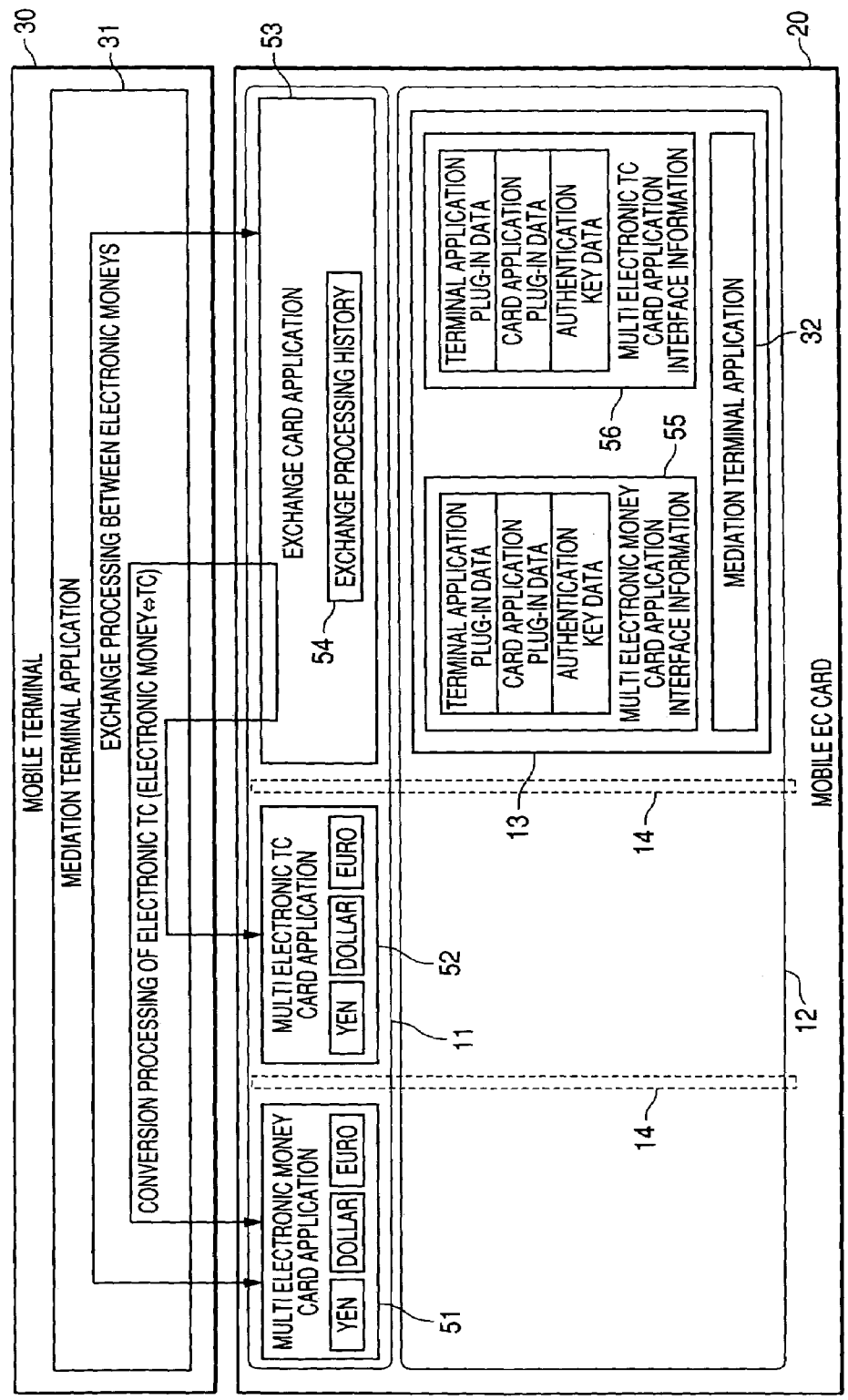
FIG. 17 is a block diagram of a mobile EC card and a mobile terminal in a second example (exchange between currencies) of the invention.

FIG. 17 shows a block diagram of a mobile EC card 20 and a mobile terminal 30 which is based on the configuration of the second embodiment of the invention.

A mediation terminal application 31 is installed in the mobile terminal 30, and in TRM 11 of the mobile EC card 20, Dollar, Euro, and manages a multi-electronic money card application 51 which manages electronic money of plural currencies such as Yen, and carries out normal settlement processing with a settlement terminal, a multi-TC card application 52 which manages TC of plural currencies of Yen, Dollar, Euro, and carries out normal settlement processing with a settlement terminal which corresponds to TC, and an exchange card application 53 which carries out exchange processing between currencies, and conversion processing between electronic money and electronic TC are installed, and in the exchange card application 53, an exchange processing history 54 is stored. In addition, in a secure flash memory area 13 which the exchange card application 53 manages, interface information 55 of the multi-electronic money card application 51, and interface information 56 of the multi-TC card application 52 are stored.

Card application plug-in data of this multi electronic money card application interface information 55 includes data which shows an exchange rate and a commission charge on the occasion of exchanging to another currency between electronic moneys, and in addition, authentication key data includes an authentication key for accessing to each electronic money of the multi electronic money card application 51.

In addition, card application plug-in data of the multi TC card application interface information 56 includes data which shows an exchange rate and a commission charge in case of purchasing TC from electronic money, and in addition, authentication key data includes an authentication for accessing to each electronic TC of the multi electronic TC card application 52.

Figure 18:
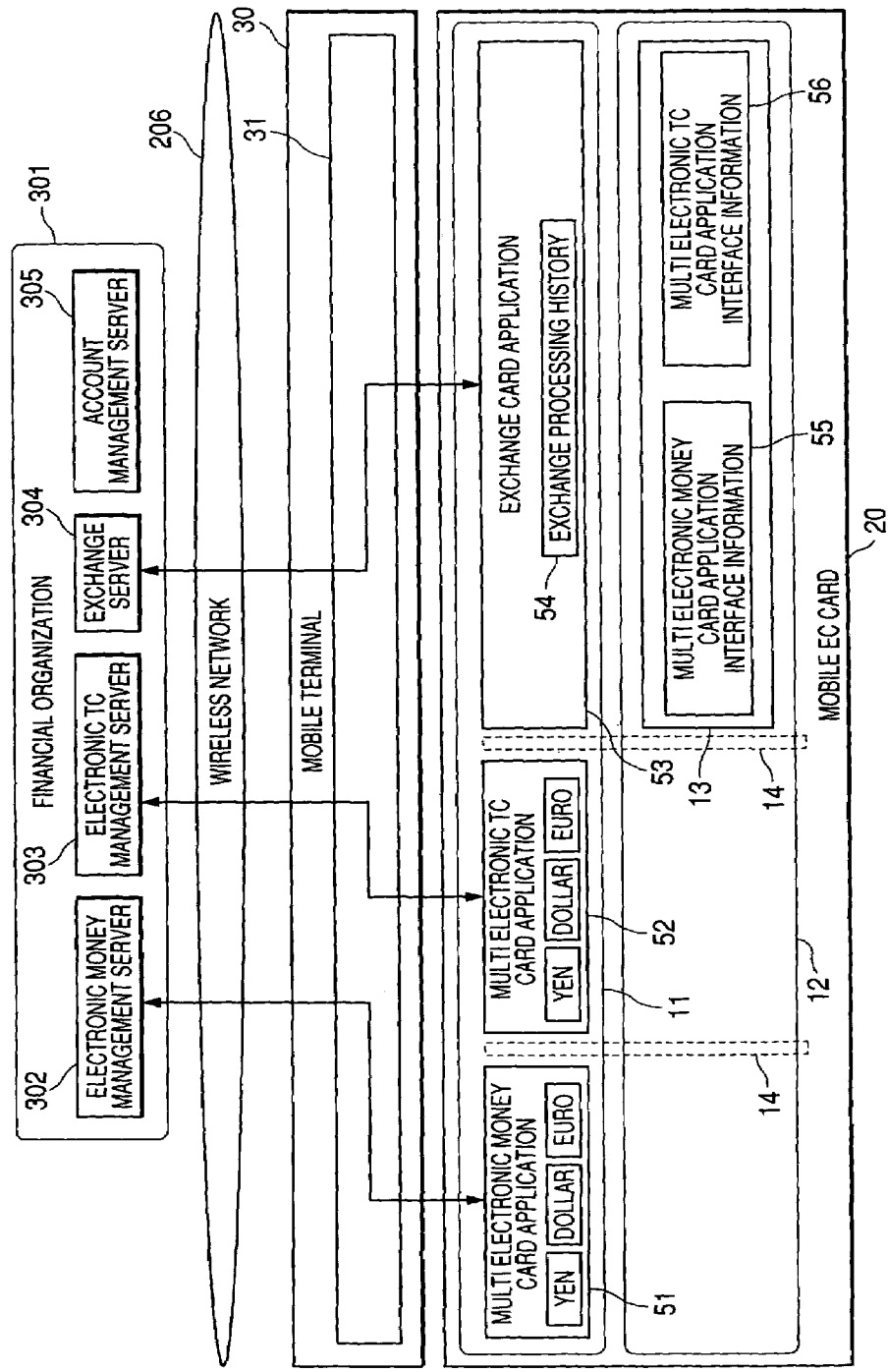
FIG. 18 is a schematic diagram of a system configuration of the second example (exchange between currencies) of the invention.

FIG. 18 schematically shows a system configuration including electronic money of each currency of the multi electronic money card application 51, electronic TC of each currency of the multi TC card application 52, an exchange processing history 54 of the exchange card application 53, and a server group of a financial organization side such as a bank which manages an exchange rate.

In FIG. 18, electronic money of each currency, which the multi electronic money card application 51 holds, is managed by an electronic money management server 302 of a financial organization 301, and electronic TC of each currency, which the multi TC card application 52 holds, is managed by an electronic IC management server 303 of the financial organization 301, and the exchange processing history 54, which the exchange card application 53 holds, is managed by an exchange server 304 of the financial organization 301. In addition, at the financial organization 301 side, there is an account management server 305 which manages a deposit account of a user of the mobile EC card 20.

A user of the mobile EC card 20 loads the mobile EC card 20 in the mobile terminal 30, and carries out communication with the electronic money management server 302 and the account management server 305, through a wireless network 206 such as a mobile phone network, to charge electronic money of a specified currency, to the multi electronic money card application 51, and carries out communication with the electronic TC management server 303 and the account management server 305, to purchase electronic TC of a specified currency, in the multi electronic TC card application 52.

In addition, the mobile terminal 30, in which the mobile EC card 20 is loaded, carries out communication with the exchange server 304, through the wireless network 206, on a regular basis (e.g., one day one time), to update an exchange rate in the multi electronic money card application interface information 55, and an exchange rate in the multi TC card application interrface information 56, to the most recent exchange rate, or to upload the exchange processing history 54.

A user of the mobile EC card 20 pays for a commercial good and a service, with a specified currency, by use of electronic money of the multi electronic money card application 51 or electronic TC of the multi electronic TC card application 52. At this time, the mobile EC card 20 communicates with a settlement terminal of a shop side, to carry out predetermined electronic settlement processing of electronic money or electronic TC.

The exchange card application 52, which has a data exchange function, obtains electronic money or electronic TC with a specified type and amount of a currency, from the multi electronic money card application 51 or the multi electronic TC card application 52, through the mediation terminal application 31, and carries out exchange between currencies, and conversion from electronic money to electronic TC or from electronic TC to electronic money, on the bassi of data which shows an exchange rate and a commission charge, and adds the converted electronic money or electronic TC, to electronic money of that currency which the multi electronic money card application 51 or electronic TC of that currency which the multi electronic TC card application 52 holds, after a commission charge is subtracted.

This exchange processing between currencies and conversion processing between electronic money and electronic TC can be also set up so as to be carried out by a manual operation of a user, or so as to be carried out automatically, depending on setup to the mobile terminal 30. As the case of carrying out setup so as to be carried out automatically, there is such a case that it is set up in such a manner that a specified amount or more of a specified type currency is always possessed.

In the past, exchange of a currency is carried out by going to a bank and an exchange counter, and using an on-line processing machine which is installed there, or by meeting with a bank staff, and on that account, it is extremely inconvenient in case that a foreign currency necessary promptly, which is possessed on hand, becomes insufficient.

In case of using this mobile EC card, it is possible to safely and effectively carry out exchange processing between currencies and conversion processing between electronic money and electronic TC by off-line, and in addition, reduction of an exchange commission charge or realization of free charge can be expected.

In the foregoing, the example, which is based on the configuration of the second embodiment of the invention, is described, but it is possible to implement it on the basis of the configuration of other first, third, fourth, fifth embodiments, and in each of them, a nearly similar advantage can be realized.

Meanwhile, in the above-described example, it is described as to the case in which the multi electronic money card application 51 holds electronic money of plural currencies, but it is also all right even if a card application is independent with respect to each type of currencies such as Yen, Dollar, Euro, and in the same manner, also in case of the multi electronic TC card application 52, it is also all right even if a card application is dependent with respect to each type of currencies. Also in this case, the exchange card application 53 carries out data exchange with each card application by use of interface information which corresponds to each card application, and thereby, it is possible to carry out exchange processing between currencies and conversion processing between electronic money and electronic TC.

In this way, a secure device (IC card or mobile EC card) in this embodiment has a data exchange card application which has a function for carrying out data exchange with another card application, and exchanges data with another card application. On that account, rapid data exchange is possible, and it is possible to effectively carry out tie-up with a service of each card application.

In addition, the data exchange card application holds interface information (information for carrying out processing which is similar to authentication processing which a card application carries out with a dedicated host terminal) with respect to each card application with which data exchange is carried out, and therefore, safe data exchange is possible, and in addition, basically, there is no need to change an operation of a card application, as compared to a case of carrying out data exchange with a dedicated host terminal as the other side.

In addition, even in case that data exchange with another card application is newly started by a contract of a new service tie-up, it is all right if only interface information, which corresponds to that card application, is downloaded, and there is no need to change the card application itself.

Third Example

As a third example of the invention, a system in which a railway company becomes a tie-up service provider and issues traveling expense refund coupons will be described.

Figure 27:
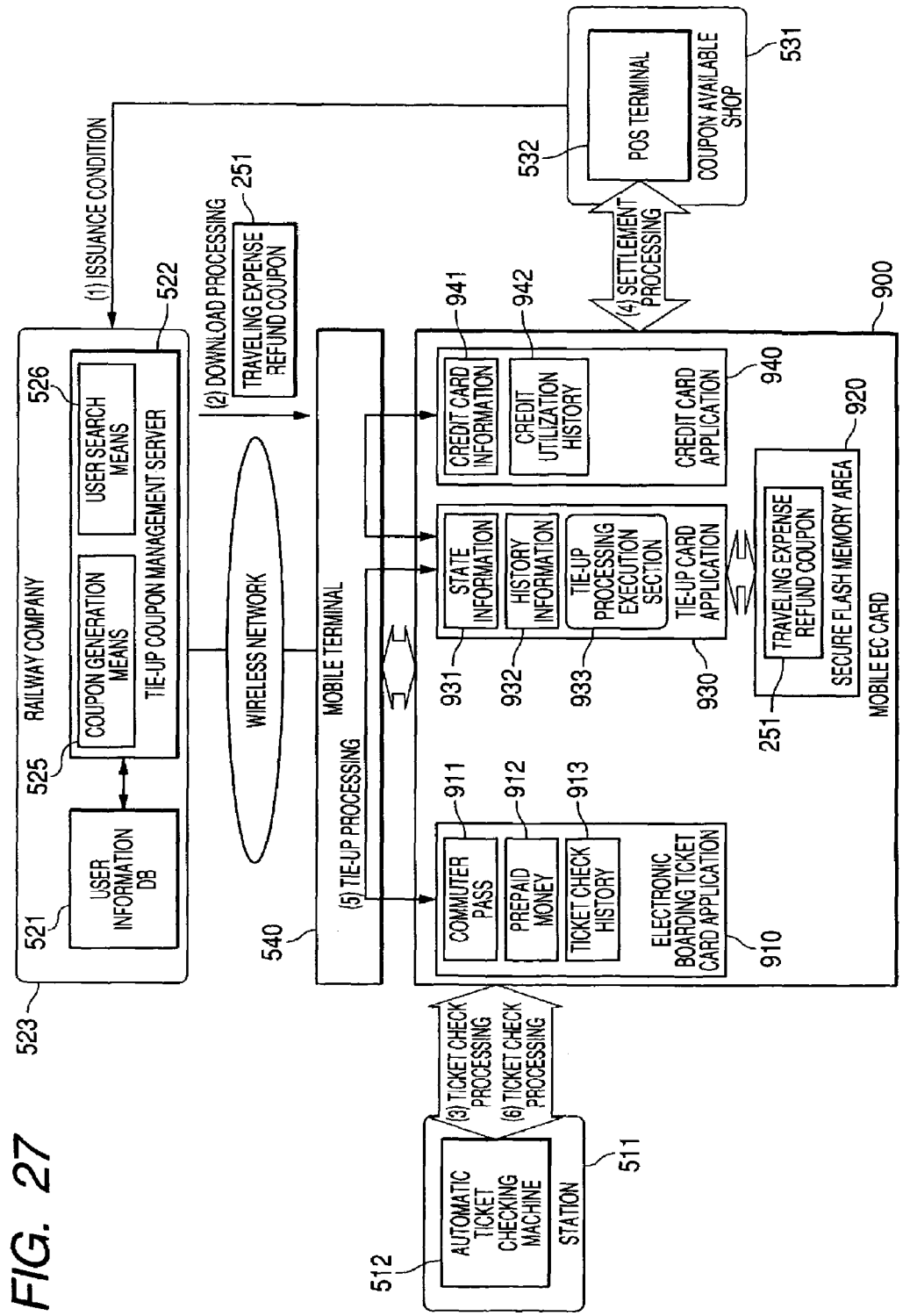
FIG. 27 is a block diagram illustrating a system of a traveling expense refund coupon in the third example.

This system is, as shown in FIG. 27, configured by a coupon available shop 531 which carries out a traveling expense refund coupon service, a railway company 523 which receives a request of the coupon available shop 531 to issue traveling expense refund coupons, a station 511 which is equipped with an automatic ticket checking machine 512, and a mobile terminal 540 in which a mobile EC card 900 is loaded. As the coupon available shop 531, a restaurant along a railway line which the railway company operates and an accommodation facility such as a hotel and an inn, and a leisure facility etc. are supposed.

The coupon available shop 531 is equipped with a POS terminal 532, and in addition, the railway company 523 is equipped with a tie-up coupon management server 522 having a user information DB 521 in which personal information of users are collected, coupon generation means 525 and user search means 526, and the coupon generation means 525 issues a traveling expense refund coupon 251.

The mobile EC card 900 has an electronic boarding ticket card application 910, a credit card application 940, and a tie-up card application 930, and the traveling expense refund coupon 251, which is downloaded from the tie-up coupon management server 522 of the railway company 523, is stored in a secure flash memory area 920 which is set up to the tie-up card application 930.

The electronic boarding ticket card application 910 holds a commuter pass 911, prepaid money 912 and a ticket check history 913, and the credit card application 940 holds credit card information 941 and a credit utilization history 942, and in addition, the tie-up card application 930 is equipped with a tie-up processing execution section 933, and holds state information 931 and history information 932.

In FIG. 27, operation order of this system is shown by numerical characters in parentheses. The coupon available shop 531 reports upper limit of a traveling expense refund amount, issuance number of traveling expense refund coupons, lower limit of a utilization amount for permitting a use of the traveling expense refund coupon, and so on, as a issuance condition of the traveling expense refund coupon, to the railway company 523, to request issuance of the traveling expense refund coupons (1).

The user search means 526 of the tie-up coupon management server 522 of the railway company 523 accesses to user information DB 521, and searches users who satisfy the issuance condition of the traveling expense refund coupon (users who have addresses or commuter passes, within such a range that a traveling expense refund amount does not exceed the upper limit), from addresses of users and commuter pass information of users, and the coupon generation means 223 generates the traveling expense refund coupon 251. This traveling expense refund coupon 251 has a data format of FIG. 23, and is assumed to refund a travel expense, in case that a specified amount or more is used by use of a specified credit cart, at a specified coupon available shop.

The railway company 523 transmits a coupon issuance guidance to the searched users, and issues the traveling expense refund coupon 251 to a user who requests the coupon (2). This traveling expense refund coupon 251 is stored in the secure flash memory area 920 which is set up to the tie-up card application 930 of the mobile EC card 900.

A user moves to the coupon available shop 531 by taking a train. On that occasion, a history of ticket check processing utilizing the prepaid money 912 is recorded in the ticket check history 913 of the electronic boarding ticket card application 910 (3). A user receives purchase of a commercial good and supply of a service at the coupon available shop 531, and uses the traveling expense refund coupon 251, and carries out settlement processing of an expense by the credit card application 940 (4).

The tie-up processing execution section 933 of the tie-up card application 930 collects the credit utilization history 942 and the ticket check history 913, through the mobile terminal 540, and judges an execution condition of the traveling expense refund coupon 251, and in case that a specified money amount or more is used by use of a specified credit card at a specified coupon available shop, carries out tie-up processing to add the same amount as a traveling expense which is recorded in the ticket check history 913 and is paid from the prepaid money 912 at the time of coming to the shop, to the prepaid money 912 (5).

A user carries out new ticket check processing by utilizing the refunded prepaid money, on the occasion of taking a train which the railway company operates (6).

In this way, the mobile EC card 900 of this system can instantaneously carry out tie-up processing with the credit card application 940 and the electronic boarding ticket card application 910, by off-line.

In addition, in the foregoing, it described as to the configuration in such a case that a railway company becomes a tie-up service provider, but by use of a similar configuration, an air transport business entity and a buss transport business entity, a ship transport business entity can become a tie-up service provider to carry out a similar service. In that case, an electronic boarding ticket card application and a credit card application of a transport service which each of them operates carry out the tie-up processing.

Fourth Example

As a fourth example of the invention, it will described as to a system in which a credit card company becomes a tie-up service provider, and issues traveling expense refund coupons by which a traveling expense equivalent amount is refunded by an electronic shopping ticket.

Figure 28:
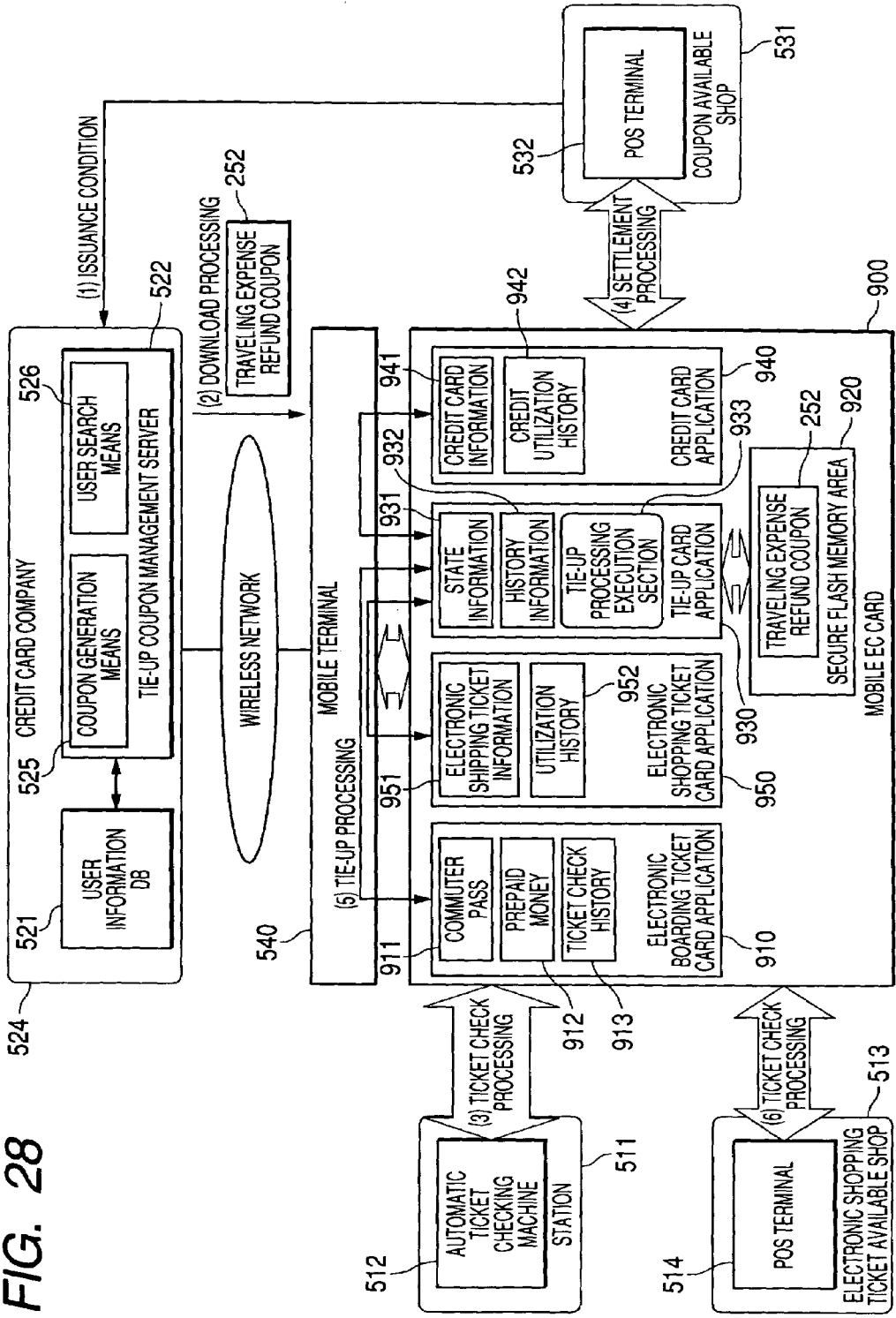
FIG. 28 is a block diagram illustrating a system of a traveling expense refund coupon in the fourth example.

This system is different from the third example (FIG. 27) on such a point that a credit card company 524 receives a request of the coupon available shop 531 and issues traveling expense refund coupons 252, and such a point that the mobile EC card 900 is equipped with an electronic shopping ticket card application 950, and the electronic shopping ticket card application 950 holds electronic shopping ticket information 951 and a utilization history 952, and such a point that an electronic shopping ticket available shop 513, which is equipped with a POS terminal 514, is added, as shown in FIG. 28.

This traveling expense refund coupon 252 has a data format of FIG. 24, and defines to issue an electronic shopping ticket (tie-up coupon issuance electronic value) which is equivalent to a traveling expense, in case that a specified money amount or more is used by use of a specified credit cart at a specified coupon available shop.

In FIG. 28, operation order of this system is shown by numerical characters in parentheses. The coupon available shop 531 reports upper limit of a traveling expense refund amount, issuance number of traveling expense refund coupons, lower limit of a utilization amount for permitting a use of the traveling expense refund coupon, and so on, as a issuance condition of the traveling expense refund coupon, to the credit card company 524, to request issuance of the traveling expense refund coupons (1).

The user search means 526 of the tie-up coupon management server 522 of the credit card company 524 accesses to user information DB 521, and searches users who satisfy the issuance condition of the traveling expense refund coupon (users who have addresses, within such a range that a traveling expense refund amount does not exceed the upper limit), from addresses of users, and the coupon generation means 223 generates the traveling expense refund coupon 252.

The credit card company 524 transmits a coupon issuance guidance to the searched users, and issues the traveling expense refund coupon 252 to a user who requests the coupon (2). This traveling expense refund coupon 252 is stored in the secure flash memory area 920 which is set up to the tie-up card application 930 of the mobile EC card 900.

A user moves to the coupon available shop 531 by taking a train (or transportation facility to which the electronic boarding ticket card application 910 corresponds). On that occasion, a history of ticket check processing utilizing the prepaid money 912 is recorded in the ticket check history 913 of the electronic boarding ticket card application 910 (3). A user receives purchase of a commercial good and supply of a service at the coupon available shop 531, and uses the traveling expense refund coupon 252, and carries out settlement processing of an expense by the credit card application 940 (4).

The tie-up processing execution section 933 of the tie-up card application 930 collects the credit utilization history 942, the electronic shopping ticket information 951 and the ticket check history 913, through the mobile terminal 540, and judges an execution condition of the traveling expense refund coupon 252, and in case that a specified money amount or more is used by use of a specified credit card at a specified coupon available shop, carries out tie-up processing to issue a tie-up coupon issuance electronic value in the traveling expense refund coupon 252 to the electronic shopping ticket card application 950 and to add it to the electronic shopping ticket information 951 (5).

In this way, the mobile EC card 900 of this system can instantaneously carry out tie-up processing with the electronic boarding ticket card application 910, the credit card application 940 and the electronic shopping ticket card application 950, by off-line.

In addition, in the foregoing, it described as to the configuration in such a case that a railway company becomes a tie-up service provider, but by use of a similar configuration, another financial organization such as a bank can become a tie-up service provider to carry out a similar service. In that case, a debit card application and an electronic money application which another financial organization provides, and the electronic boarding ticket card application 910 and the electronic shopping ticket card application 950 carry out the tie-up processing.

Meanwhile, in each embodiment and example, it described as to such a case that the tie-up card application exchanges data with another card application under the mediation of the mobile terminal, but it is also possible to utilize a sharable interface for this data exchange between card applications.

The sharable interface is an interface which is disposed so as to enable data exchange with a card application of the other party side, even under existence of a fire wall, and normally, description of API (Application Programming Interface), which is laid open to the other party side, is incorporated in a source code of a card application.

However, here, re-design of API which is laid open to another card application, authentication processing which is carried out therein, and so on is not carried out, and for example, in FIG. 21, API, which provides a similar function to that of a command group which is inputted from a dedicated host terminal and a management server through a host I/F 15 to card applications A, B, is defined as a sharable interface of the card applications A, B, and in addition, in card application plug-in data 224 of a tie-up coupon, interface information for carrying out processing which is similar to authentication processing and data communication processing which the card applications A, B carry out with a dedicated host terminal and a management server, is described. By doing this, the card applications A, B can carry out data exchange directly with a tie-up card application in which the card application plug-in data 224 is loaded, in the same manner as in the case of carrying out data exchange with a dedicated host terminal and a management server.

A secure device of the invention can be used in such a form that it is loaded in various terminal devices/information processing devices such as mobile phones, PDA (Personal digital Assistant), mail terminals, small size personal computers, game machines, and so on, or, in such a form that it is embedded in these devices, and in addition, it can be also used as a card by itself, or as a chip by itself In addition, it is possible to install card applications which provides various services, and utilization in all fields such as business and entertainment, education, medical care, and manufacturing premise.

Furthermore, it is possible to utilize a secure device and a mobile terminal of the invention for realizing tie-up of various services which are carried out in all fields such as transportation, leisure, entertainment, business, education, and medical care.

What is claimed is:

1. A secure device comprising: a card application isolated by a fire wall; a data exchange card application carrying out data exchange with the card application; card application plug-in data which defines authentication processing and data communication processing which the data exchange card application carries out, in such a manner that authentication processing and data communication processing between the card application and the data exchange card application are carried out in the same manner as authentication processing and data communication processing between the card application and a dedicated host terminal; and authentication key data which is used for this authentication processing.

2. The secure device according to claim 1, further comprising plug-in data for a mediation means to mediate the data exchange and access to the card application.

3. The secure device according to claim 1, wherein the card application has a sharable interface, and the sharable interface provide a similar function to that of a command which is inputted to the card application through a host interface of the secure device, and has such a function that the data exchange card application carries out data exchange with the card application through the sharable interface.

4. The secure device according to claim 1, wherein the secure device comprises a plurality of card applications, and card application plug-in data and authentication key data which correspond to respective card applications.

5. The secure device according to claim 1, comprising: a first card application; a second card application; and card application plug-in data and authentication key data which correspond to respective card applications, wherein the data exchange card application carries out data exchange with the second card application, in the aftermath of data exchange with the first card application; and the data exchange card application carries out data exchange between the first card application and the second card application.

6. The secure device according to claim 1, wherein the data exchange card application has a mileage point function for recording points and an exchange processing history of the points; an electronic boarding ticket card application for recording electronic boarding ticket information and a ticket check history is provided as the card application; and the data exchange card application communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance.

7. The secure device according to claim 1, wherein the data exchange card application has a mileage point function for recording points and an exchange processing history of the points; an electronic money card application for recording electronic money balance is provided as the card application; and the data exchange card application communicates with the electronic money card application by use of authentication key data correspond to the electronic money card application, on the basis of card application plug-in data correspond to the electronic money card application, and converts points into electronic money, and adds the converted electronic money to the electronic money balance of the electronic money card application.

8. The secure device according to claim 1, wherein the data exchange card application has an exchange function for carrying out exchange processing of currency and recording an exchange processing history; a multi-electronic money card application for managing electronic money of plural kinds of currencies is provided as the card application; and the data exchange card application communicates with the multi-electronic money card application by use of authentication key data correspond to the multi-electronic money card application, on the basis of card application plug-in data correspond to the multi-electronic money card application, and carries out exchange processing between a plurality of currencies, on the basis of currency exchange rates and commission charges which the data exchange card application manages.

9. The secure device according to claim 4, wherein the data exchange card application has a mileage point function for recording points and an exchange processing history of the points; an electronic boarding ticket card application for recording electronic boarding ticket information and a ticket check history, and an electronic money card application for recording electronic money balance are provided as the card application; and the data exchange card application communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance, and communicates with the electronic money card application by use of authentication key data correspond to the electronic money card application, on the basis of card application plug-in data correspond to the electronic money card application, and converts the points into electronic money, and adds the converted electronic money to the electronic money balance of the electronic money card application.

10. The secure device according to claim 4, wherein the data exchange card application has an exchange function for carrying out exchange processing of currency and recording an exchange processing history; a multi-electronic money card application for managing electronic money of plural kinds of currencies and a multi-electronic traveler's check card application for managing electronic traveler's checks of plural kinds of currencies are provided as the card application; the data exchange card application communicates with the multi-electronic money card application by use of authentication key data correspond to the multi-electronic money card application, on the basis of card application plug-in data correspond to the multi-electronic money card application; and the data exchange card application communicates with the multi-electronic traveler's check card application, by use of authentication key data correspond to the multi-electronic traveler's check card application, on the basis of card application plug-in data correspond to the multi-electronic traveler's check card application, and carries out data exchange with the multi-electronic money card application and the multi-electronic traveler's check card application, to carry out exchange of a plurality of currencies and exchange of electronic money and an electronic traveler's check, on the basis of currency exchange rates and commission charges which the data exchange card application manages.

11. A secure device comprising: a card application isolated by a fire wall; and a data exchange card application carrying out data exchange with the card application, wherein when card application plug-in data which defines authentication processing and data communication processing between the card application and the data exchange card application and authentication key data which is used for the authentication processing are downloaded into the data exchange card application, the data exchange card application carries out processing which is similar to authentication processing and data communication processing, which the card application and a dedicated host terminal carry out, with the card application, and carries out data exchange with the card application.

12. A secure device comprising: a data exchange card application carrying out data exchange with a card application of another secure device; card application plug-in data which defines authentication processing and data communication processing which the data exchange card application carries out, in such a manner that authentication processing and data communication processing between the card application of another secure device and the data exchange card application are carried out in the same manner as authentication processing and data communication processing between the card application of another secure device and a dedicated host terminal; and authentication key data which is used for the authentication processing.

13. The secure device according to claim 12, further comprising plug-in data for a mediation means to mediate the data exchange and access to the card application.

14. The secure device according to claim 12, comprising: card application plug-in data and authentication key data which correspond to a card application of a first another secure device; and card application plug-in data and authentication key data which correspond to a card application of a second another secure device, wherein the data exchange card application carries out data exchange with the card application of the second another secure device, in the aftermath of data exchange with the card application of the first another secure device; and the data exchange card application carries out data exchange between the card application of the first another secure device and the card application of the second another secure device.

15. A secure device comprising a data exchange card application carrying out data exchange with a card application of another secure device, wherein when card application plug-in data which defines authentication processing and data communication processing between a card application of another secure device and the data exchange card application and authentication key data which is used for the authentication processing are downloaded in the data exchange card application, the data exchange card application carries out processing which is similar to authentication processing and data communication processing which the card application of another secure device and a dedicated host terminal carry out, with the card application of another secure device, and carries out data exchange with the card application of another secure device.

16. The secure device according to any one of claims 1, 11, 12 and 15, further comprising a secure flash memory area which a data exchange card application manages, wherein the card application plug-in data and the authentication key data are stored in the secure flash memory area, and the data exchange card application manages with respect to each corresponding card application.

17. A mobile terminal comprising a secure device, the secure device having a card application isolated by a fire wall and a data exchange card application carrying out data exchange with the card application, wherein the secure device has card application plug-in data which defines authentication processing and data communication processing which the data exchange card application carries out, in such a manner that authentication processing and data communication processing between the card application and the data exchange card application are carried out in the same manner as authentication processing and data communication processing between the card application and a dedicated host terminal; the secure device has authentication key data which is used for the authentication processing; and the data exchange card application carries out data exchange with the card application.

18. The mobile terminal according to claim 17, wherein the mobile terminal has a mediation terminal application; and the secure device has plug-in data for the mediation terminal application to mediate the data exchange and access to the card application.

19. The mobile terminal according to claim 17, wherein the card application of the secure device has a sharable interface; and the sharable interface provides a similar function to that of a command which is inputted through a host interface of the secure device to the card application, and the data exchange card application carries out data exchange with a card application through the sharable interface.

20. The mobile terminal according to claim 17, wherein the secure device has a plurality of card applications; and the secure device has card application plug-in data and authentication key data which correspond to respective card applications.

21. The mobile terminal according to claim 17, wherein the secure device has a first card application and a second card application; card application plug-in data and authentication key data correspond to respective card applications; and the data exchange card application carries out data exchange with the second card application, in the aftermath of data exchange with the first card application; and the data exchange card application carries out data exchange between the first card application and the second card application.

22. The mobile terminal according to claim 17, wherein the data exchange card application of the secure device has a mileage point function for recording points and an exchange processing history of the points; an electronic boarding ticket card application for recording electronic boarding ticket information and a ticket check history is provided as the card application of the secure device; and the data exchange card application of the secure device communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance.

23. The mobile terminal according to claim 17, wherein the data exchange card application of the secure device has a mileage point function for recording points and an exchange processing history of the points; an electronic money card application for recording electronic money balance is provided as the card application of the secure device; and the data exchange card application of the secure device communicates with the electronic money card application by use of authentication key data correspond to the electronic money card application, on the basis of card application plug-in data correspond to the electronic money card application, and converts points into electronic money, and adds the converted electronic money to the electronic money balance of the electronic money card application.

24. The mobile terminal according to claim 17, wherein the data exchange card application of the secure device has an exchange function for carrying out exchange processing of currency and recording an exchange processing history; a multi-electronic money card application for managing electronic money of plural kinds of currencies is provided as the card application of the secure device; and the data exchange card application of the secure device communicates with the multi-electronic money card application by use of authentication key data correspond to the multi-electronic money card application, on the basis of card application plug-in data correspond to the multi-electronic money card application, and carries out exchange processing between a plurality of currencies, on the basis of currency exchange rates and commission charges which the data exchange card application manages.

25. The mobile terminal according to claim 20, wherein the data exchange card application of the secure device has a mileage point function for recording points and an exchange processing history of the points; an electronic boarding ticket card application for recording electronic boarding ticket information and a ticket check history, and an electronic money card application for recording electronic money balance are provided as the card application of the secure device; and the data exchange card application of the secure device communicates with the electronic boarding ticket card application by use of authentication key data correspond to the electronic boarding ticket card application, on the basis of card application plug-in data correspond to the electronic boarding ticket card application, and obtains data of the ticket check history from the electronic boarding ticket card application, and calculates points which correspond to a boarding distance, and communicates with the electronic money card application by use of authentication key data correspond to the electronic money card application, on the basis of card application plug-in data correspond to the electronic money card application, and converts the points into electronic money, and adds the converted electronic money to the electronic money balance of the electronic money card application.

26. The mobile terminal according to claim 20, wherein the data exchange card application of the secure device has an exchange function for carrying out exchange processing of currency and recording an exchange processing history; a multi-electronic money card application for managing electronic money of plural kinds of currencies and a multi-electronic traveler's check card application for managing electronic traveler's checks of plural kinds of currencies are provided as the card application of the secure device; the data exchange card application of the secure device communicates with the multi-electronic money card application by use of authentication key data correspond to the multi-electronic money card application, on the basis of card application plug-in data correspond to the multi-electronic money card application; and the data exchange card communicates with the multi-electronic traveler's check card application, by use of authentication key data correspond to the multi-electronic traveler's check card application, on the basis of card application plug-in data correspond to the multi-electronic traveler's check card application, and carries out data exchange with the multi-electronic money card application and the multi-electronic traveler's check card application, to carry out exchange of and an electronic traveler's check, on the basis of currency exchange rates and commission charges which the data exchange card application manages.

27. A mobile terminal comprising a secure device, the secure device having: a card application isolated by a fire wall; and a data exchange card application carrying out data exchange with the card application, wherein when card application plug-in data which defines authentication processing and data communication processing between the card application and the data exchange card application and authentication key data which is used for the authentication processing are downloaded into the data exchange card application, the data exchange card application carries out processing which is similar to authentication processing and data communication processing which the card application and a dedicated host terminal carry out with the card application, and carries out data exchange with the card application.

28. A mobile terminal comprising: a first secure device having a data exchange card application which carries out data exchange with a card application of another secure device; and a second secure device having one or more card applications, wherein the first secure device comprises: card application plug-in data which defines authentication processing and data communication processing which the data exchange card application carries out, in such a manner that authentication processing and data communication processing between the card application of the second secure device and the data exchange card application of the first secure device are carried out in the same manner as authentication processing and data communication processing between the card application of the second secure device and a dedicated host terminal; and authentication key data which is used for the authentication processing; and wherein the data exchange card application carries out data exchange with the card application of the second secure device.

29. The mobile terminal according to claim 28, wherein the mobile terminal having a mediation terminal application; and the first secure device having plug-in data for a mediation terminal application to mediate the data exchange and access to the card application.

30. The mobile terminal according to claim 28, comprising a third secure device having one or more card applications, wherein the first secure device comprises: card application plug-in data and authentication key data which correspond to a card application of the second secure device; and card application plug-in data and authentication key data which correspond to a card application of the third secure device, wherein the data exchange card application carries out data exchange with the card application of the third secure device, in the aftermath of data exchange with the card application of the second secure device; and the data exchange card application carries out data exchange between the card application of the second secure device and the card application of the third secure device.

31. A mobile terminal comprising: a first secure device having a data exchange card application carrying out data exchange with a card application of another secure device; and a second secure device having one or more card applications, wherein when card application plug-in data which defines authentication processing and data communication processing between a card application of the second secure device and the data exchange card application and authentication key data which is used for the authentication processing are downloaded into the data exchange card application of the first secure device, the data exchange card application carries out processing which is similar to authentication processing and data communication processing which the card application of the second secure device and a dedicated host terminal carry out, with the card application of the second secure device, to carry out data exchange with the card application of the second secure device.

32. The mobile terminal according to any one of claims 17, 27, 28 and 31, further comprising a secure flash memory area which a data exchange card application manages in the secure device, wherein the card application plug-in data and the authentication key data are stored in the secure flash memory area, and the data exchange card application manages with respect to each corresponding card application.

33. A data exchange apparatus comprising: a mobile terminal and a secure device installed in the mobile terminal, wherein the secure device has a card application isolated by a fire wall and a data exchange card application carrying out data exchange with the card application; the secure device has card application plug-in data which defines authentication processing and data communication processing which the data exchange card application carries out, in such a manner that authentication processing and data communication processing between the card application and the data exchange card application are carried out in the same manner as authentication processing and data communication processing between the card application and a dedicated host terminal; the secure device has authentication key data which is used for the authentication processing; and the data exchange card application of the secure device carries out data exchange with the card application by use of the card application plug-in data and authentication key data in accordance with an instruction transmitted from the mobile terminal.

34. A secure device comprising: a plurality of card applications; a tie-up coupon described a processing content of tie-up processing between the card applications and an execution condition of the tie-up processing therein; and a tie-up card application carrying out the tie-up processing between the card applications on the basis of the tie-up coupon, wherein the tie-up card application collects information stored in the other card applications, and judges whether the execution condition is satisfied or not, and when the execution condition is satisfied, the tie-up card application carries out the tie-up processing.

35. The secure device according to claim 34, wherein as the tie-up processing, the tie-up card application re-writes information stored in the other card applications.

36. The secure device according to claim 34, wherein the tie-up coupon has electronic value, and the tie-up card application issues the electronic value to the other card application, as the tie-up processing.

37. The secure device according to claim 34, wherein the tie-up coupon has card application plug-in data which defines authentication processing and data communication processing of the tie-up card application to the other card applications, and authentication key data used for the authentication processing, and the tie-up card application loads the card application plug-in data to carry out information collection from the card application and tie-up processing.

38. The secure device according to claim 34, wherein the tie-up coupon has an electronic value and a card application which is necessary for utilization of the electronic value, and the tie-up card application installs a card application, which is necessary for utilization of the electronic value into the secure device, as the tie-up processing.

39. The secure device according to claim 35 or claim 36, wherein the tie-up coupon is a traveling expense refund coupon, and the tie-up card application collects a credit utilization history from a credit card application, and a ticket check history from an electronic boarding ticket card application, respectively, and judges whether the execution condition is satisfied or not, and adds a money amount which is calculated out from the ticket check history, to prepaid money which the electronic boarding ticket card application manages, as the tie-up processing.

40. The secure device according to claim 37, wherein the tie-up coupon further has terminal application plug-in data which enables mediation processing by a mobile terminal, of the tie-up card application and the other card applications in the above-described information collection and tie-up processing, and the tie-up card application transmits the terminal application plug-in data to a mobile terminal, and carries out information collection from the other card applications and tie-up processing, through the mobile terminal.

41. The secure device according to claim 38, wherein the tie-up coupon further includes a terminal application which is necessary for utilization of the electronic value, and the tie-up card application installs a terminal application, which is necessary for utilization of the electronic value, into a mobile terminal in which the secure device loaded.

42. A secure device comprising: card applications; a tie-up coupon described a processing content of tie-up processing between the card application of another secure device and an execution condition of the tie-up processing therein; and a tie-up card application carrying out the tie-up processing with the card application of another secure device on the basis of the tie-up coupon, wherein the tie-up card application collects information stored by the card application of another secure device, and judges whether the execution condition is satisfied or not, and when the execution condition is satisfied, the tie-up card application carries out the tie-up processing.

43. The secure device according to claim 42, wherein, as the tie-up processing, the tie-up card application rewrites information stored in the card application of another secure device.

44. The secure device according to claim 42, wherein the tie-up coupon has an electronic value, and the tie-up card application issues the electronic value to the card application of another secure device, as the tie-up processing.

45. The secure device according to claim 42, wherein the tie-up coupon has card application plug-in data which defines authentication processing and data communication processing of the tie-up card application to the card application of another secure device, and authentication key data which is used for the authentication processing, and the tie-up card application loads the card application plug-in data, to carry out information collection from the card application of another secure device and tie-up processing.

46. The secure device according to claim 42, wherein the tie-up coupon includes an electronic value and a card application which is necessary for utilization of the electronic value, and the tie-up card application installs a card application, which is necessary for utilization of the electronic value, into the another secure device, as the tie-up processing.

47. The secure device according to claim 36 or claim 44, wherein the tie-up coupon is a traveling expense refund coupon, and the electronic value is an electronic shopping ticket, and the tie-up card application collects a credit utilization history from a credit card application, and a ticket check history from an electronic boarding thicket card application, respectively, and judges whether the execution condition is satisfied or not, and issues the electronic shopping ticket to the electronic shopping ticket card application, as the tie-up processing.

48. The secure device according to claim 45, wherein the tie-up coupon has terminal application plug-in data which enables mediation processing by use of a mobile terminal, between the tie-up card application and the card application of another secure device in the information collection and tie-up processing, and the tie-up card application transmits the terminal application plug-in data to a mobile terminal in which a secure device was loaded, and carries out the information collection from the card application of another secure device and tie-up processing, through the mobile terminal.

49. The secure device according to claim 46, wherein the tie-up coupon further includes a terminal application which is necessary for utilization of the electronic value, and the tie-up card application installs a terminal application, which is necessary for utilization of the electronic value, into a mobile terminal in which the another secure device loaded.

50. A mobile terminal comprising a secure device, the secure device having: a tie-up coupon described a processing content of tie-up processing between the card applications and an execution condition of the tie-up processing therein; a tie-up card application carrying out the tie-up processing between the card applications on the basis of the tie-up coupon; and other card applications, wherein the tie-up card application collects information stored in the other card applications through the mobile terminal, and judges whether the execution condition is satisfied or not, and when the execution condition is satisfied, the tie-up card application carries out the tie-up processing through the mobile terminal.

51. The mobile terminal according to claim 50, wherein the tie-up coupon has card application plug-in data which defines authentication processing and data communication processing to the other card applications of the tie-up card application, authentication key data which is used for the authentication processing, and terminal application plug-in data which enables a mobile terminal to access to a card application, and when the tie-up card application loads the card application plug-in data, and carries out information collection from the other card applications and tie-up processing, the mobile terminal loads the terminal application plug-in data to mediate the information collection and tie-up processing.

52. The mobile terminal according to claim 50, wherein the mobile terminal contains a first secure device having the tie-up card application, and a second secure device which having at least one of card applications for which the tie-up card application carries out tie-up processing.

53. The mobile terminal according to claim 50, wherein the tie-up coupon is received from a tie-up coupon management server through a wireless network, and stores in the secure device, and a history of tie-up processing based on the tie-up coupon is transmitted to the tie-up coupon management server through the wireless network.

* * * * *